(12) United States Patent
Silawan et al.

(10) Patent No.: US 10,375,301 B2
(45) Date of Patent: Aug. 6, 2019

(54) SENSOR CONTROL METHOD EXECUTED BY AIR-CONDITIONING APPARATUS

(71) Applicant: Panasonic Intellectual Property Corporation of America, Torrance, CA (US)

(72) Inventors: Nawatt Silawan, Osaka (JP); Koichi Kusukame, Nara (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 152 days.

(21) Appl. No.: 15/210,886

(22) Filed: Jul. 15, 2016

(65) Prior Publication Data

US 2016/0320085 A1 Nov. 3, 2016

Related U.S. Application Data

(63) Continuation of application No. PCT/JP2015/002503, filed on May 19, 2015.

(30) Foreign Application Priority Data

May 27, 2014 (JP) .................................. 2014-109064
Apr. 2, 2015 (JP) .................................. 2015-075930

(51) Int. Cl.
*G06K 9/00* (2006.01)
*H04N 5/232* (2006.01)
(Continued)

(52) U.S. Cl.
CPC ......... *H04N 5/23232* (2013.01); *F24F 11/30* (2018.01); *F24F 11/62* (2018.01);
(Continued)

(58) Field of Classification Search
USPC .......................... 348/143; 700/276, 277, 278
See application file for complete search history.

(56) References Cited

U.S. PATENT DOCUMENTS 5,326,028 A * 7/1994 Kano ....................... G01D 5/26
236/49.3
5,555,512 A * 9/1996 Imai .................... G06K 9/00369
250/342

(Continued)

FOREIGN PATENT DOCUMENTS

CN 102761706 A 10/2012
JP 64-020474 1/1989
(Continued)

OTHER PUBLICATIONS

International Search Report of PCT application No. PCT/JP2015/002503 dated Aug. 25, 2015.
(Continued)

*Primary Examiner* — Chikaodili E Anyikire
(74) *Attorney, Agent, or Firm* — Greenblum & Bernstein, P.L.C.

(57) ABSTRACT

A sensor control method that is executed by an air-conditioning apparatus includes: acquiring a first thermal image by scanning an air-conditioned space using the infrared sensor in accordance with a first scanning scheme, the air-conditioning apparatus being placed in the air-conditioned space; extracting a subject thermal image from the first thermal image, based on a difference between a background thermal image of the air-conditioned space when no subject is present therein and the first thermal image; determining a second scanning scheme different from the first scanning scheme, when the subject thermal image has a size smaller than a threshold size; and acquiring a second thermal image by scanning an area corresponding to the subject
(Continued)

thermal image of the air-conditioned space using the infrared sensor in accordance with the determined second scanning scheme.

12 Claims, 45 Drawing Sheets

(51) Int. Cl.
| | |
|---|---|
| *G01J 5/00* | (2006.01) |
| *G01J 5/02* | (2006.01) |
| *G06T 3/40* | (2006.01) |
| *H04N 5/33* | (2006.01) |
| *F24F 11/30* | (2018.01) |
| *F24F 11/62* | (2018.01) |
| *F24F 11/79* | (2018.01) |
| *F24F 11/77* | (2018.01) |
| *F24F 11/89* | (2018.01) |
| *G01J 5/08* | (2006.01) |
| *F24F 110/10* | (2018.01) |
| *F24F 120/10* | (2018.01) |
| *F24F 11/63* | (2018.01) |
| *F24F 11/58* | (2018.01) |
| *G01J 5/10* | (2006.01) |

(52) U.S. Cl.
CPC .............. *F24F 11/77* (2018.01); *F24F 11/79* (2018.01); *F24F 11/89* (2018.01); *G01J 5/0025* (2013.01); *G01J 5/025* (2013.01); *G01J 5/026* (2013.01); *G01J 5/089* (2013.01); *G06T 3/4053* (2013.01); *H04N 5/23293* (2013.01); *H04N 5/33* (2013.01); *F24F 11/58* (2018.01); *F24F 11/63* (2018.01); *F24F 2110/10* (2018.01); *F24F 2120/10* (2018.01); *G01J 2005/0077* (2013.01); *G01J 2005/106* (2013.01)

(56) References Cited

U.S. PATENT DOCUMENTS

| | | | |
|---|---|---|---|
| 9,696,053 B2* | 7/2017 | Miwa | G01J 5/089 |
| 2008/0167819 A1* | 7/2008 | Breed | G08G 1/161 |
| | | | 701/300 |
| 2008/0228062 A1* | 9/2008 | Zwirn | A61B 5/0046 |
| | | | 600/407 |
| 2010/0063636 A1* | 3/2010 | Matsumoto | F24F 11/30 |
| | | | 700/276 |
| 2012/0275648 A1 | 11/2012 | Guan | |
| 2015/0221077 A1* | 8/2015 | Kawabata | G06T 7/001 |
| | | | 382/141 |
| 2016/0187022 A1* | 6/2016 | Miwa | G01J 5/0025 |
| | | | 250/349 |
| 2016/0320085 A1* | 11/2016 | Silawan | G06T 3/4053 |
| 2017/0350613 A1* | 12/2017 | Iijima | G01J 5/0025 |

FOREIGN PATENT DOCUMENTS

| | | |
|---|---|---|
| JP | 3-269384 | 11/1991 |
| JP | 4-013036 | 1/1992 |
| JP | 9-113634 | 5/1997 |
| JP | 2010-216688 | 9/2010 |
| JP | 2011-208936 | 10/2011 |

OTHER PUBLICATIONS

English Translation of Chinese Search Report dated Dec. 4, 2018 for the related Chinese Patent Application No. 201580003472.5.

* cited by examiner

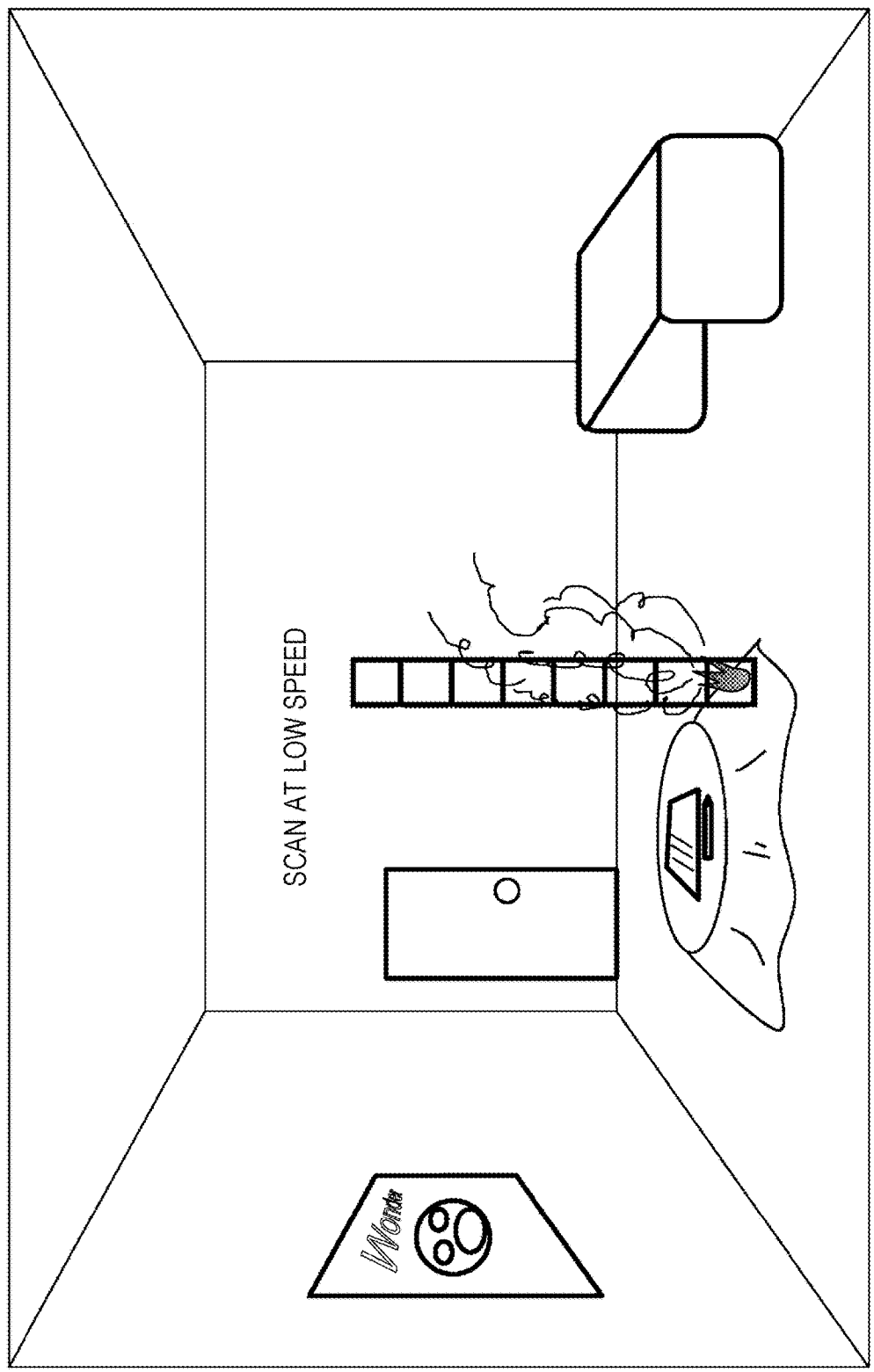

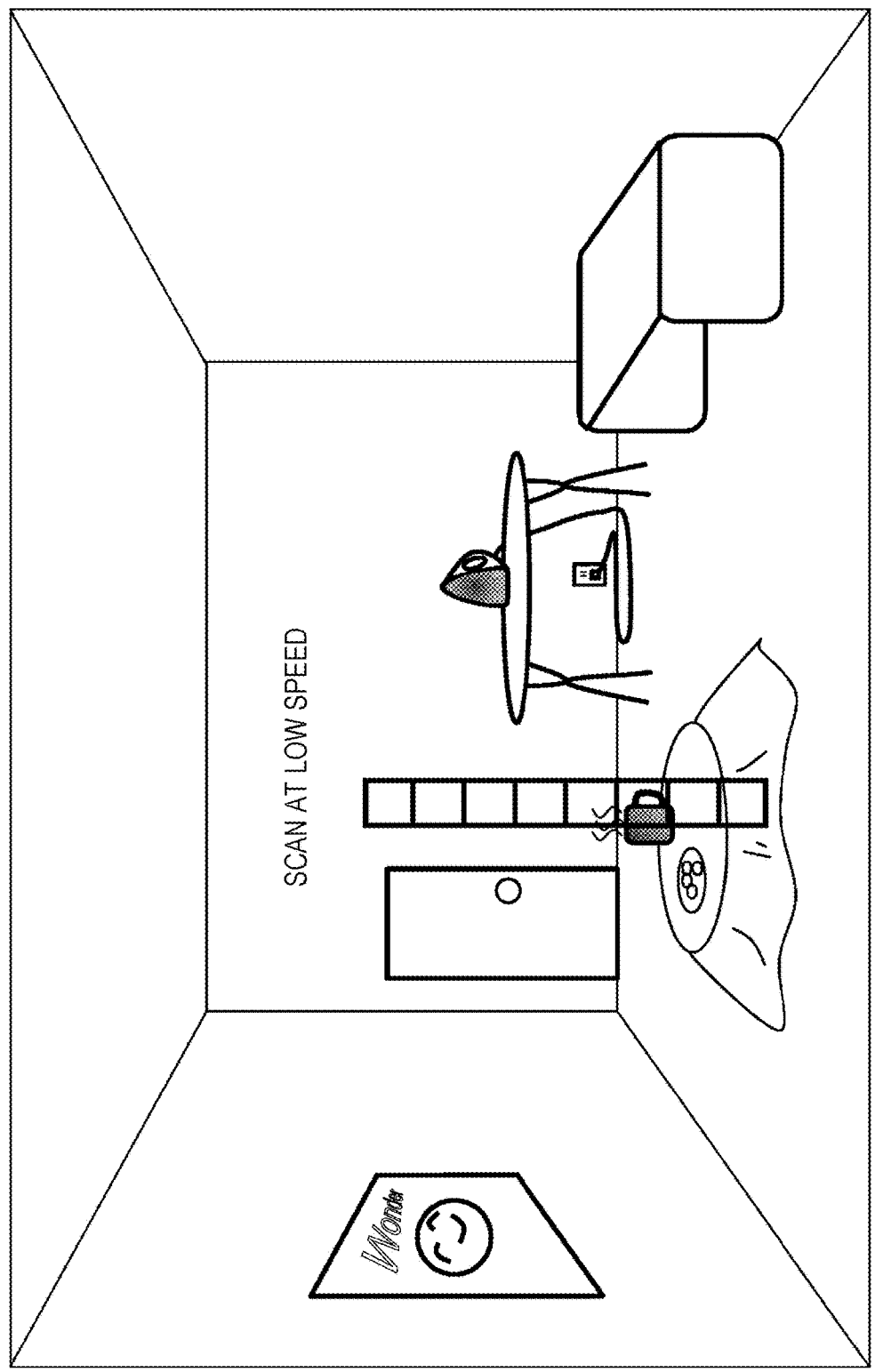

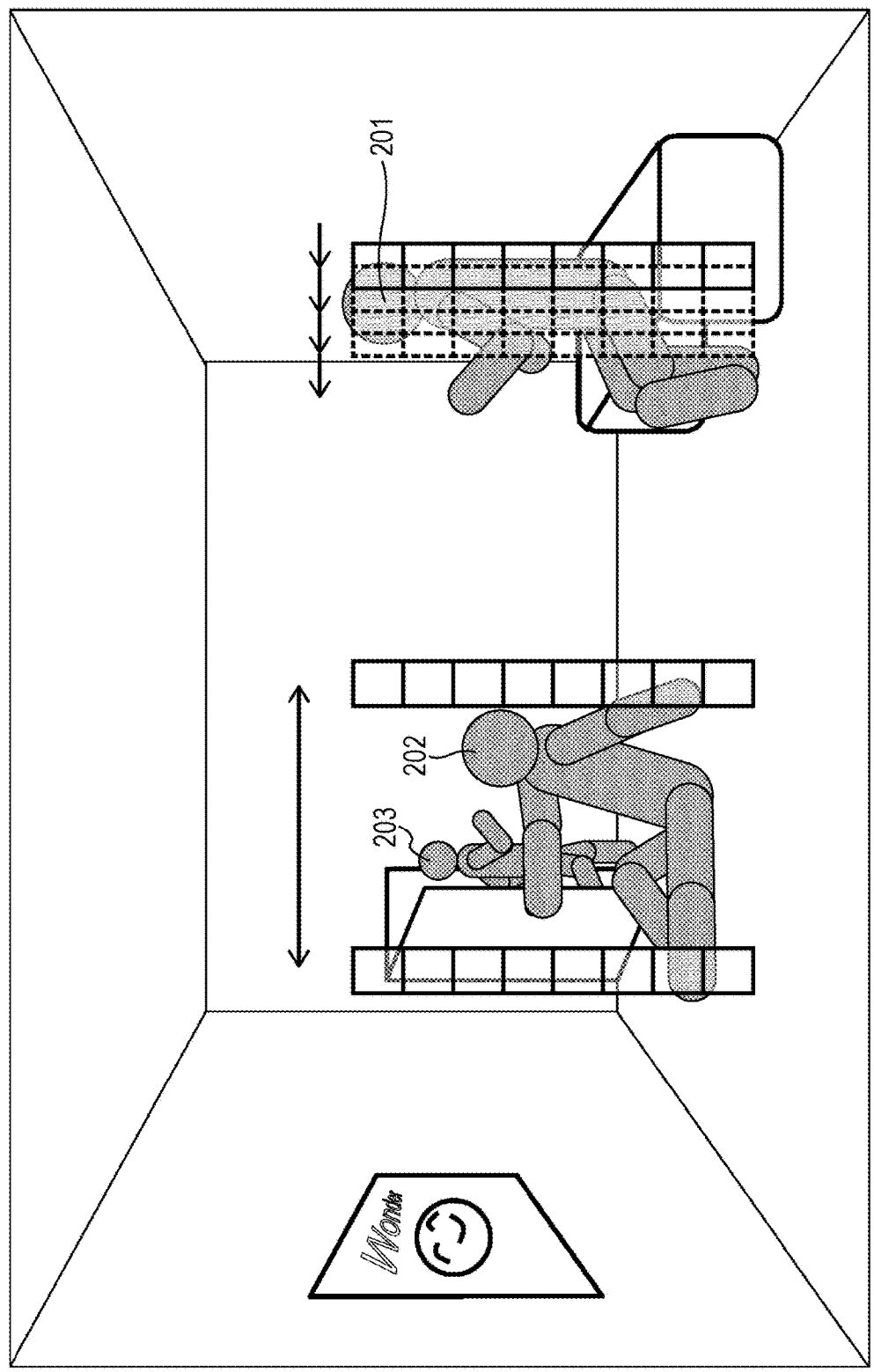

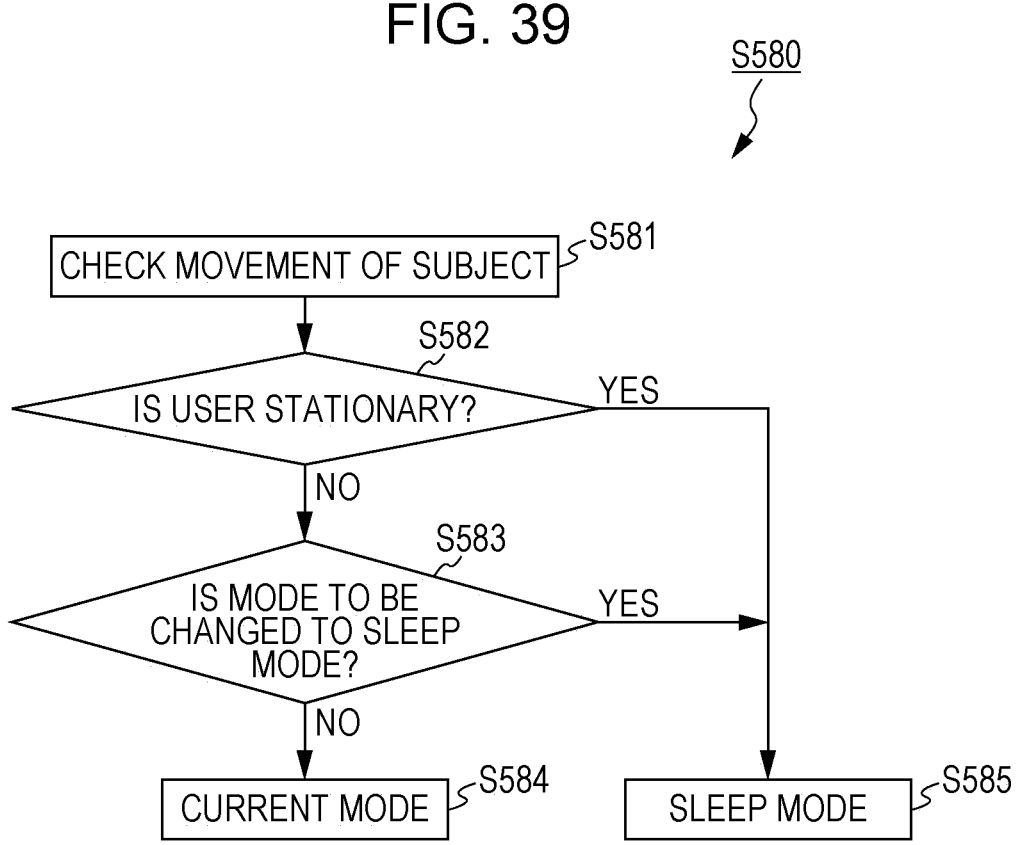

SENSOR CONTROL METHOD EXECUTED BY AIR-CONDITIONING APPARATUS

BACKGROUND

1. Technical Field

The present disclosure relates to a sensor control method executed by an air-conditioning apparatus. More specifically, the present disclosure relates to, for air conditioning and other applications, an infrared-sensor control scheme and image processing that enhance the recognition performance of an infrared sensor and that enhance the image resolution of a thermal image acquired by the infrared sensor.

2. Description of the Related Art

For air-conditioning apparatuses, infrared sensors have been utilized to obtain the temperature environment and the presence of people in an air-conditioned space. The air-conditioning apparatuses utilize data of the temperature environment and the presence of people to control an air temperature, the direction of an air flow, the strength of the air flow, and so on to thereby realize comfortable air conditions for the people in the air-conditioned space. The air-conditioning apparatuses may also utilize the data for other applications, such as detecting a fire in the air-conditioned space and issuing a fire alarm.

Infrared sensors are classified into two types according to their structures. One of the types is a line infrared sensor in which infrared light-receiving elements are arranged in one line. A line infrared sensor described below in the present disclosure also encompasses an infrared sensor in which infrared light-receiving elements are arranged in a plurality of lines. The other type is a matrix infrared sensor in which infrared light-receiving elements are arranged in a flat plane. Although the present disclosure will be described using mainly a line infrared sensor, a matrix infrared sensor may also be used.

In order to obtain a thermal image of an air-conditioned space, the line infrared sensor scans an entire area of interest. Line image data acquired at different scan angles are used to construct a planar image for subsequent image processing for recognizing a target object or a thermal event in the air-conditioned space. However, since the number of infrared light-receiving elements in the line infrared sensor is small, the resolution of the acquired planar image is low. Consequently, details of a target object or a thermal event in the air-conditioned space can hardly be recognized.

In order to overcome the problem of the low resolution, super-resolution reconstruction, which is one type of image processing method, is utilized. The super-resolution reconstruction is performed as countermeasures against image deterioration due to image digitization involving a motion effect, a bokeh effect, and a downsampling effect. Obtaining different views of an image by utilizing optical characteristics of the infrared sensor in conjunction with the image processing makes it possible to enhance the resolution of the image. Accordingly, it is possible to better recognize details of a target object or a thermal event in the air-conditioned space without involving an increase in the number of infrared light-receiving elements in the infrared sensor, the increase causing an increase in the cost of the infrared sensor.

SUMMARY

In one general aspect, the techniques disclosed here feature a sensor control method executed by an air-conditioning apparatus including a linear infrared sensor constituted by a plurality of infrared light-receiving elements. The sensor control method includes: acquiring a first thermal image by scanning an air-conditioned space using the infrared sensor in accordance with a first scanning scheme, the air-conditioning apparatus being placed in the air-conditioned space; extracting a subject thermal image from the first thermal image, based on a difference between a background thermal image of the air-conditioned space when no subject is present therein and the first thermal image; determining a second scanning scheme different from the first scanning scheme, when the subject thermal image has a size smaller than a threshold size; and acquiring a second thermal image by scanning an area corresponding to the subject thermal image of the air-conditioned space using the infrared sensor in accordance with the determined second scanning scheme.

In the above-described configuration, of the extracted subject thermal image, only a particular area that is smaller than a threshold size can be re-scanned using the second scanning scheme. Accordingly, it is possible to efficiently acquire a thermal image of the air-conditioned space.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 18 is a schematic view illustrating use case 1-2 of the air-conditioning apparatus;

FIG. 19 is a schematic view illustrating use case 1-2 of the air-conditioning apparatus;

FIG. 28 is a schematic view illustrating use case 2-3 of the air-conditioning apparatus;

FIG. 39 is a flowchart illustrating one example of the processing executed by the air-conditioning apparatus according to the fourth embodiment.

DETAILED DESCRIPTION

Figure 1:
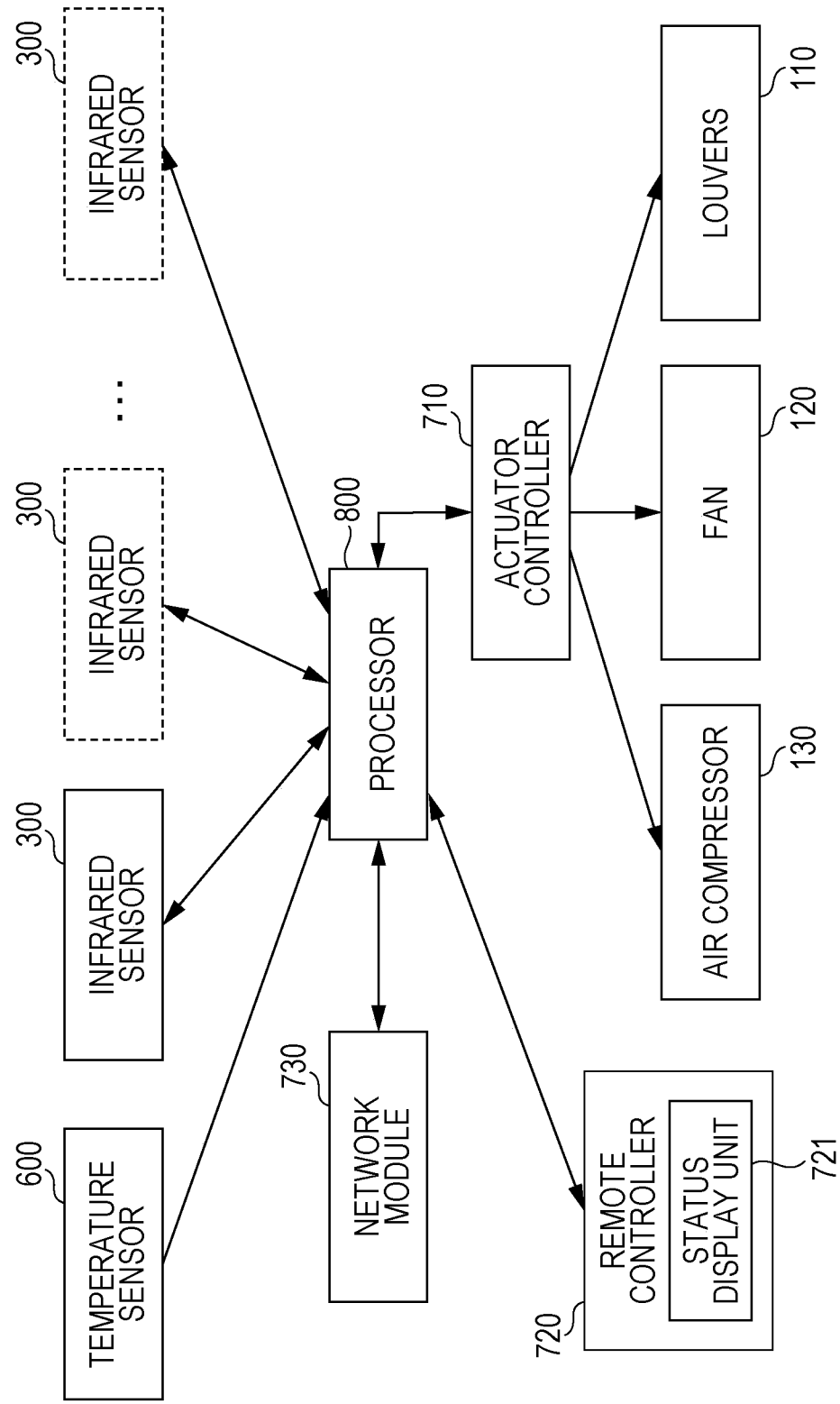
FIG. 1 is a schematic block diagram illustrating one example of a general configuration of an air-conditioning apparatus.

Some embodiments according to the present technology will be described below with reference to the accompanying drawings. The principle of the present technology can be clearly understood from the following description. In addition to the embodiments described below, an arbitrary combination of the embodiments or some portions of the embodiments can also be applied to the present technology.

First, a description will be given of items that the present inventors have studied in order to disclose aspects according to the present disclosure.

(Knowledge and Findings Underlying Present Disclosure)

In the related technique and technology disclosed in Japanese Patent No. 5111417, a vertical-line infrared sensor is used to scan an air-conditioned space in order to obtain thermal image data of the entire air-conditioned space. The thermal image data is then used to reconstruct a high-resolution thermal image of the entire air-conditioned space by performing super-resolution reconstruction. The reconstructed high-resolution thermal image of the entire area in the air-conditioned space is then utilized to more accurately and precisely obtain the position and thermal states of a thermal event or a target object in the air-conditioned space.

However, the reconstructed high-resolution thermal image in Japanese Patent No. 5111417 noted above is an image about the entire area in the air-conditioned space and is not limited to a particular area of interest. Thus, since the thermal image data used for the super-resolution reconstruction is too large, it requires a computational cost for utilizing a plurality of portions of the reconstructed high-resolution thermal image. Consequently, a large amount of computational load leads to an increase in the amount of energy consumption and a decrease in the computational efficiency. Moreover, since scanning the entire area in the air-conditioned space requires a large amount of time, a delay occurs in control processing in the air-conditioning apparatus. Also, an algorithm for the super-resolution reconstruction that can depend on different areas in the air-conditioned space has no flexibility.

In the present technology, a trigger event is used to identify a particular area of interest in the air-conditioned space in order to perform the super-resolution reconstruction. Requirements for the super-resolution reconstruction and an algorithm therefor are determined according to features of the particular area of interest. As will be detailed in the description of the present technology, various types of trigger event are available and give rise to different movement patterns of the infrared sensor.

With the above-described configuration, the super-resolution reconstruction can be performed on only a particular area of interest in the air-conditioned space for which necessary information is required. Accordingly, the amount of energy consumption and the efficiency of computation can be increased, and the control processing for the air-conditioning apparatus can be executed with a small amount of delay through use of the obtained thermal image data. In addition, the flexibility of the super-resolution reconstruction processing increases, thus making it possible to acquire an appropriate reconstructed high-resolution thermal image for each application.

According to the present disclosure, there is provided a sensor control method executed by an air-conditioning apparatus including a linear infrared sensor constituted by a plurality of infrared light-receiving elements. The sensor control method includes: acquiring a first thermal image by scanning an air-conditioned space using the infrared sensor in accordance with a first scanning scheme, the air-conditioning apparatus being placed in the air-conditioned space; extracting a subject thermal image from the first thermal image, based on a difference between a background thermal image of the air-conditioned space when no subject is present therein and the first thermal image; determining a second scanning scheme different from the first scanning scheme, when the subject thermal image has a size smaller than a threshold size; and acquiring a second thermal image by scanning an area corresponding to the subject thermal image of the air-conditioned space using the infrared sensor in accordance with the determined second scanning scheme.

With this control, of the extracted subject thermal image, only a particular area that is smaller than a threshold size can be re-scanned using the second scanning scheme. Thus, it is possible to efficiently acquire a thermal image of the air-conditioned space.

In the determining of the second scanning scheme, the second scanning scheme may be determined based on a resolution of the subject thermal image and a resolution needed by the air-conditioning apparatus. In this case, the second scanning scheme may differ from the first scanning scheme in a scanning speed. The second scanning scheme may differ from the first scanning scheme in scan intervals.

With this control, it is possible to acquire an optimum thermal image for the air-conditioning apparatus.

In the extracting of the subject thermal image, a pixel area where a temperature difference from the background thermal image is larger than a predetermined threshold temperature, the pixel area being included in the first thermal image, may be extracted as the subject thermal image.

With this control, it is possible to enhance the detection accuracy of a subject.

The control method may further include: acquiring a re-scanned thermal image by re-scanning an area corresponding to the subject thermal image using the infrared sensor in accordance with the first scanning scheme, after the subject thermal image is extracted in the extracting of the subject thermal image; and detecting a thermal image change that occurs between the first thermal image and the re-scanned thermal image. In the determining of the second scanning scheme, when the thermal image change detected in the detecting of the thermal image change is smaller than a predetermined value, the second scanning scheme may be determined.

With this control, it is possible to perform appropriate control on a moving subject.

The infrared sensor may be used to acquire the background thermal image in a state in which an air flow blown by the air-conditioning apparatus is applied to a particular area in the air-conditioned space. Iterative scanning may be performed on the particular area. A frequency of scanning the particular area may also be changed.

With this control, it is possible to enhance the detection accuracy of a subject.

The control method may further include executing super-resolution reconstruction processing by using the second thermal image. The control method may further include: providing air-conditioning control for a subject via the air-conditioning apparatus, in accordance with a result of the super-resolution reconstruction processing; and/or issuing a notification regarding a state of a subject, in accordance with a result of the super-resolution reconstruction processing.

With this control, it is possible to acquire a thermal image of the air-conditioned space with a high resolution.

<Overview of Air-Conditioning Apparatus>

First, an overview of an air-conditioning apparatus 100 relevant to all embodiments in the present disclosure will be described with reference to FIGS. 1 to 3.

FIG. 1 is a schematic block diagram illustrating one example of a general configuration of the air-conditioning apparatus 100. FIG. 2 is a diagram illustrating an example of the hardware configuration of a processor 800 illustrated in FIG. 1. FIG. 3 is a schematic view of one example of the external configuration of the air-conditioning apparatus 100.

(1) General Configuration of Air-Conditioning Apparatus

The air-conditioning apparatus 100 disclosed herein and illustrated in the schematic block diagram in FIG. 1 includes left and right louvers 110, a fan 120, an air compressor 130, an infrared sensor 300, a temperature sensor 600, an actuator controller 710, a remote controller 720, a network module 730, and the processor 800. The number of infrared sensors 300 may be one or more. The blocks of the infrared sensors 300 denoted by dashed lines represent infrared sensors that may be added or eliminated according to the form of the air-conditioning apparatus 100.

The air-conditioning apparatus 100 does not necessarily have to be configured by all of the above-described components. Some of the components may be removed or new components may be added. For example, the remote controller 720 may be removed from the air-conditioning apparatus 100, or a speaker and a microphone may be provided in the air-conditioning apparatus 100 to perform interaction with a user.

Each infrared sensor 300 obtains thermal data of a subject in an air-conditioned space (e.g., a room) where the air-conditioning apparatus 100 is installed. The infrared sensor 300 may be implemented by, for example, a thermopile sensor, a pyroelectric sensor, or a bolometer. The temperature sensor 600 obtains a temperature in the air-conditioned space. The temperature sensor 600 may be, for example, a general thermometer. The data obtained by the infrared sensor 300 and data obtained by the temperature sensor 600 are transferred to the processor 800.

The actuator controller 710 controls predetermined actuators. The predetermined actuators include the louvers 110, the fan 120, and the air compressor 130 in the air-conditioning apparatus 100. The actuator controller 710 recognizes status data of the predetermined actuators and transfers the status data to the processor 800 in response to a request.

By using the remote controller 720, a user of the air-conditioning apparatus 100 sends an instruction or a request to the processor 800. In addition, the remote controller 720 obtains data of the current status of the air-conditioning apparatus 100 from the processor 800 and causes the status to be displayed to the user on a status display unit 721 of the remote controller 720. The status display unit 721 may be, for example, a touch-sensor-type display unit that allows the user to input data or to perform interaction.

The network module 730 connects the air-conditioning apparatus 100 to a network, such as a local network or the Internet. Data in the air-conditioning apparatus 100 may be transferred to the network via the network module 730. In addition, the air-conditioning apparatus 100 may receive data in the network via the network module 730.

The processor 800 obtains data from a connected configuration and processes the data in accordance with a program or an application. The program or application may be held in a network connected via the network module 730 or may be stored in the processor 800. By using the processed data, the processor 800 determines an instruction for the actuator controller 710 to control the state of the air in the air-conditioned space by using the actuators, such as the louvers 110, the fan 120, and the air compressor 130. For example, after obtaining a temperature in the air-conditioned space, when the processor 800 recognizes that the current temperature and a requested temperature set by the user via the remote controller 720 differ from each other, the processor 800 outputs a difference between the current room temperature and the requested temperature to the actuator controller 710. The actuator controller 710 controls the actuators in accordance with the temperature difference output from the processor 800.

The processed data is further used to determine an instruction to be issued to the infrared sensor 300 in order to obtain thermal data of a particular subject. For example, when no one is present in the air-conditioned space, the processor 800 instructs the infrared sensor 300 so as to perform coarse and high-speed scanning, and when a human is present in the air-conditioned space, the processor 800 instructs the infrared sensor 300 so as to perform fine and low-speed scanning.

Not only does the processor 800 obtain a request from the user via the remote controller 720, but also it transfers various types of data to the remote controller 720 in order to interact with the user or to display the data to the user. Examples of such various types of data include the current state of the air in the air-conditioned space, current thermal data of the user, thermal data of the user or the air-conditioned space which was obtained in the past, and data, an application, a program, or the like obtained from a network connected via the network module 730. The status display unit 721 may be an interface having a touch-sensor display unit that allows the user to input data to the application and/or the program or to perform interaction therewith.

Also, not only does the processor 800 process data therein, but also it may transfer data to the network connected via the network module 730, in order to process the data at a specific destination address. The specific destination address may be a network server, a distributed computer network, a cloud computational service, or the like. After the data is processed in the connected network, the processor 800 may obtain the processed data in order to use it in the air-conditioning apparatus 100.

Also, not only does the processor 800 store data therein, but also it may transfer data to the network connected via the network module 730, in order to store the data at the specific destination address. The specific destination address may be of a network server, a distributed network storage, a cloud storage service, or the like.

Software and an operating system for the processor 800 may be updated utilizing data transfer from a network connected via the network module 730.

In addition, the program or application executed by the processor 800 is not limited to an initially installed program or application and may be a program or application newly downloaded from a network connected via the network module 730. By using the remote controller 720, the user may request downloading of the program or application.

The user may connect to the air-conditioning apparatus 100 over the network connected to the network module 730. For example, the user may use a smartphone as a device for communicating with the air-conditioning apparatus 100 by connecting the smartphone to the network connected to the network module 730 in the air-conditioning apparatus 100. A smartphone may be utilized in order to transmit the users request to the air-conditioning apparatus 100 or in order to obtain data from the air-conditioning apparatus 100.

(2) Hardware Configuration of Processor

Figure 2:
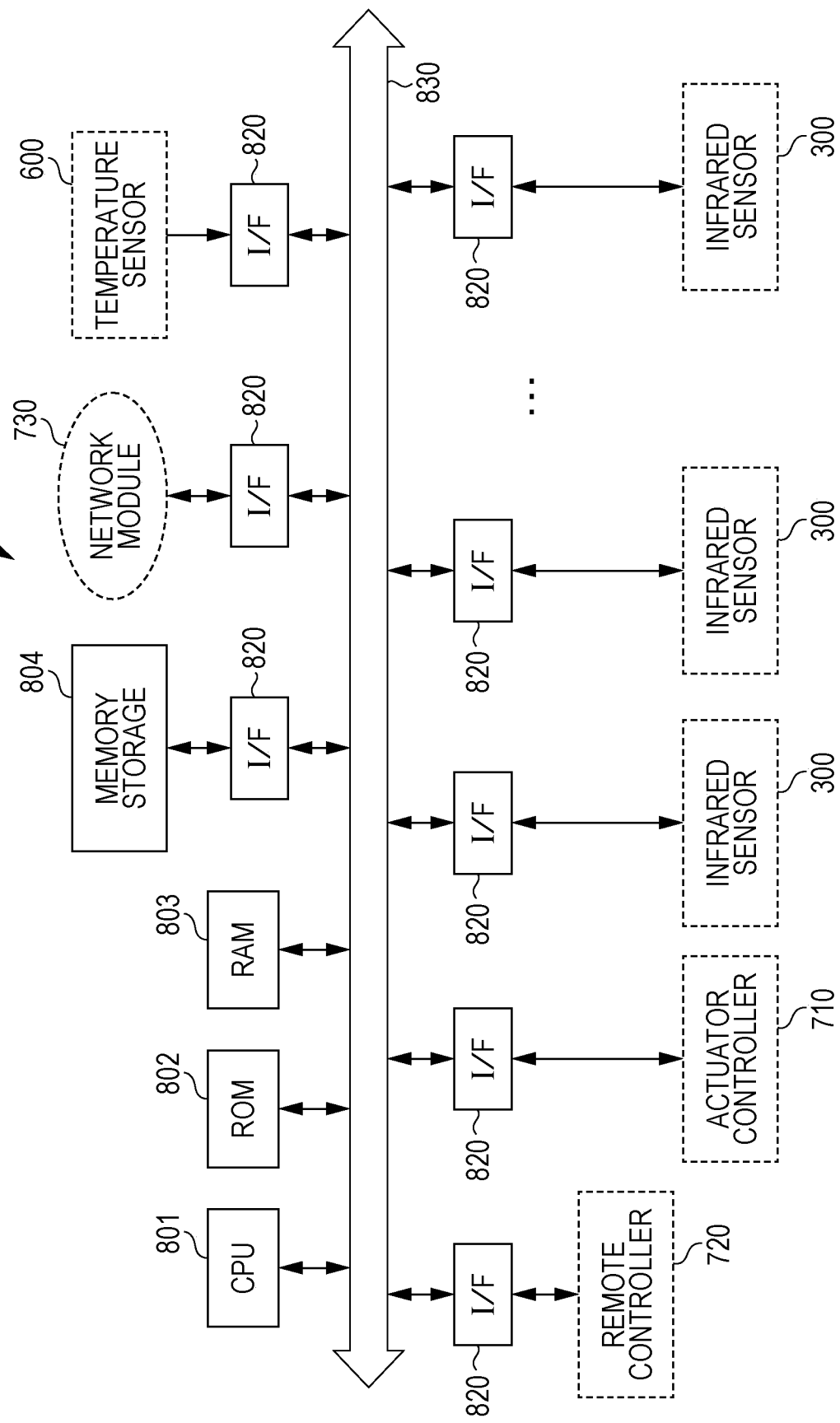
FIG. 2 is a diagram illustrating an example of the hardware configuration of a processor illustrated in FIG. 1.

FIG. 2 illustrates an example of the hardware configuration of the processor 800. The elements denoted by dashed lines in FIG. 2 indicate that the elements are provided outside the processor 800 and are depicted in order to clarify connections between the elements in the processor 800 and the elements outside thereof.

The processor 800 includes a central processing unit (CPU) 801, a read-only memory (ROM) 802, a random-access memory (RAM) 803, a memory storage 804, interfaces (denoted as "I/F" in FIG. 2) 820, and a bus 830.

The ROM 802 holds a predetermined computer program that defines a basic operation of the processor 800 and data. The memory storage 804 may have a flash memory, a solid-state drive, or a hard-disk drive. The memory storage 804 holds other computer programs, applications, and data for the air-conditioning apparatus 100. The programs, applications, and data stored in the memory storage 804 may be updated, changed, or modified in accordance with the user's request transmitted using the remote controller 720 or the smartphone through the network connected via the network module 730. In addition, the programs, the applications, and the data stored in the memory storage 804 may be automatically updated in accordance with an instruction from a server in the network connected via the network module 730.

The CPU 801, the ROM 802, and the RAM 803 are connected to the bus 830. The memory storage 804 is connected to the bus 830 via the corresponding interface 820. The external elements, that is, the infrared sensors 300, the temperature sensor 600, the actuator controller 710, the remote controller 720, and the network module 730, denoted by dashed lines are connected to the bus 830 in the processor 800 via the corresponding interfaces 820.

The CPU 801 reads a computer program or data for a basic operation from the ROM 802 through the bus 830 and reads other computer programs, applications, and data from the memory storage 804 through the interface 820 and the bus 830. During operation of the CPU 801, the RAM 803 may temporarily store a computer program and data. In the present embodiment, the CPU 801 is a single CPU. Alternatively, a plurality of CPUs may be used as the processor 800.

The processor 800 and the remote controller 720 may be connected to each other over radio signals. In this case, for example, a module (not illustrated) for transmitting/receiving the radio signals may be provided between the processor 800 and the remote controller 720.

Data that the CPU 801 obtains from the infrared sensors 300, the temperature sensor 600, the actuator controller 710, the remote controller 720, and the network module 730, which are external units, may be transferred to the RAM 803 or the memory storage 804 through the interface 820 and the bus 830, before the data is used by CPU 801.

(3) External Configuration of Air-Conditioning Apparatus

Figure 3:
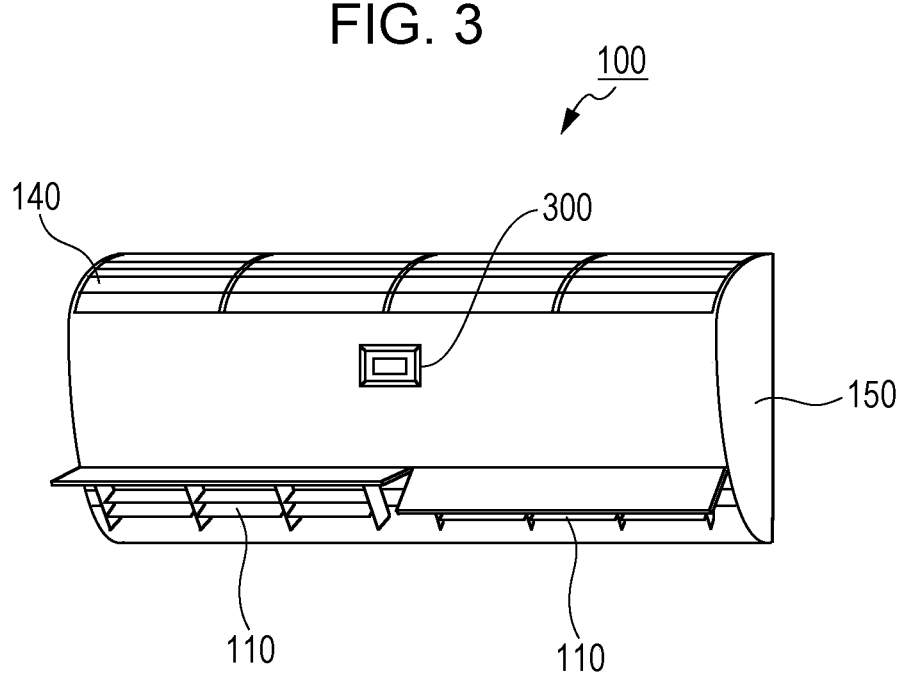
FIG. 3 is a schematic view of one example of the external configuration of the air-conditioning apparatus.

FIG. 3 is a schematic view of one example of the external configuration of the air-conditioning apparatus 100. The air-conditioning apparatus 100 illustrated in FIG. 3 is the so-called air conditioner, and the left and right louvers 110, an air inlet 140, and the infrared sensor 300 are provided in/on a housing 150 of the air-conditioning apparatus 100.

Structure Example 1 of Infrared Sensor

Figure 4A:
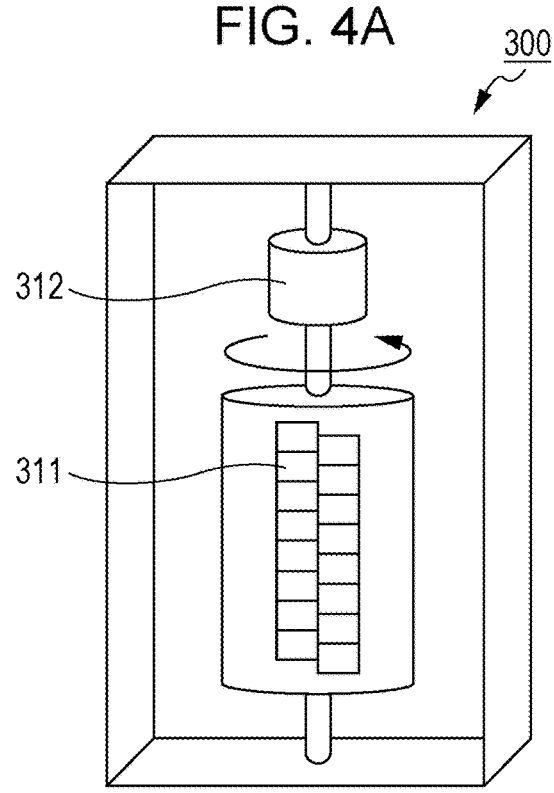
FIG. 4A is a schematic view of structure example 1 of an infrared sensor.
Figure 4B:
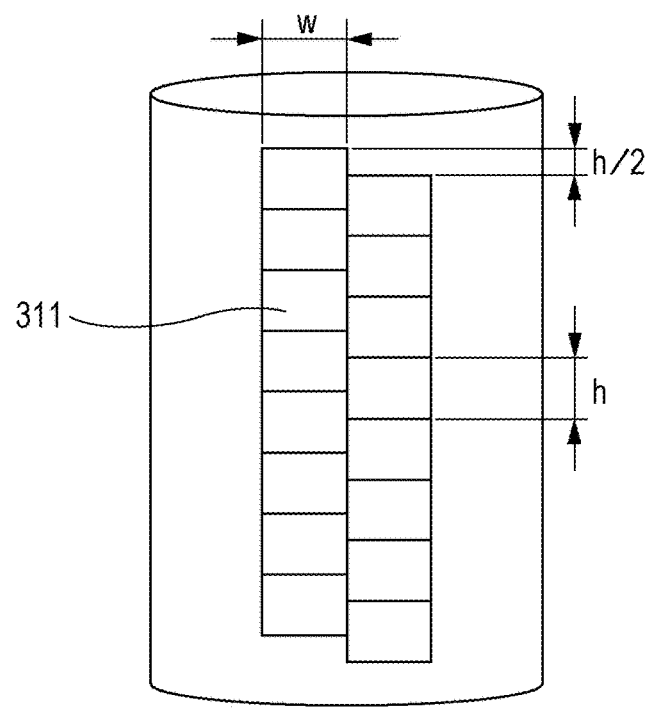
FIG. 4B is a schematic view of structure example 1 of the infrared sensor.

FIGS. 4A and 4B are schematic views of one example (structure example 1) of the structure of the infrared sensor 300. As illustrated in FIG. 4A, the infrared sensor 300 in structure example 1 is a linear infrared sensor having a configuration including an element body and a pan motor 312. The element body has a plurality of infrared light-receiving elements 311.

FIG. 4B is an enlarged view of the plurality of infrared light-receiving elements 311 in the infrared sensor 300 illustrated in FIG. 4A.

As illustrated in the enlarged view in FIG. 4B, the plurality of infrared light-receiving elements 311 are configured such that two line element groups, each including two or more infrared light-receiving elements 311 (eight infrared light-receiving elements in the example in FIGS. 4A and 4B) arranged in one line, are juxtaposed on a surface of the element body. The two juxtaposed line element groups have the same number of infrared light-receiving elements 311 and are arranged shifted by an amount corresponding to a half of the height (h) of one infrared light-receiving element 311. The plurality of infrared light-receiving elements 311 may be implemented by bolometers, thermopiles, or quantum-type detection elements. Each quantum-type detection element may be an indium antimonide (InSb) detector, a mercury cadmium telluride (HgCdTe) detector, or an indium gallium arsenide (InGaAs) detector. The number of infrared light-receiving elements 311 in each line element group may be 16 or 32, other than 8.

The pan motor 312 is connected to a rotation shaft of the element body, the rotation shaft being provided parallel to the direction in which the infrared light-receiving elements 311 are aligned in one line. The pan motor 312 rotates the rotation shaft to thereby rotate the element body. The pan motor 312 is used to pan the plurality of infrared light-receiving elements 311 in a horizontal direction orthogonal to the direction in which the infrared light-receiving elements 311 are aligned in one line.

Figure 5:
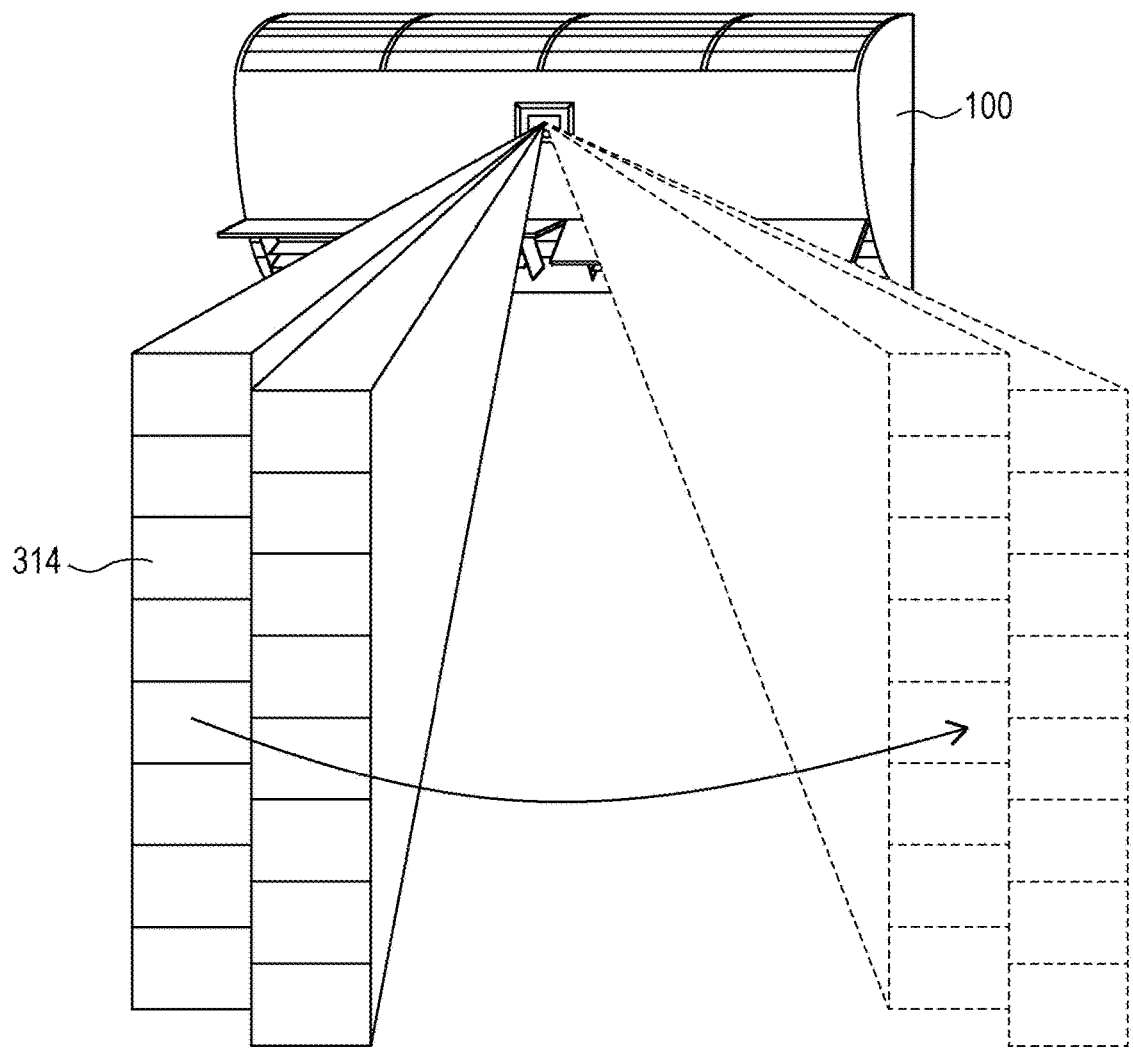
FIG. 5 is a schematic view for describing a scanning scheme of the infrared sensor.

FIG. 5 is a schematic view for describing a scanning scheme of the infrared sensors 300, illustrated in FIGS. 4A and 4B, in order to obtain thermal images of the air-conditioned space. The pan motor 312 rotates the infrared sensor 300 in the horizontal direction to thereby perform the scanning. A plurality of line thermal images 314 acquired by the scanning reflect infrared radiation performed in the direction of the range in the field of view of the infrared sensor 300.

The line thermal images 314 can be acquired by another scanning scheme, as described below.

Figure 6:
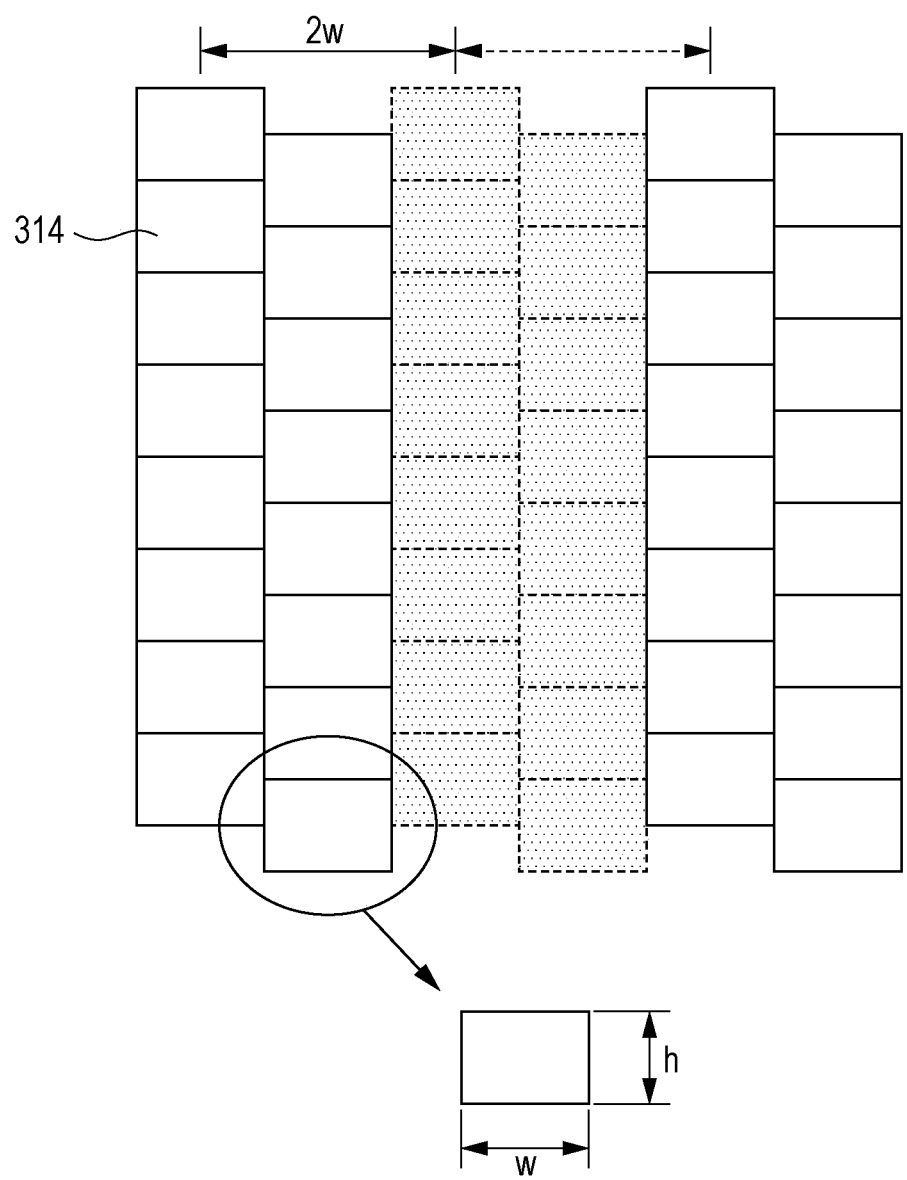
FIG. 6 is a diagram for describing one example of a scanning scheme of the infrared sensor.

FIG. 6 is a diagram for describing one example of a scanning scheme of the infrared sensor 300. In this scanning scheme, the infrared sensor 300 performs horizontal scanning with an interval step of two element widths (2 w) to acquire line thermal images 314 in each step. In order to construct a two-dimensional (2D) thermal image, the acquired line thermal images 314 are arranged in a tile shape, as illustrated in FIG. 6. The smallest element in the two-dimensional thermal image constructed by the scanning scheme has a size corresponding to one of the infrared light-receiving elements 311.

Figure 7:
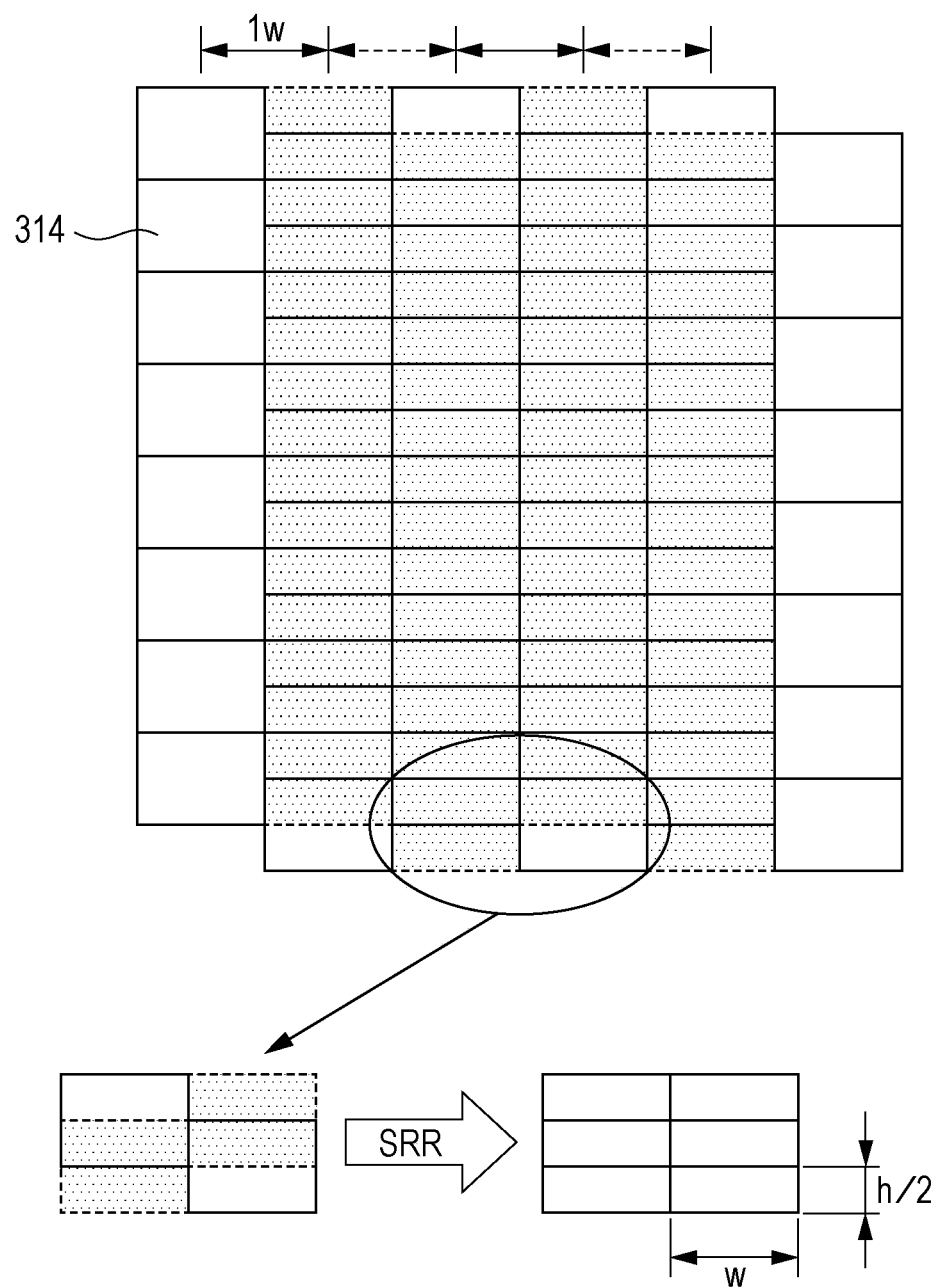
FIG. 7 is a diagram for describing another example of the scanning scheme of the infrared sensor.

FIG. 7 is a diagram for describing another example of the scanning scheme of the infrared sensor 300. In this scanning scheme, the infrared sensor 300 performs horizontal scanning with an interval step of one element width (1 w) to acquire line thermal images 314 in each step. As a result, a two-dimensional thermal image in which the acquired line thermal images 314 are arranged in a tile shape has an overlapping pattern in the direction orthogonal to the scanning direction, as illustrated in FIG. 7. Thus, the resolution of the two-dimensional thermal image reconstructed by the super-resolution reconstruction (SRR) is twice as high along the vertical direction. Hence, the two-dimensional thermal image acquired by the scanning scheme illustrated in FIG. 7 has a resolution that is twice as high as the resolution of the two-dimensional thermal image acquired by the scanning scheme in FIG. 6.

Figure 8:
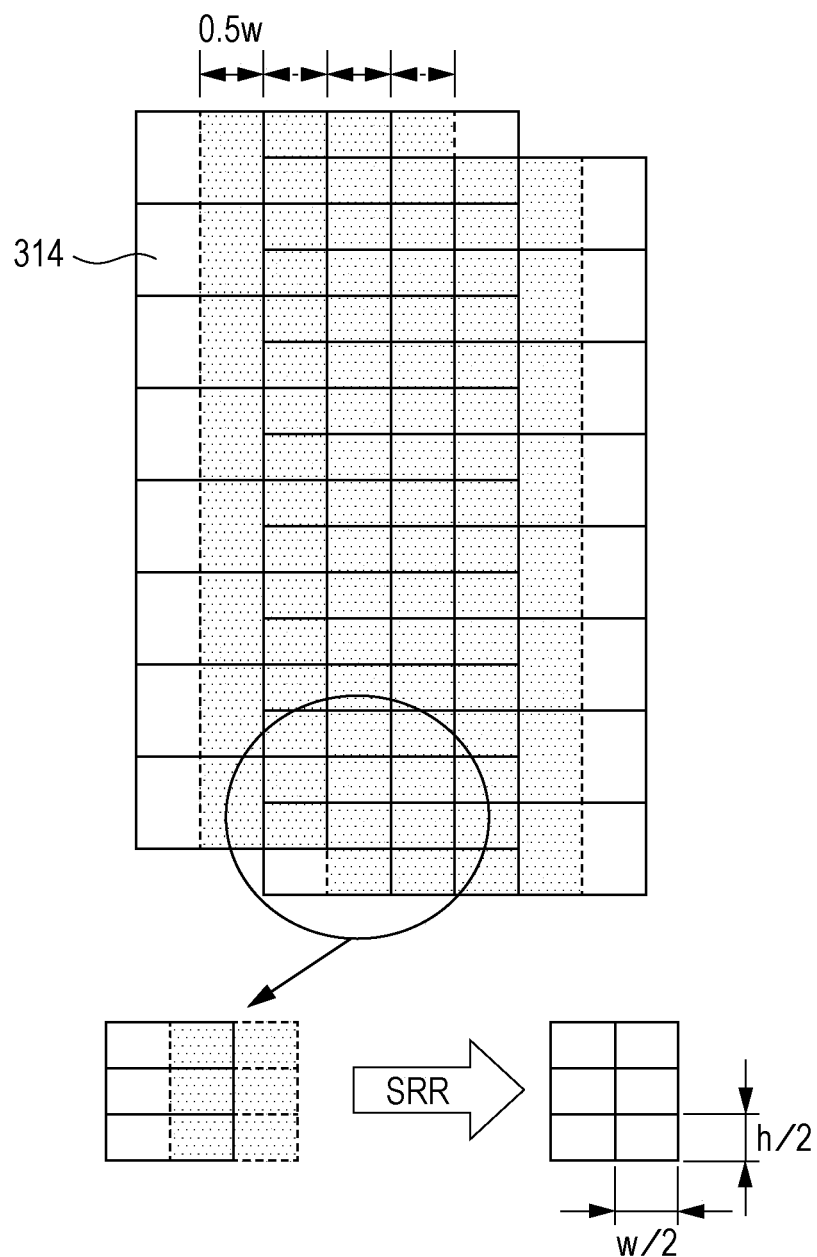
FIG. 8 is a diagram for describing another example of the scanning scheme of the infrared sensor.

FIG. 8 is a diagram for describing another example of the scanning scheme of the infrared sensor 300. In this scanning scheme, the infrared sensor 300 performs horizontal scanning with an interval step of a half element width (0.5 w) to acquire line thermal images 314 in each step. As a result, a two-dimensional thermal image in which the acquired line thermal images 314 are arranged in a tile shape has an overlapping pattern in the scanning direction (the horizontal direction) and the direction orthogonal to the scanning direction, as illustrated in FIG. 8. Thus, the resolution of the two-dimensional thermal image reconstructed by the super-resolution reconstruction (SRR) is twice as high along both the vertical and horizontal directions. Hence, the two-dimensional thermal image acquired by the scanning scheme illustrated in FIG. 8 has a resolution that is four times as high as the resolution of the two-dimensional thermal image acquired by the scanning scheme illustrated in FIG. 6.

Figure 9:
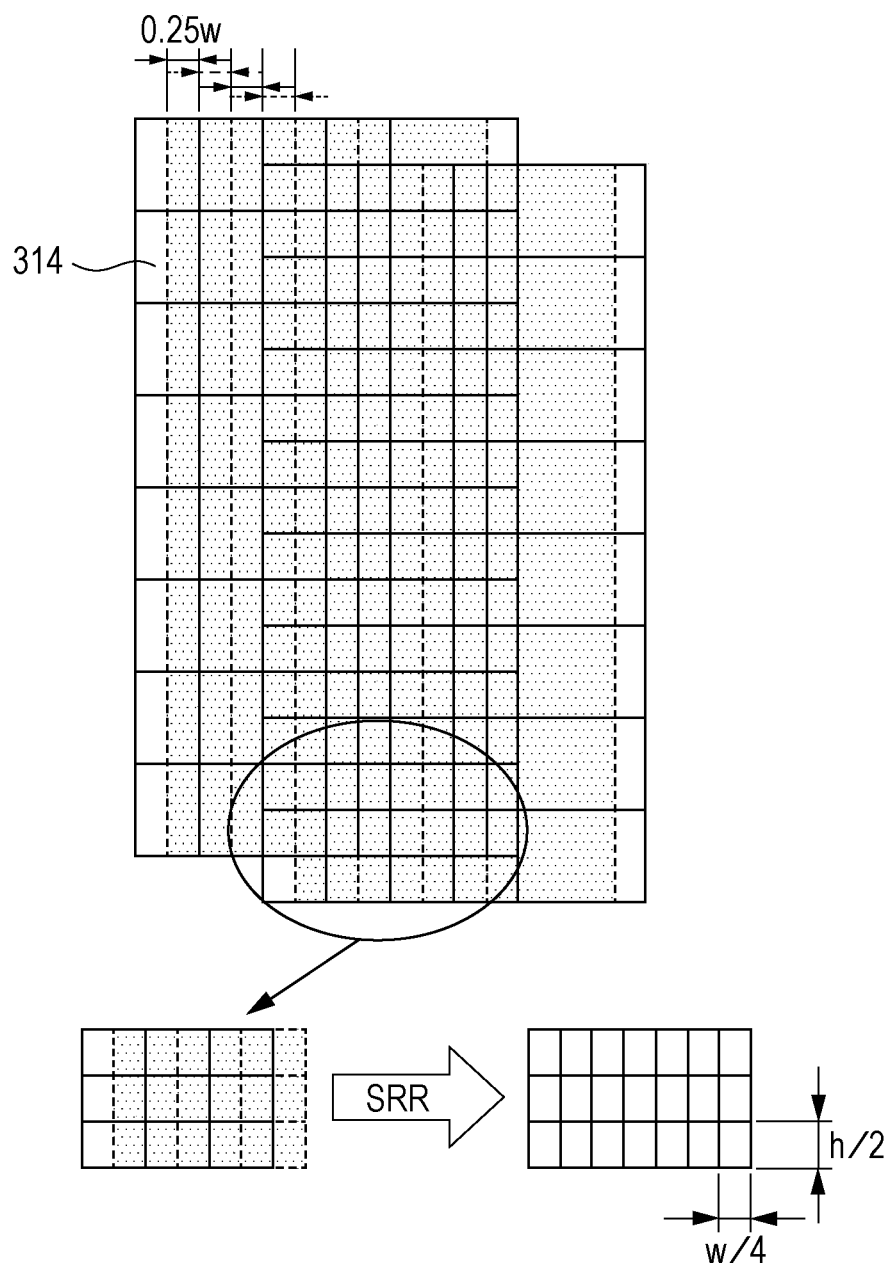
FIG. 9 is a diagram for describing another example of the scanning scheme of the infrared sensor.

FIG. 9 is a diagram for describing another example of the scanning scheme of the infrared sensor 300. In the scanning scheme, the infrared sensor 300 performs horizontal scanning with an interval step of a quarter element width (0.25 w) to acquire line thermal images 314 in each step. As a result, a two-dimensional thermal image in which the acquired line thermal images 314 are arranged in a tile shape has an overlapping pattern in the scanning direction (the horizontal direction) and the direction orthogonal to the scanning direction, as illustrated in FIG. 9. Thus, the resolution of the two-dimensional thermal image reconstructed by the super-resolution reconstruction (SRR) is twice as high along the vertical direction and is four times as high along the horizontal direction. Hence, the two-dimensional thermal image acquired by the scanning scheme illustrated in FIG. 9 has a resolution that is eight times as high as the resolution of the two-dimensional thermal image acquired by the scanning scheme illustrated in FIG. 6.

The scanning schemes described above illustrated in FIGS. 6 to 9 are merely examples. The scanning scheme for obtaining a different resolution of a two-dimensional thermal image is not limited to the scanning schemes described above in FIGS. 6 to 9. Depending on a different application or purpose, a different element width may be used in order to scan a finer or coarser scanning step pattern or gap.

Structure Example 2 of Infrared Sensor

Figure 10A:
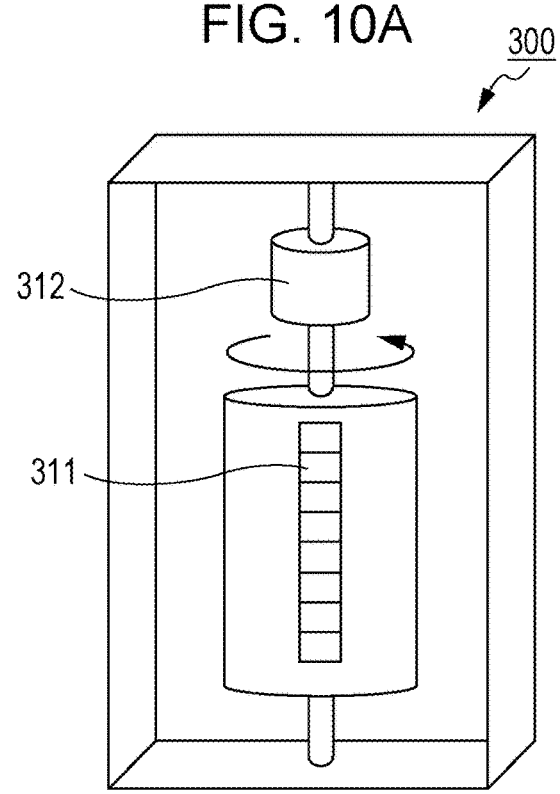
FIG. 10A is a schematic view of structure example 2 of the infrared sensor.
Figure 10B:
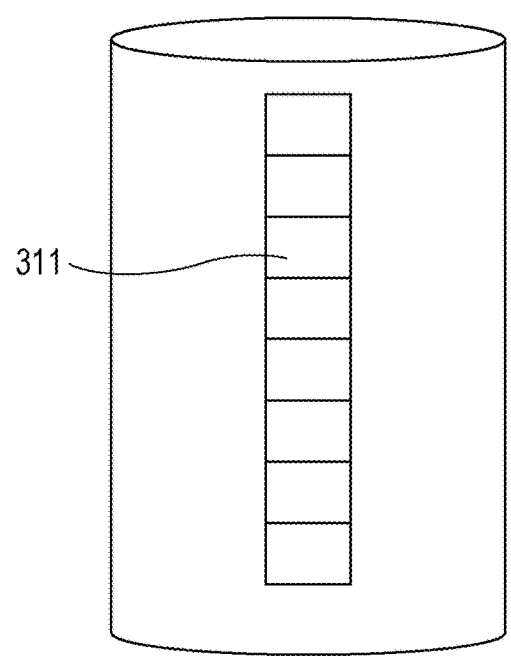
FIG. 10B is a schematic view of structure example 2 of the infrared sensor.

FIGS. 10A and 10B are schematic views of another example (structure example 2) of the structure of the infrared sensor 300. As illustrated in FIG. 10A, the infrared sensor 300 in structure example 2 is a linear infrared sensor having a configuration including an element body and a pan motor 312. The element body has a plurality of infrared light-receiving elements 311.

FIG. 10B is an enlarged view of the plurality of infrared light-receiving elements 311 in the infrared sensor 300 in structure example 2 illustrated in FIG. 10A.

As illustrated in the enlarged view in FIG. 10B, the plurality of infrared light-receiving elements 311 is constituted by two or more infrared light-receiving elements 311 (eight elements in the example in FIGS. 10A and 10B) that are arranged in one line. The structure of the plurality of infrared light-receiving elements 311 and the number of infrared light-receiving elements 311 may be the same as those described above in structure example 1. The pan motor 312 is used to pan the plurality of infrared light-receiving elements 311 in a horizontal direction orthogonal to the direction in which the infrared light-receiving elements 311 are aligned in one line.

A two-dimensional thermal image that the infrared sensor 300 in structure example 2 acquires by performing scanning according to any of the scanning schemes described above in FIGS. 7 to 9 has no overlapping pattern in the vertical direction, unlike the two-dimensional thermal image acquired by the infrared sensor 300 in structure example 1. Accordingly, for example, a structure illustrated in FIG. 11A is employed to shift the plurality of infrared light-receiving elements 311 along the vertical direction.

Figure 11A:
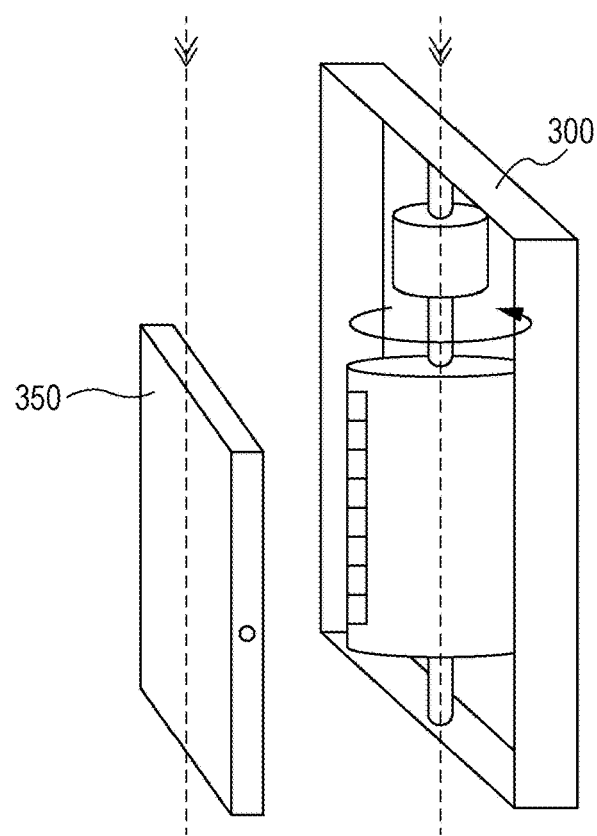
FIG. 11A is a schematic view of one example of the structure of an infrared sensor having an insulating plate.
Figure 11B:
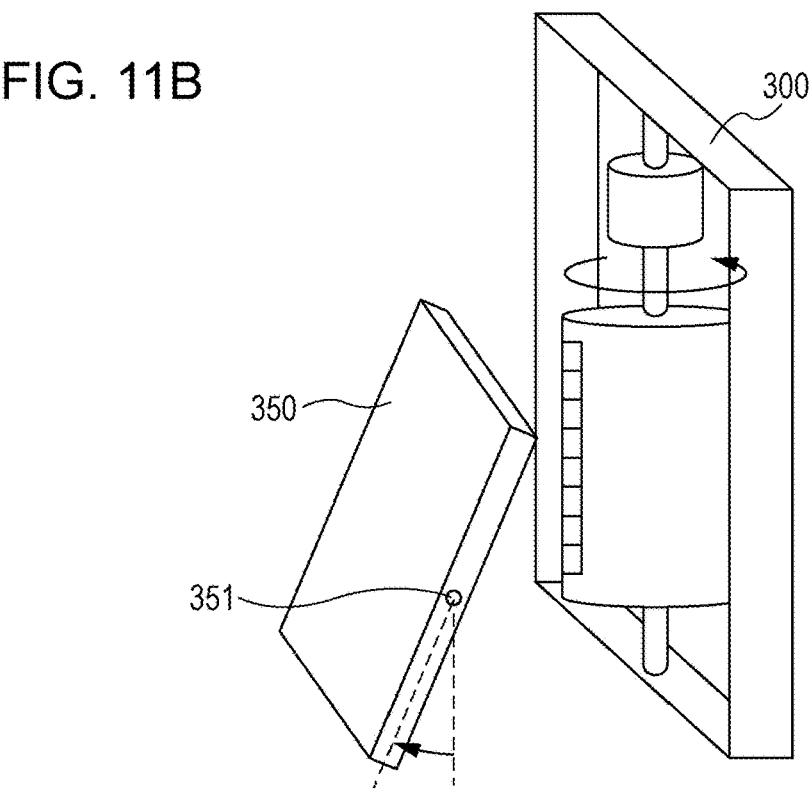
FIG. 11B is a schematic view of one example of the structure of the infrared sensor having the insulating plate.

FIGS. 11A and 11B are schematic views of one example of the structure of an infrared sensor 300 having an insulating plate 350.

Figure 11C:
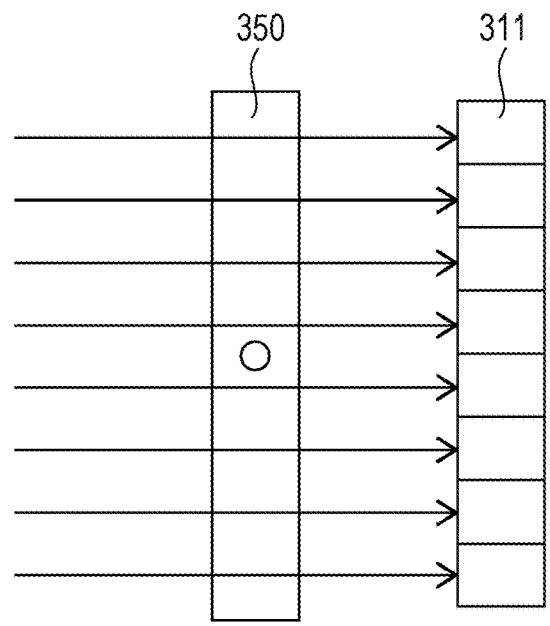
FIG. 11O is a diagram illustrating the state of infrared rays that pass through the insulating plate.
FIG. 11D is a diagram illustrating the state of infrared rays that pass through the insulating plate.

FIG. 11C is a diagram illustrating the state of infrared rays that pass through the insulating plate 350 in the state in FIG. 11A.

FIG. 11O is a diagram illustrating the state of infrared rays that pass through the insulating plate 350 in the state in FIG. 11B.

In the structure in FIG. 11A, the insulating plate 350 that has uniform thicknesses and that allows passage of infrared rays is placed in front of the infrared sensor 300. The insulating plate 350 can be tilted with an arbitrary angle about a rotation shaft 351 that is orthogonal to the rotation shaft of the element body. When an incidence surface of the insulating plate 350 is parallel to a radiation surface of the infrared sensor 300 (FIG. 11A), infrared rays that have reached the insulating plate 350 directly pass (or, are directly transmitted) through the insulating plate 350), as illustrated in FIG. 11O. The infrared rays that have passed through the insulating plate 350 reach the infrared light-receiving elements 311.

Figure 11D:
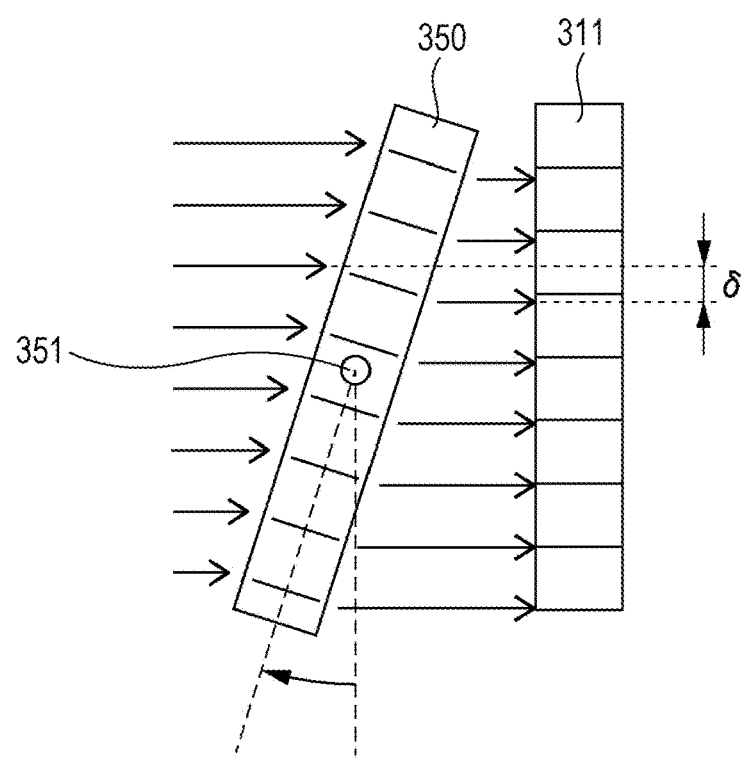

On the other hand, when the incidence surface of the insulating plate 350 is tilted relative to the radiation surface of the infrared sensor 300 (FIG. 11B), infrared rays that have reached the insulating plate 350 are transmitted and output with a displacement 5 in the vertical direction, as illustrated in FIG. 11D. Thus, by tilting the insulating plate 350 with an appropriate angle, it is possible to shift line thermal images 314 to be acquired.

Now, another scheme for tilting the insulating plate 350 will be described for illustrative purposes.

Figure 12A:
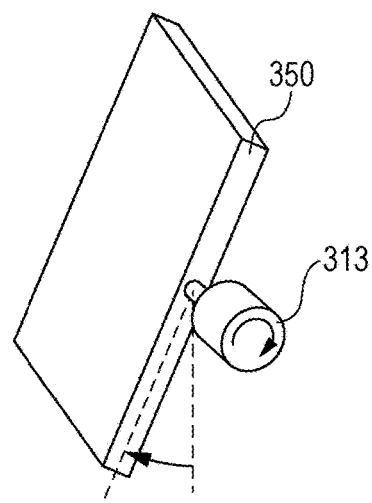
FIG. 12A is a schematic view of one example of a mechanism for tilting the insulating plate.
Figure 12B:
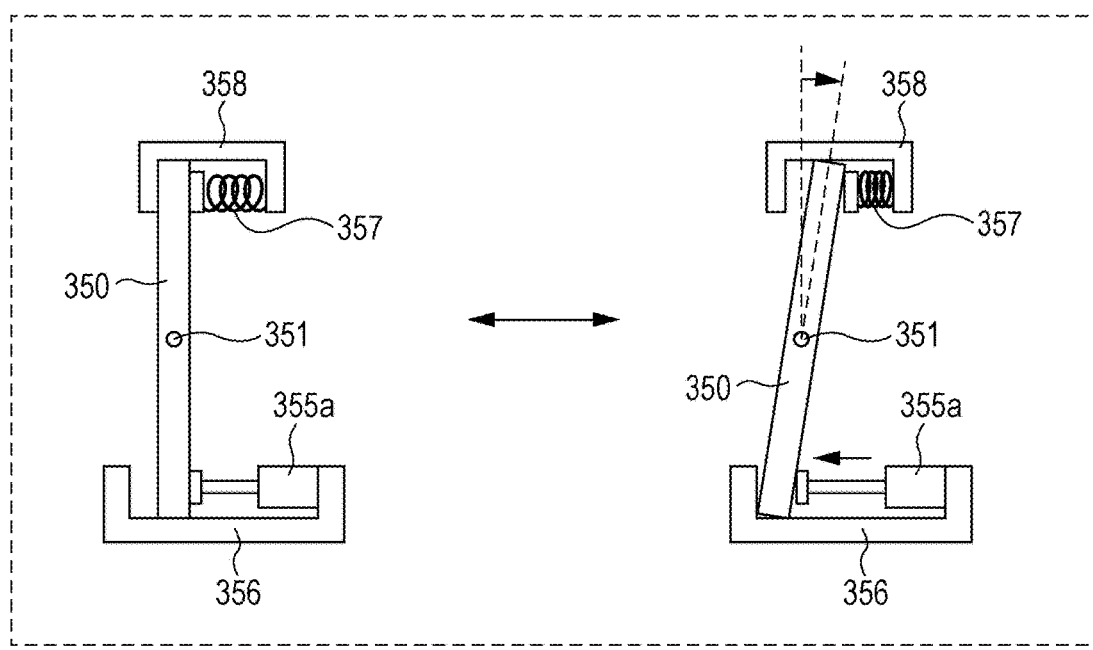
FIG. 12B is a schematic view of one example of a mechanism for tilting the insulating plate.
Figure 12C:
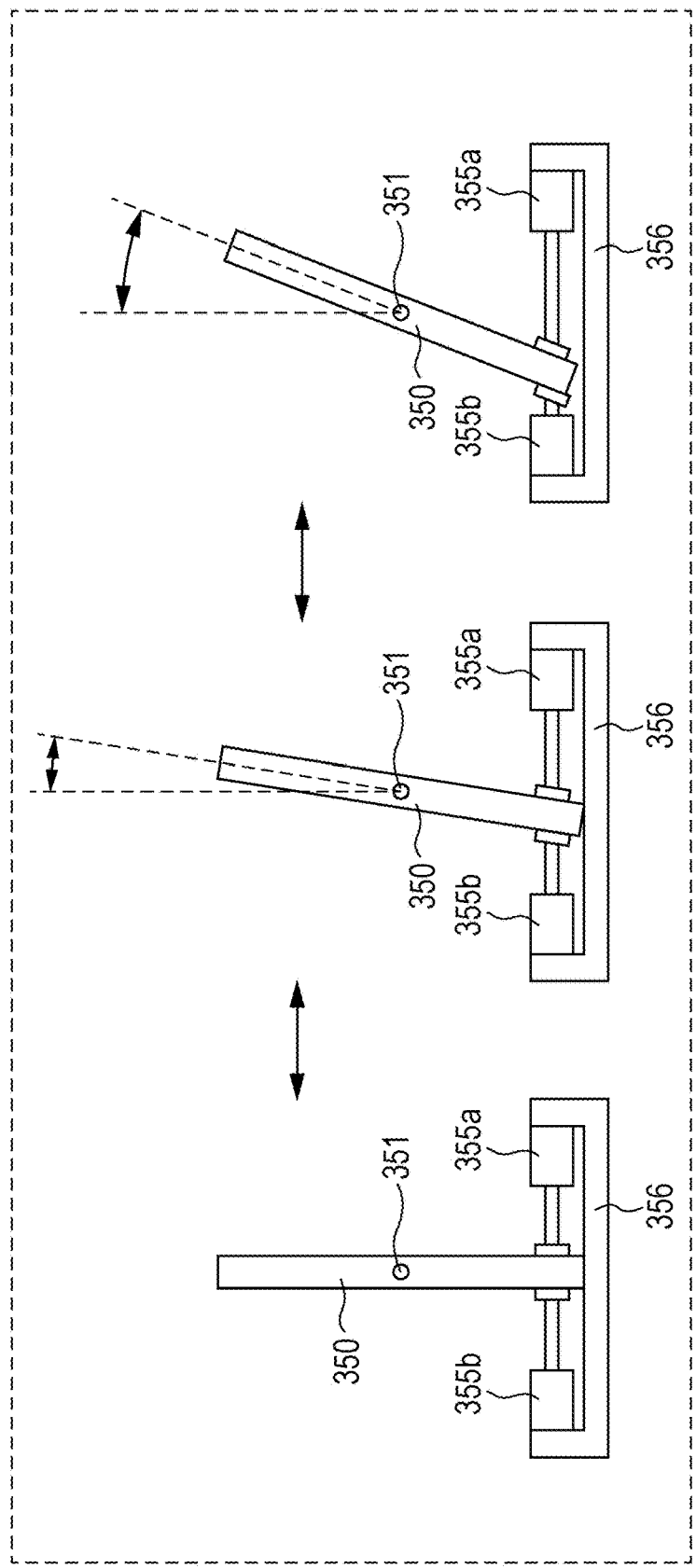
FIG. 12C is a schematic view of one example of a mechanism for tilting the insulating plate.

FIGS. 12A to 12C are schematic views of examples of a mechanism for tilting the insulating plate 350.

FIG. 12A illustrates an example in which a motor 313 is attached to the rotation shaft 351 of the insulating plate 350 and is rotated to tilt the insulating plate 350.

FIG. 12B is an example in which two opposite ends of the insulating plate 350 are supported by a sliding mechanism and the insulating plate 350 is slid to tilt the insulating plate 350.

In the example illustrated in FIG. 12B, the sliding mechanism has, for example, a pressing member 355a, a table 356, an elastic member 357, and a table 358. The table 356 has, for example, a recess and has a concave shape in cross-section. The pressing member 355a has, for example, a rod-shaped member and has means for applying a force to a first end of the rod-shaped member. A first end of the pressing member 355a is fixed to a wall surface of the table 356. The table 358 has, for example, a recess and has a concave shape in cross-section. The elastic member 357 is, for example, a member that is elastically deformed. Examples of the elastic member 357 include a spring and rubber. A first end of the elastic member 357 is, for example, fixed to a wall surface of the table 358.

For example, when the incidence surface of the insulating plate 350 is parallel to the radiation surface of the infrared sensor 300, a first end portion of the insulating plate 350 is supported between the elastic member 357 and a wall surface of the table 358, as illustrated at the left side in FIG. 12B. A second end of the rod-shaped member of the pressing member 355a is in contact with the vicinity of a second end portion of the insulating plate 350.

In this state, when a force is applied to the first end of the rod-shaped member of the pressing member 355a, the insulating plate 350 is rotated clockwise about the rotation shaft 351.

In this case, the second end portion of the insulating plate 350 moves to a position at which it contacts a wall surface of the table 356.

The first end portion of the insulating plate 350 is in a state in which it presses the elastic member 357.

In this case, the incidence surface of the insulating plate 350 is in a state in which it is inclined relative to the radiation surface of the infrared sensor 300. This state is illustrated at the right side in FIG. 12B.

Also, in the state illustrated at the right side in FIG. 12B, when the force applied to the first end of the rod-shaped member of the pressing member 355a is released, the resilience of the elastic member 357 causes the insulating plate 350 to rotate counterclockwise about the rotation shaft 351 to be in the state at the left side in FIG. 12B.

FIG. 12C illustrates an example in which a first end of the insulating plate 350 is supported by a sliding mechanism and the insulating plate 350 is slid to tilt the insulating plate 350.

In the example illustrated in FIG. 12C, the sliding mechanism has, for example, pressing members 355a and 355b and a table 356.

The pressing member 355b has, for example, a rod-shaped member and has means for applying a force to a first end of the rod-shaped member. A first end of the pressing member 355b is fixed to a wall surface of the table 356. A wall surface of the table 356 which is fixed to the pressing member 355a and the wall surface of the table 356 which is fixed to the pressing member 355b oppose each other.

For example, when the incidence surface of the insulating plate 350 is parallel to the radiation surface of the infrared sensor 300, two opposite sides of the first end portion of the insulating plate 350 are supported between and by a rod-shaped member of the pressing member 355a and the rod-shaped member of the pressing member 355b, as illustrated at the left side in FIG. 12C. At this point in time, the force applied to the rod-shaped member of the pressing member 355a and the force applied to the rod-shaped member of the pressing member 355b are equal to each other.

Next, when the force applied to the rod-shaped member of the pressing member 355a is increased to be larger than the force applied to the rod-shaped member of the pressing member 355b, the insulating plate 350 rotates clockwise about the rotation shaft 351. In this case, the incidence surface of the insulating plate 350 is in a state in which it is inclined relative to the radiation surface of the infrared sensor 300. This state is illustrated in the view at the middle in FIG. 12C.

Next, when the force applied to the rod-shaped member of the pressing member 355a is further increased to be larger than the force applied to the rod-shaped member of the pressing member 355b, the insulating plate 350 further rotates clockwise about the rotation shaft 351. At this point in time, the incidence surface of the insulating plate 350 is in a state in which it is further inclined relative to the radiation surface of the infrared sensor 300. This state is illustrated in the view at the right side in FIG. 12C.

Also, in the state as illustrated at the right side in FIG. 12C, when the force applied to the rod-shaped member of the pressing member 355a is reduced to be smaller than the force applied to the rod-shaped member of the pressing member 355b, the insulating plate 350 rotates counterclockwise about the rotation shaft 351 to be in a state as illustrated at the middle in FIG. 12C.

Also, in the state as illustrated at the middle in FIG. 12C, when the force applied to the rod-shaped member of the pressing member 355a is reduced to be equal to the force applied to the rod-shaped member of the pressing member 355b, the insulating plate 350 further rotates counterclockwise about the rotation shaft 351 to be in a state as illustrated at the left side in FIG. 12C.

Figure 13A:
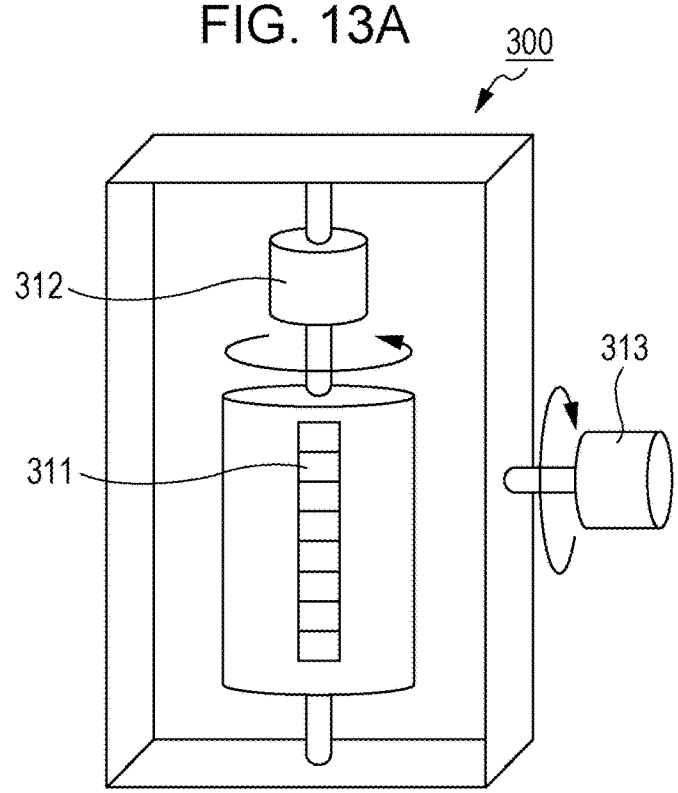
FIG. 13A is a schematic view of one example of a mechanism for tilting the infrared sensor.
Figure 13B:
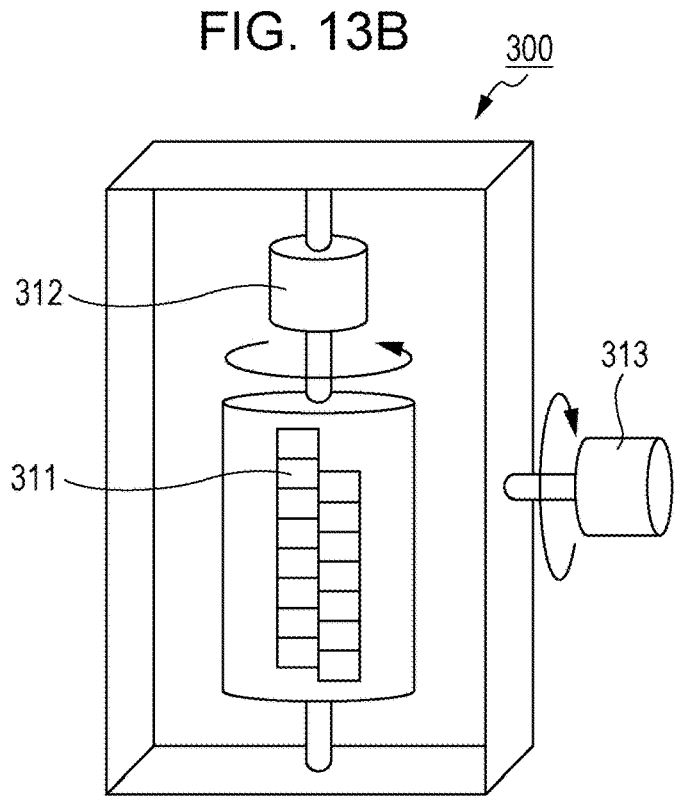
FIG. 13B is a schematic view of one example of a mechanism for tilting the infrared sensor.

In addition, a structure in which the infrared sensor 300 does not use the insulating plate 350 is also possible as described below. FIGS. 13A and 13B are schematic views of examples of a mechanism for tilting the infrared sensor 300. FIG. 13A illustrates an example in which a tilt motor 313 is attached to the housing of the infrared sensor 300 in structure example 2 and is rotated to tilt the plurality of the infrared light-receiving elements 311 in the vertical direction. As illustrated in FIG. 13B, a tilt motor 313 may also be attached to the housing of the infrared sensor 300 in structure example 1 and be rotated to tilt the plurality of the infrared light-receiving elements 311 in the vertical direction.

Since the above-described structures make it possible to acquire a two-dimensional thermal image having overlapping portions in both the vertical and horizontal directions, the super-resolution reconstruction can increase both the vertical and horizontal resolutions. Naturally, the scanning schemes described above and illustrated in FIGS. 6 to 9 can be applied to the infrared sensor 300 having the insulating plate 350.

<Control Method Realized by Air-Conditioning Apparatus>

A characteristic sensor control method realized by the air-conditioning apparatus 100 having the above-described structure will be further described below with reference to the accompanying drawings.

Figure 14:
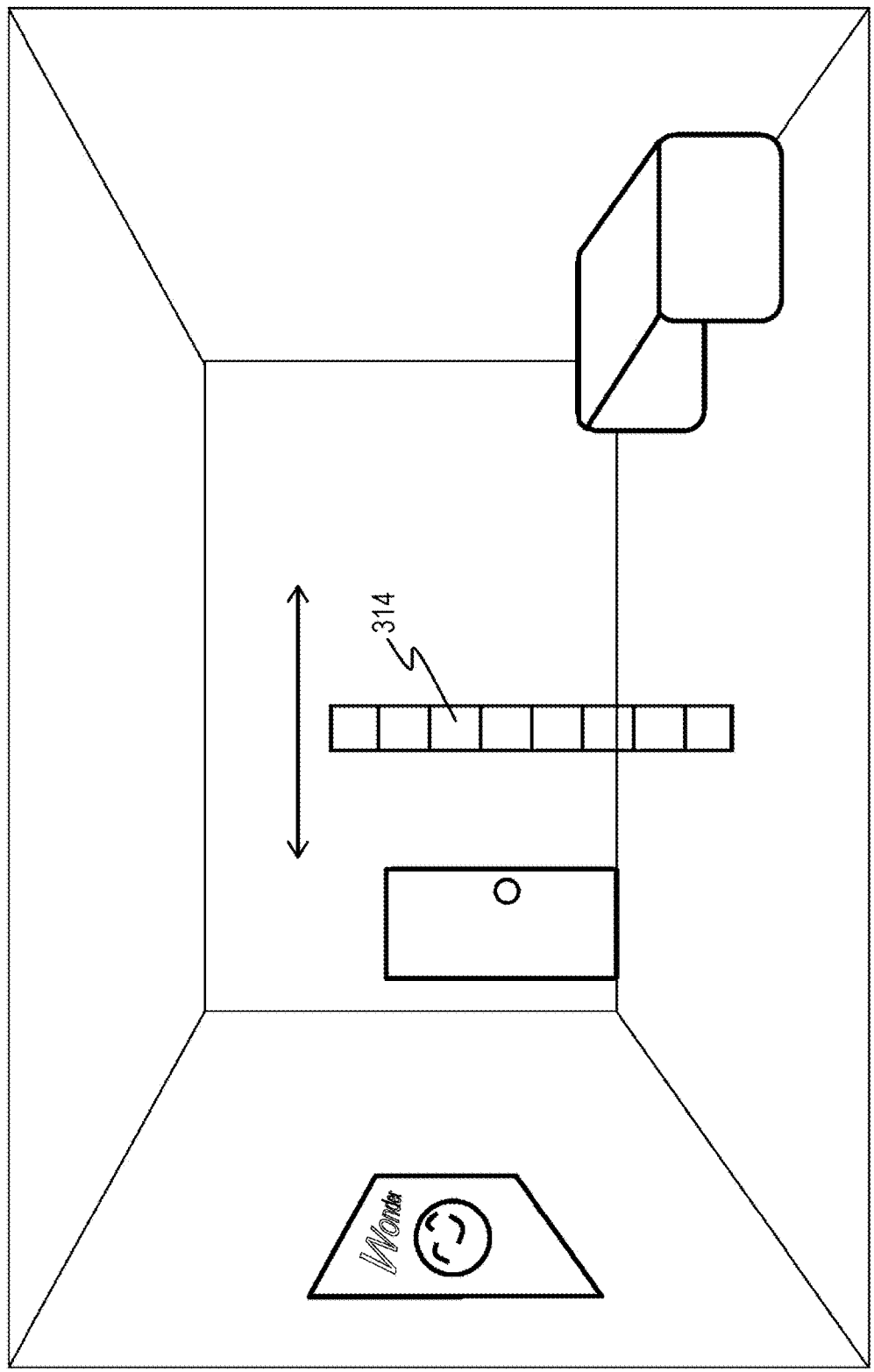
FIG. 14 is a schematic view of a state in which a room; which is an air-conditioned space; is viewed from the front side of the air-conditioning apparatus.

FIG. 14 is a schematic view of a state in which a room, which is an air-conditioned space, is viewed from the front side of the air-conditioning apparatus 100. As illustrated in FIG. 14, the air-conditioning apparatus 100 scans the room by using the infrared sensor 300 and acquires line thermal images 314 of a plurality of positions in order to obtain thermal data of the room. Although the air-conditioning apparatus 100 is not illustrated in FIG. 14, the air-conditioning apparatus 100 is installed, for example, at a position similar to that illustrated in FIGS. 32, 33A, and 33B described below.

In each embodiment below, a description will be given of a case in which the air-conditioning apparatus 100 is provided with the infrared sensor 300 in structure example 2 and the infrared sensor 300 acquires line thermal images 314 in one line. However, when the air-conditioning apparatus 100 includes the infrared sensor 300 having structure example 1, the infrared sensor 300 acquires the line thermal images 314 constituted by line images in two lines.

(1) First Embodiment

A sensor control method to be executed by the air-conditioning apparatus 100 according to a first embodiment (a method for determining a scanning scheme to be executed by the infrared sensor 300) will be specifically described in conjunction with use cases.

[Use Case 1-1]

Figure 15:
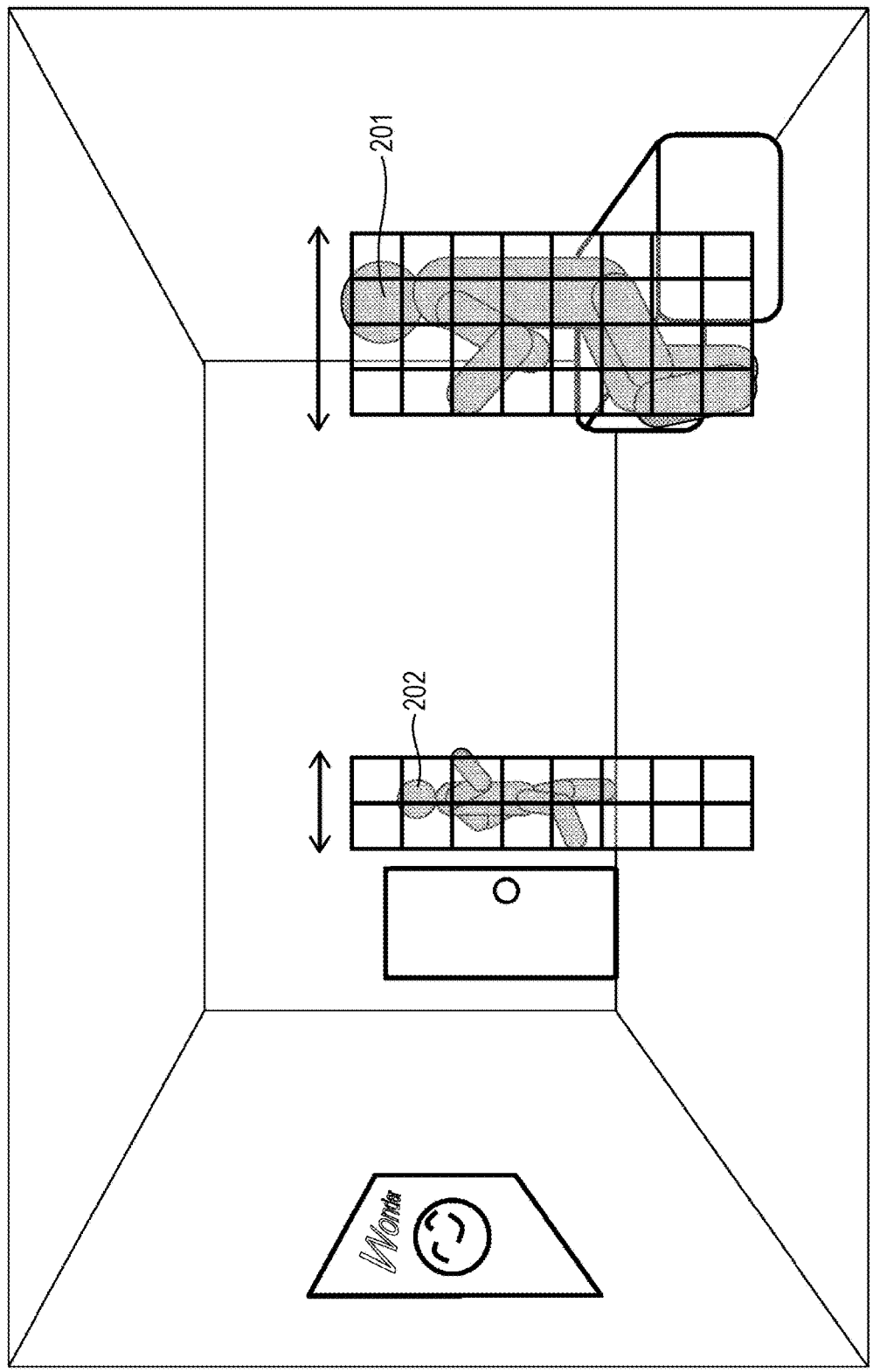
FIG. 15 is a schematic view illustrating use case 1-1 of the air-conditioning apparatus.
Figure 16:
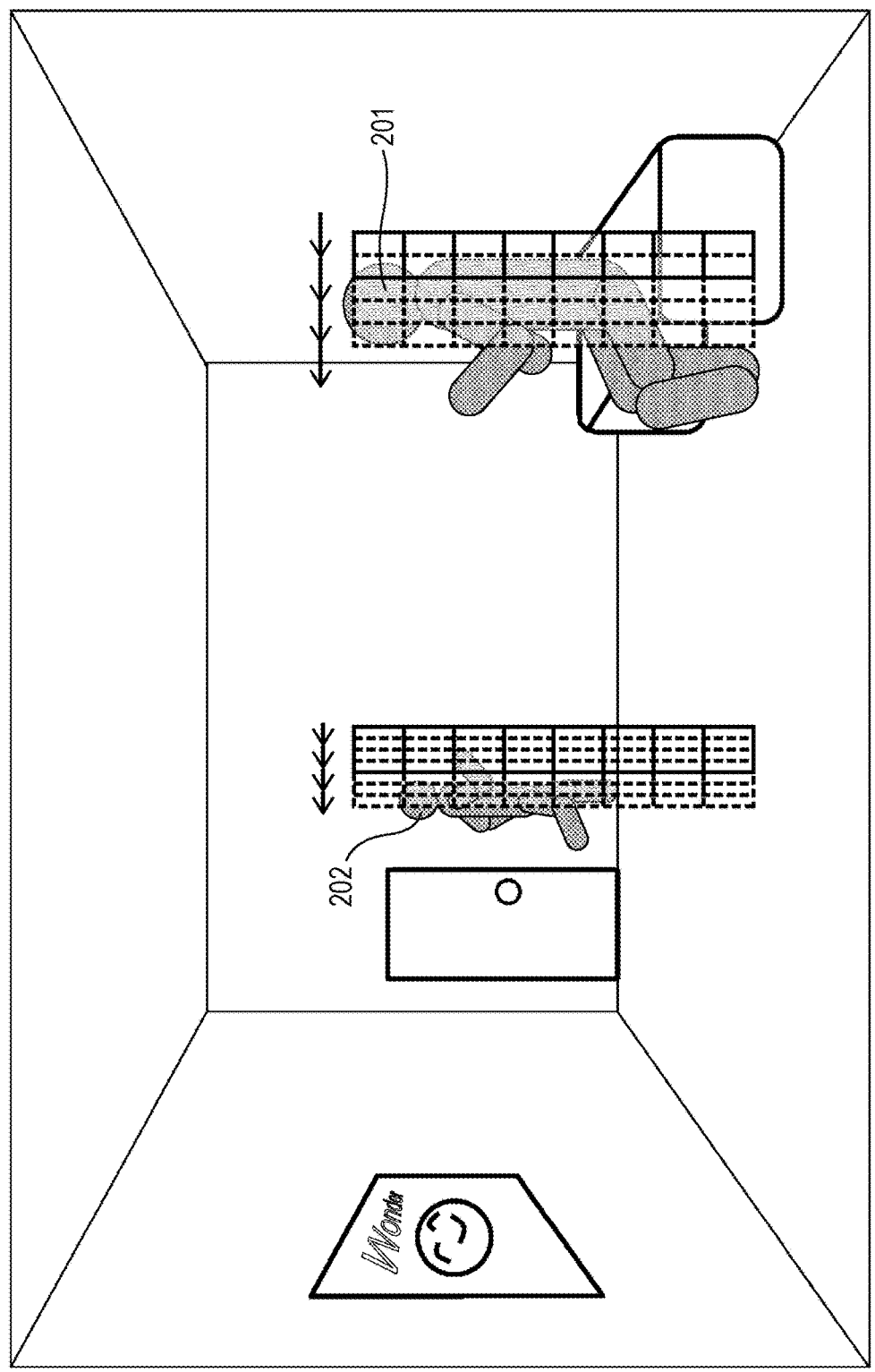
FIG. 16 is a schematic view illustrating use case 1-1 of the air-conditioning apparatus.

FIGS. 15 and 16 are schematic views for describing use case 1-1 of the air-conditioning apparatus. More specifically, FIGS. 15 and 16 are schematic views of a state in which a room is viewed from the front side of the air-conditioning apparatus 100 in use case 1-1. Use case 1-1 is an example in which two people are in the room. A first person 201 is closer to the air-conditioning apparatus 100 than a second person 202, and the second person 202 is at a position farther from the air-conditioning apparatus 100 than the first person 201. Although the air-conditioning apparatus 100 is not illustrated in FIGS. 15 and 16, the air-conditioning apparatus 100 is installed, for example, at a position similar to that illustrated in FIGS. 32, 33A, and 33B described below.

For example, in order to obtain thermal data of the entire room, the air-conditioning apparatus 100 coarsely scans the room (a first scanning scheme). In order to distinguish between a human thermal image (a subject thermal image) and a thermal image (a background thermal image) of a space where no one is present, the air-conditioning apparatus 100 may detect the presence of the two people 201 and 202 by using a background subtraction method. In the background subtraction method, a thermal image when no one is present in the room is first registered, and the registered thermal image is subtracted from a current thermal image. For example, when a subtraction value (or the absolute value of a subtraction value) obtained by subtracting the values of the pixels of the corresponding registered thermal image from the values of the pixels of the current thermal image is larger than a predetermined value, it is determined that the pixels in question are pixels different from those of a background thermal image (i.e., are pixels constituting a subject thermal image). A portion that is different from a background thermal image acquired by the subtraction is a subject thermal image. After the subject thermal image is detected, the size of the subject thermal image is obtained. The size of the subject thermal image is synonymous with the number of pixels constituting the subject thermal image.

When the size of the subject thermal image is smaller than or equal to a predetermined size (a threshold size), the processing of the super-resolution reconstruction is performed on the subject thermal image. The threshold size is an image size set according to a resolution needed by an application executed by the processor 800. When it is determined that the processing of the super-resolution reconstruction is to be performed, a scanning scheme (a second scanning scheme) is determined based on the current resolution of a subject thermal image and an expected resolution dependent on an application that is being executed. After the scanning scheme for the subject thermal image is determined, the scanning scheme determined by the infrared sensor 300 is used to re-scan a target area identified using the subject thermal image. Thereafter, the processing of the super-resolution reconstruction is performed, so that an improved resolution is obtained for the thermal image of the target area.

On the other hand, when the size of the subject thermal image is larger than the threshold size, the processing of the super-resolution reconstruction is not performed on the subject thermal image.

FIG. 16 is a schematic view illustrating another scanning scheme for the super-resolution reconstruction for acquiring thermal images of the first person 201 and the second person 202. Since the second person 202 is at a position far from the air-conditioning apparatus 100, the resolution of a thermal image of the second person 202 which is acquired by coarse scanning performed by the infrared sensor 300 is lower than the resolution of a thermal image of the first person 201 which is acquired by the same scanning. Accordingly, the scanning scheme for the super-resolution reconstruction for a thermal image of the first person 201 and the scanning scheme for the super-resolution reconstruction for a thermal image of the second person 202 should be different from each other. The scanning scheme for acquiring a thermal image of the second person 202 may have a finer scanning step than the scanning step in the scanning scheme for acquiring a thermal image of the first person 201.

On the other hand, when the size of a thermal image of the first person 201 is larger than the threshold size, and a thermal image of the first person 201 which is acquired by coarse scanning has an appropriate resolution, the area of the first person 201 is not re-scanned.

Figure 17A:
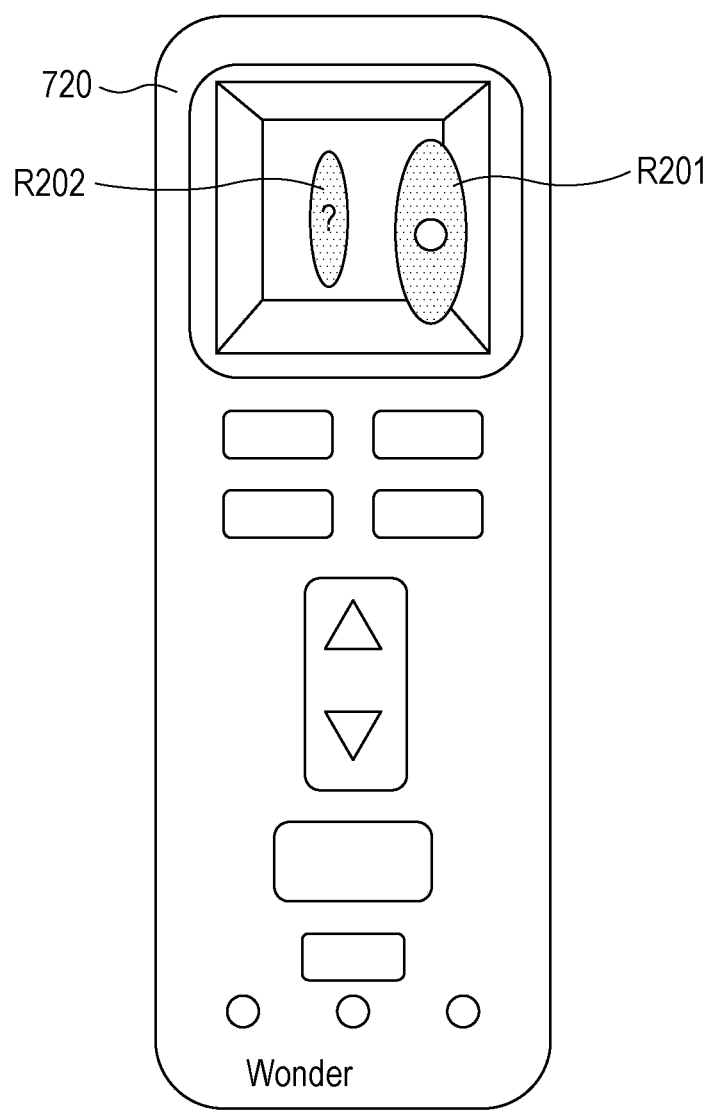
FIG. 17A is a schematic view of one example of a user interface of the air-conditioning apparatus.
Figure 17B:
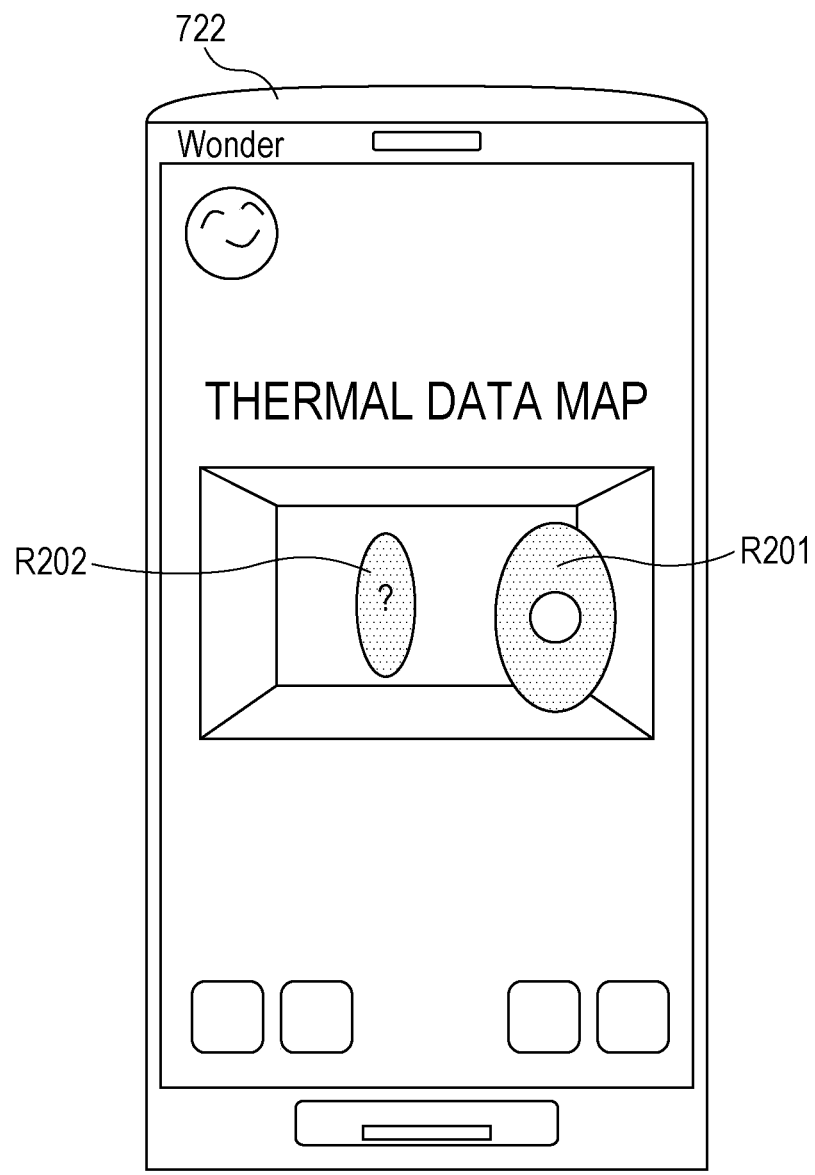
FIG. 17B is a schematic view of one example of the user interface of the air-conditioning apparatus.

FIGS. 17A and 17B are schematic views of examples of a user interface showing areas of interest in a room and the qualities of obtained thermal data of the respective areas. More specifically, FIG. 17A is a schematic view of one example of the remote controller 720 for operating the air-conditioning apparatus 100, FIG. 17B is a schematic view of one example of a mobile phone 722 for operating the air-conditioning apparatus 100 through a network.

A description will be given in conjunction with an example in which the user interface is information displayed on a display screen provided on the mobile phone 722 or a display screen provided on the remote controller 720. For example, information based on a result processed by the air-conditioning apparatus 100 is displayed on each display screen.

When the remote controller 720 or the mobile phone 722 has a speaker (not illustrated), the user interface may be sound output from the speaker. The speaker (not illustrated) of the remote controller 720 or the mobile phone 722 outputs, for example, sound representing information about a result obtained by processing performed by the air-conditioning apparatus 100.

In use case 1-1 described with reference to FIGS. 15 and 16, areas where the first person 201 and the second person 202 are present are the areas of interest.

For example, an area R201 in each of FIGS. 17A and 17B indicates the area of the first person 201, and a circle given to the area R201 suggests that thermal data of this area of interest was obtained in a favorable manner. Also, for example, an area R202 in each of FIGS. 17A and 17B indicates the area of the second person 202, and a question mark given to the area R202 suggests that thermal data of this area of interest is currently being obtained or was not appropriately obtained. The thermal data may be displayed to the user via the remote controller 720 or may be transmitted to the network connected via the network module 730 and to the user's mobile phone 722 for display.

[Use Case 1-2]

FIGS. 18 and 19 are schematic views illustrating use case 1-2 of the air-conditioning apparatus 100. More specifically, FIGS. 18 and 19 are schematic views of a state in which a room is viewed from the front side of the air-conditioning apparatus 100 in use case 1-2. Use case 1-2 is an example of a case in which a fire breaks out in the room (FIG. 18) or an example of a case in which a high-temperature object, such as a hot coffee cup or an iron, is used in the room (FIG. 19). Although the air-conditioning apparatus 100 is not illustrated in FIGS. 18 and 19, the air-conditioning apparatus 100 is installed, for example, at a position similar to that illustrated in FIGS. 32, 33A, and 33B described below.

In many cases, the size of the place of an initial fire and the size of a high-temperature object are smaller than the size of the human body. Accordingly, it is important that the resolution of thermal images of the place of the fire or the size of the high-temperature object be high and the accuracy of thermal data of the place of the fire or the size of the high-temperature object be high, thus requiring super-resolution reconstruction. When a fire is detected, the air-conditioning apparatus 100 may transmit a notification about a fire alarm to the user so that the fire can be extinguished before it spreads. The notification about the fire alarm may be a sound notification output via a speaker included in the air-conditioning apparatus 100. Alternatively, in order to notify the user about the fire alarm by using another method, such as a method for issuing a notification using the mobile phone 722, signals may be transmitted to the network connected via the network module 730. When an object of interest is a high-temperature object, a plurality of applications may be used.

In order to detect a small-size high-temperature object in the room, first, the air-conditioning apparatus 100, for example, coarsely scans the room to obtain thermal data of the entire room. The background subtraction method is then used to obtain a subject thermal image of the small-size high-temperature object. When the size of the subject thermal image of the small-size high-temperature object is smaller than a threshold size, the processing of the super-resolution reconstruction is performed.

Thus, a scanning scheme (a second scanning scheme) for the super-resolution reconstruction is determined based on the current resolution of a subject thermal image and an expected resolution dependent on an application being executed. When the current resolution of the subject thermal image is much lower than the expected resolution, a finer scanning step is required.

In particular, when the size of the subject thermal image is excessively small, for example, one to nine pixels, the scanning speed for the determined scanning scheme should be low so that the infrared sensor 300 can stop at the same position for a while in order to enable time averaging of thermal data of an identical position so as to reduce the Gaussian thermal noise effect of the infrared sensor 300.

After the scanning scheme and speed for the subject thermal image are determined, a target area identified with the subject thermal image is re-scanned using the scanning scheme determined by the infrared sensor 300. Thereafter, the processing for the super-resolution reconstruction is performed, so that an enhanced resolution is obtained for the thermal image of the high-temperature object. After a reconstructed thermal image of the high-temperature object is acquired, a highest temperature in the thermal image is compared with a threshold temperature indicating occurrence of a fire.

When the highest temperature in the thermal image is higher than the threshold temperature, the air-conditioning apparatus 100 presumes that the high-temperature object is the place of the fire, and a notification about a fire alarm is transmitted to the user. The notification about the fire alarm may take various different forms. For example, the air-conditioning apparatus 100 may output a loud sound via the attached speaker in order to transmit the alarm to the user. The air-conditioning apparatus 100 may also transmit the alarm to the network connected via the network module 730 so that the user who is connecting to the network can receive the alarm at a remote location.

Figure 20A:
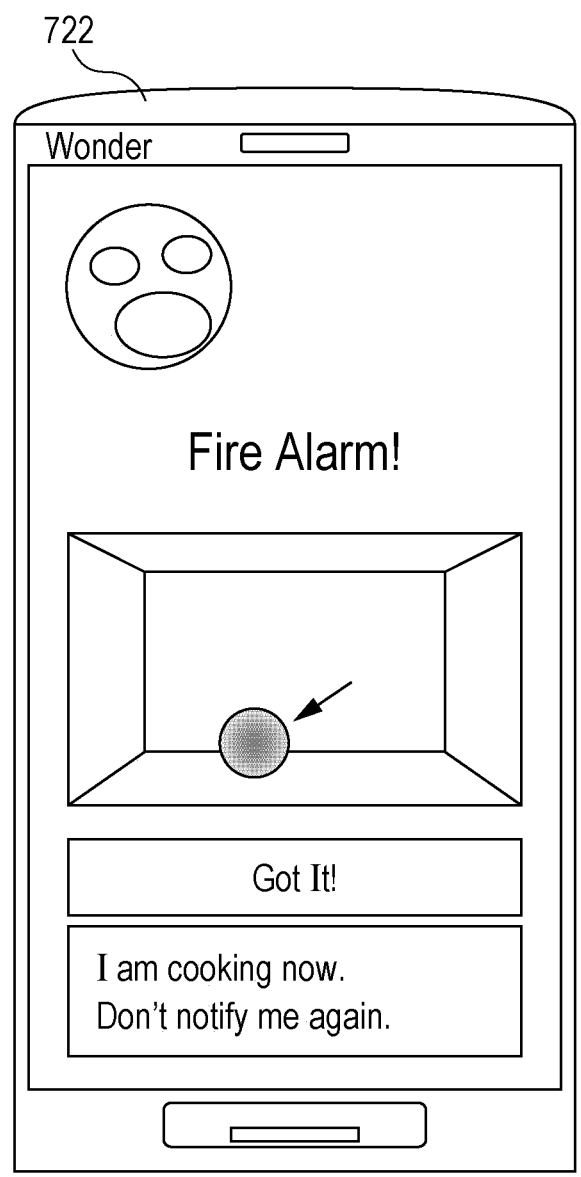
FIG. 20A is a schematic view of one example of the user interface of the air-conditioning apparatus.
Figure 20B:
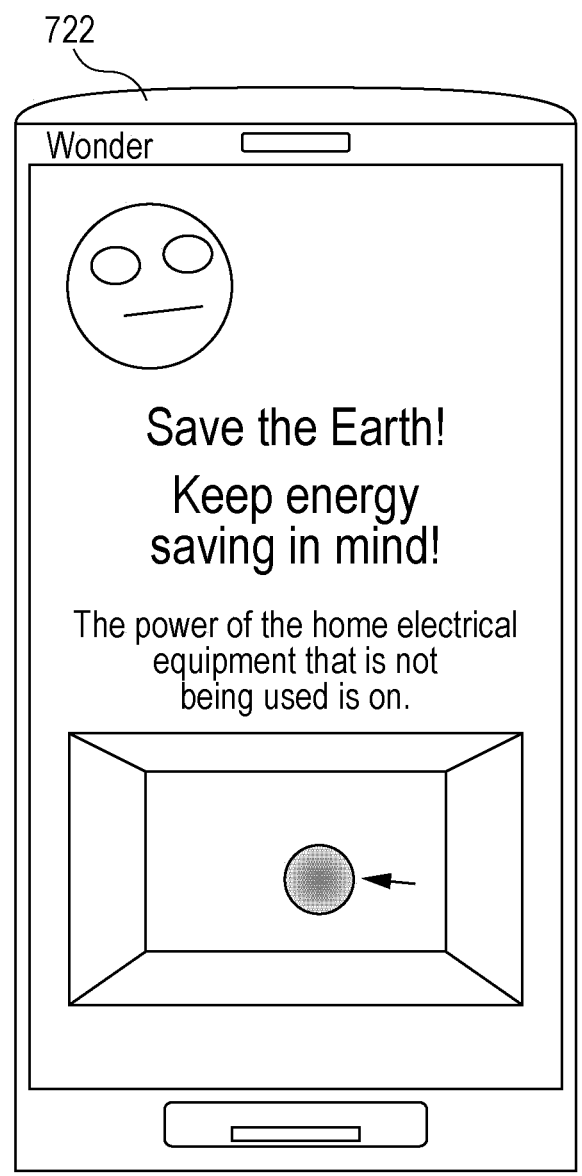
FIG. 20B is a schematic view of one example of the user interface of the air-conditioning apparatus.

FIGS. 20A and 20B are schematic views of examples of the user interface of the air-conditioning apparatus 100. More specifically, FIGS. 20A and 20B are schematic views each illustrating one example of the mobile phone 722 for operating the air-conditioning apparatus 100 over the network.

FIG. 20A is an example of a user interface on which an alarm transmitted to the mobile phone 722 of the user is displayed. The mobile phone 722 receives the alarm from the air-conditioning apparatus 100 through the network. As illustrated in FIG. 20A, the position of an area where the air-conditioning apparatus 100 predicts that there is a fire may be displayed on an alarm screen. In addition, in order to check whether or not the user has received the alarm, the screen may include the feedback of the user. In FIG. 20A, exemplary feedback is displayed below the display of the fire area. The feedback from the user is then transmitted to the air-conditioning apparatus 100 through the connected network.

On the other hand, when the highest temperature in the image is lower than or equal to the threshold temperature, the air-conditioning apparatus 100 presumes that the high-temperature object is not the place of the fire. In this case, the operation after the detection may depend on the application program. For example, the air-conditioning apparatus 100 may transmit, to the user, a notification indicating that household electrical or electronic equipment is operating and may be producing heat in the room when there is no one therein. With such a configuration, the user who has checked the notification transmitted from the mobile phone 722 can return to the room in order to turn off the power source of the equipment in terms of safety and economy. An exemplary user interface may be an interface like that illustrated in FIG. 20B.

Examples of Processing Executed in Present Embodiment

Figure 21:
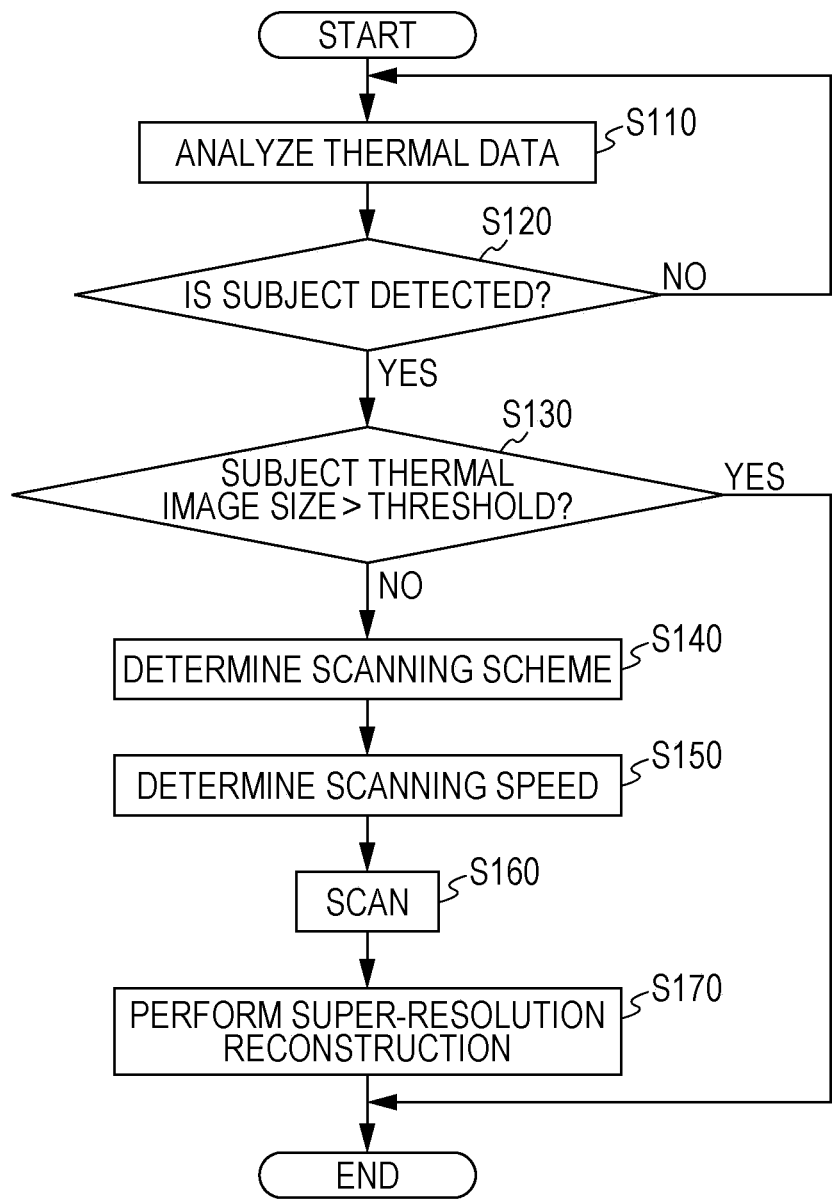
FIG. 21 is a flowchart illustrating one example of processing executed by the air-conditioning apparatus according to a first embodiment.

FIG. 21 is a flowchart illustrating one example of processing performed by the processor 800. FIG. 21 illustrates a case in which the processor 800 monitors the room and executes processing corresponding to different types of application, such as issuing a notification about air conditioning, a fire alarm, and a heated object, based on what is detected by the monitoring. The operation of the processor 800 in use cases 1-1 and 1-2 can be systematically described with reference to the flowchart in FIG. 21. The flowchart in FIG. 21 is merely an example. Thus, the processor 800 may execute various auxiliary steps in addition to the steps illustrated in FIG. 21.

In step S110, the processor 800 obtains the current thermal data of the room, analyzes the current thermal data when it is compared with thermal data of the background, and distinguishes between a background thermal image and a subject thermal image included in the background thermal image. The thermal data of the background may be collected when there is no one in the room or may be determined depending on statistics regarding the thermal data of the room. The thermal data of the background may be updated by any method, such as a blind update or selective update. In step S110, a detected subject is output. Thereafter, step S120 is executed.

In step S120, based on the result obtained in step S110, the processor 800 checks whether or not the subject thermal image, which is distinguished from the background thermal image, is successfully acquired, that is, whether or not a subject is present in the room. If no subject is present, the processor 800 updates the thermal data of the background by using the current thermal data and executes the process in step S110 again. If a subject is present, step S130 is executed.

In step S130, the processor 800 determines whether or not the size of the acquired subject thermal image is larger than a threshold size set according to a resolution needed by each application executed by the processor 800. If the size of the subject thermal image is larger than the threshold size (Yes in step S130), the resolution of the subject thermal image is sufficiently high, and it is thus determined that the super-resolution reconstruction is not necessary. On the other hand, if the size of the subject thermal image is smaller than or equal to the threshold size (No in step S130), the resolution of the subject thermal image is not sufficiently high, and it is determined that the super-resolution reconstruction is necessary. Thus, the processor 800 advances to step S140.

In step S140, the scanning scheme (the second scanning scheme) for the super-resolution reconstruction is determined based on the current resolution and the expected resolution set by each application executed by the processor 800. For example, when the expected resolution is higher than the current resolution, a scanning scheme having a finer scanning step is selected, and when the expected resolution is lower than the current resolution, a scanning scheme having a general scanning step is selected. Thereafter, step S150 is executed.

In step S150, a scanning speed for the super-resolution reconstruction is determined according to the size of the subject thermal image. For example, when the size of the subject thermal image is smaller than or equal to nine pixels, the scanning speed is set to a speed that is lower than a registered normal speed, and when the size of the subject thermal image exceeds nine pixels, the scanning speed is set to a speed that is higher than or equal to the normal scanning speed. The subject thermal image size used for determining the scanning speed may be set depending on each application executed by the processor 800.

In step S160, the processor 800 instructs the infrared sensor 300 to use the scanning scheme determined in step S140 and the scanning speed determined in S150 to re-scan an area identified with the detected subject thermal image. After processing of the scanning is completed, step S170 is executed.

In step S170, the processor 800 performs a computational operation for the super-resolution reconstruction by using data tokens resulting from the scanning performed in step S160. When step S170 is completed, a reconstructed subject thermal image having a higher resolution is acquired. After step S170 is appropriately executed, the processing ends.

The processor 800 may also detect a plurality of subject thermal images. In this case, in the processing of the super-resolution reconstruction, the above-described processing steps are individually executed on each of the subject thermal images.

Figure 22:
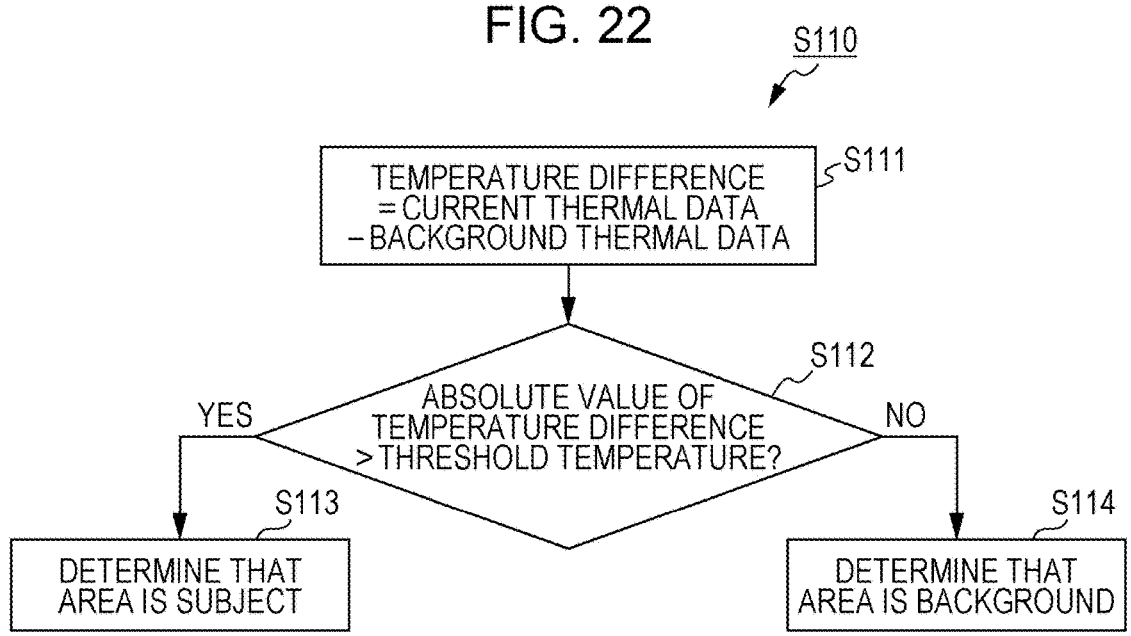
FIG. 22 is a flowchart illustrating one example of the processing executed by the air-conditioning apparatus according to the first embodiment.

FIG. 22 is a flowchart illustrating one example of detailed processing of step S110 in FIG. 21. The flowchart in FIG. 22 is merely an example. Thus, the processor 800 may execute various auxiliary steps in addition to the steps illustrated in FIG. 22.

In step S111, the processor 800 computes a temperature difference of the current thermal data from the background thermal data by performing subtraction. Thereafter, step S112 is executed. In step S112, the processor 800 determines whether or not the absolute value of the temperature difference computed in step S111 is greater than a threshold temperature for subject detection. If the temperature difference is greater than the threshold temperature, it is determined in step S113 that the area having the temperature difference is a subject. If the temperature difference is smaller than or equal to the threshold temperature, it is determined in step S114 that the area having the temperature difference is not a subject, that is, is a background.

The subject thermal image acquired by the processing based on the flowcharts illustrated in FIGS. 21 and 22 is used for processing corresponding to an application. For example, for an application for room air conditioning, the louvers 110, the fan 120, the air compressor 130, and so on are controlled, and for an application for reporting a fire alarm or a hot object, an operation for notifying the user is performed.

Figure 23:
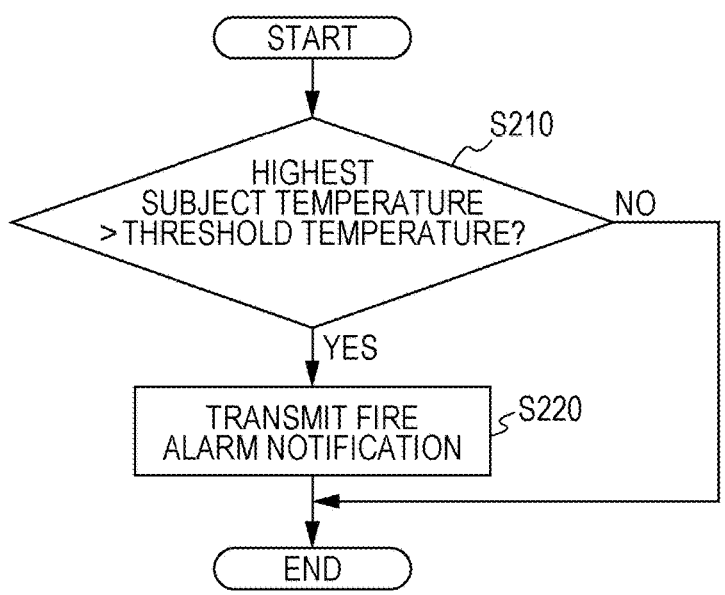
FIG. 23 is a flowchart illustrating one example of processing executed by the air-conditioning apparatus according to the first embodiment.

FIG. 23 is a flowchart illustrating one example of an operation in the application for a fire alarm. When a subject thermal image is acquired in the flowcharts illustrated in FIGS. 21 and 22, evaluation is performed as to whether or not there is a fire in the room. This evaluation is performed based on whether or not the highest temperature in the subject thermal image is higher than a threshold temperature set by a fire detection application (step S210). If the highest temperature in the subject thermal image is higher than the threshold temperature, a fire alarm notification is transmitted to the user and the air-conditioning apparatus 100 (step S220).

Before finishing this processing, the processor 800 may waits for receiving feedback indicating that the user received the notification. When feedback indicating that the user received the notification is not obtained from the user, the processor 800 may re-transmit the notification after a predetermined time passes or may end the processing after a predetermined time passes.

The processing illustrated in FIG. 23 may also be executed on the entire background thermal image without distinguishing between the background thermal image and the subject thermal image included in the background thermal image in step S110 in FIG. 21.

It is to be noted that there are two major use cases in the first embodiment described above. Use case 1-1 is focused on enhancing the resolution of a plurality of objects whose thermal images have different sizes. Use case 1-2 is focused on detecting a small-size high-temperature object, such as a fire or heated equipment.

An important point in use case 1-1 is that an appropriate scanning scheme (the second scanning scheme) for the infrared sensor 300 be determined in step S140 in FIG. 21 so that the size of the subject thermal image matches a resolution that is sufficiently high for a specific application. In this case, a trigger for the super-resolution reconstruction can be concluded to be the size of the subject thermal image. In response to the trigger, the infrared sensor 300 may perform scanning according to any of the scanning schemes illustrated in FIGS. 6 to 9 or another scanning scheme. As illustrated in FIGS. 17A and 17B, the quality of the scanning (detection) may be provided to the user.

Important points in use case 1-2 are that an appropriate scanning scheme (the second scanning scheme) for the infrared sensor 300 be determined in step S140 in FIG. 21 and an appropriate scanning speed for the infrared sensor 300 be determined in step S150 in FIG. 21. The reason is that the sizes of the majority of subjects in use case 1-2 are small, thus requiring a low scanning speed for a noise reduction algorithm. A trigger for the super-resolution reconstruction can be concluded to be an event of subject detection of a small-size heat-generating spot. In response to the trigger, the scanning speed and the scanning scheme of the infrared sensor 300 are adjusted. An application being executed may transmit a different type of user interface like that illustrated in FIG. 20A or 20B to the user.

Advantages of Processing According to Present Embodiment

Compared with the related technique, determining that the super-resolution reconstruction is to be performed for enhancing the resolution of a thermal image in accordance with different triggers in the present disclosure has advantages as described below.

1) Short delay time: Since the super-resolution reconstruction is performed on a particular area, the processing time for obtaining room data can be reduced, compared with a known scheme for performing the super-resolution reconstruction on an entire area. This is due also to the fact that the scanning scheme involving the super-resolution reconstruction is slower than the general scanning scheme.

2) Utilization of efficient computing power: This is realized by specifying that the super-resolution reconstruction is to be performed on only a particular area of interest. The computational load is reduced, compared with a case in which the super-resolution reconstruction is performed on the entire area of the room even though only a portion of the reconstructed image is used.

3) Adaptive enhancement: The scanning scheme for collecting data utilized for the processing of the super-resolution reconstruction is determined based on an expected resolution and the original resolution for each area. Thus, the resolution is adaptively enhanced.

4) High accuracy: When a subject having a small size is present, the speed of scanning and the amount of time in which the infrared sensor stops at each scan position should differ from those in a case in which an object having a large size is present. The scanning speed and the stop time determined based on features of a subject make it possible to achieve a favorable accuracy requested by each application.

(2) Second Embodiment

A sensor control method executed by the air-conditioning apparatus 100 according to a second embodiment (a method for determining a scanning scheme used by the infrared sensor 300) will now be described in conjunction with use cases.

[Use Case 2-1]

Figure 24:
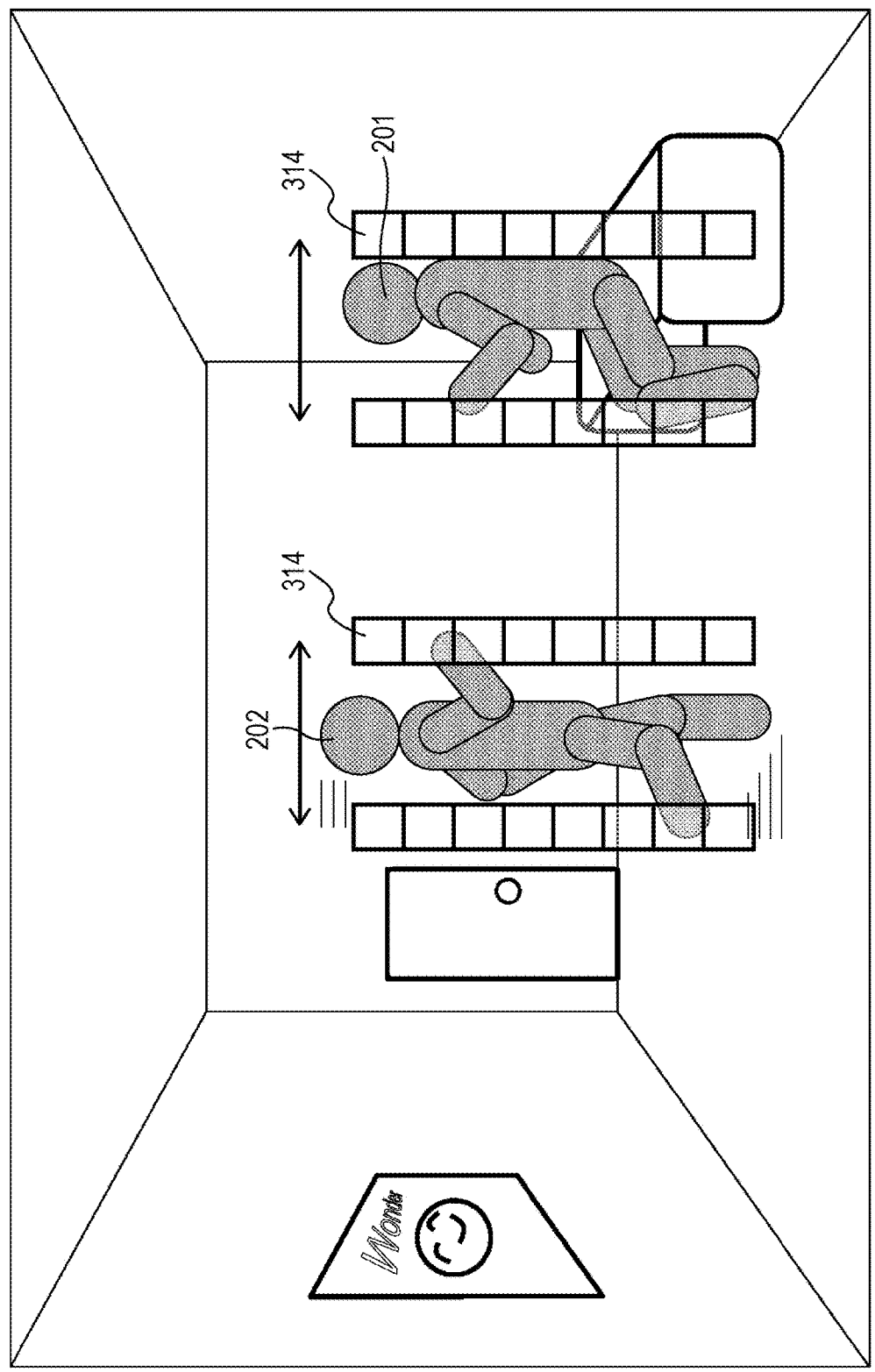
FIG. 24 is a schematic view illustrating use case 2-1 of the air-conditioning apparatus.
Figure 25:
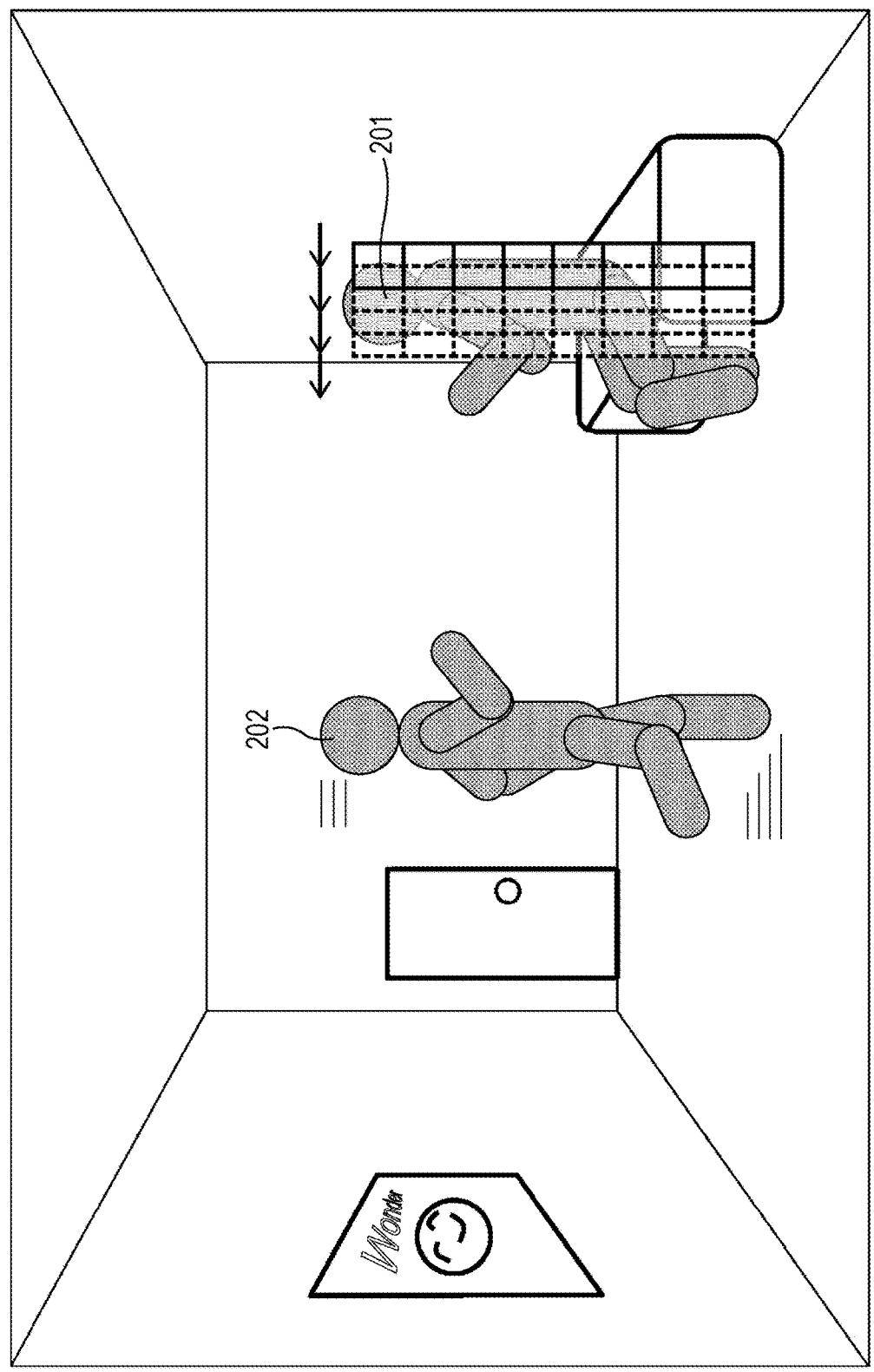
FIG. 25 is a schematic view illustrating use case 2-1 of the air-conditioning apparatus.

FIGS. 24 and 25 are schematic views illustrating use case 2-1 of the air-conditioning apparatus. Specifically, FIGS. 24 and 25 are schematic views of states of a room viewed from the front side of the air-conditioning apparatus 100 in use case 2-1. Use case 2-1 is an example in which there are two people in the room. A first person 201 is stationary, and a second person 202 is moving. Although the air-conditioning apparatus 100 is not illustrated in FIGS. 24 and 25, the air-conditioning apparatus 100 is installed, for example, at a position similar to that illustrated in FIGS. 32, 33A, and 33B described below.

The air-conditioning apparatus 100, for example, coarsely scans the room in order to obtain thermal data of the entire room. In order to distinguish between a background thermal image and a subject thermal image of the two people, the air-conditioning apparatus 100 may detect the presence of the two people by using the background subtraction method. Before whether or not the super-resolution reconstruction is needed is determined, movement in each subject thermal image should be examined. The reason is that, in particular, in a system using a linear infrared sensor that is not capable of acquiring a two-dimensional thermal image in real time, movement in each subject thermal image easily causes error in the processing of the super-resolution reconstruction. The movement is examined by performing high-speed re-scanning on the area of the detected subject thermal image and surroundings of the area.

In order to examine the movement in the target area and the direction of the movement, the area to be re-scanned may be larger than the area of the detected subject thermal image, as illustrated in FIG. 24. The movement of a subject is determined by comparing a thermal image (a first thermal image) collected during first scanning with a thermal image (a second thermal image) collected during re-scanning of the area. When a change between a target-area thermal image during the first scanning and a target-area thermal image during the re-scanning is small, it is determined that the subject is a stationary object. When the subject is stationary, a determination is made as to whether or not the super-resolution reconstruction is necessary. When the subject is moving, the processing of the super-resolution reconstruction is not performed. The size of the subject thermal image is obtained before requirements for the super-resolution reconstruction are determined.

When the size of the subject thermal image is smaller than or equal to a threshold size, the processing of the super-resolution reconstruction is performed on the subject thermal image. When it is determined that the processing of the super-resolution reconstruction is to be performed, a scanning scheme (a second scanning scheme) is determined based on the current resolution of a subject thermal image and an expected resolution dependent on an application that is being executed. After the scanning scheme for the subject thermal image is determined, the infrared sensor 300 uses the determined scanning scheme to re-scan the target area identified with the subject thermal image. Thereafter, the processing of the super-resolution reconstruction is performed to acquire a target-area thermal image having an enhanced resolution. When the size of the subject thermal image is larger than the threshold size, the processing of the super-resolution reconstruction is not performed.

FIG. 25 is a schematic view of a state in which the super-resolution reconstruction is executed after movement examination. Specifically, FIG. 25 illustrates a state in which the processing of the super-resolution reconstruction is performed on an area where the first person 201 sits still or is moving by a relatively small amount. On the other hand, the processing of the super-resolution reconstruction is not performed on an area where the second person 202 is moving quickly.

Figure 26A:
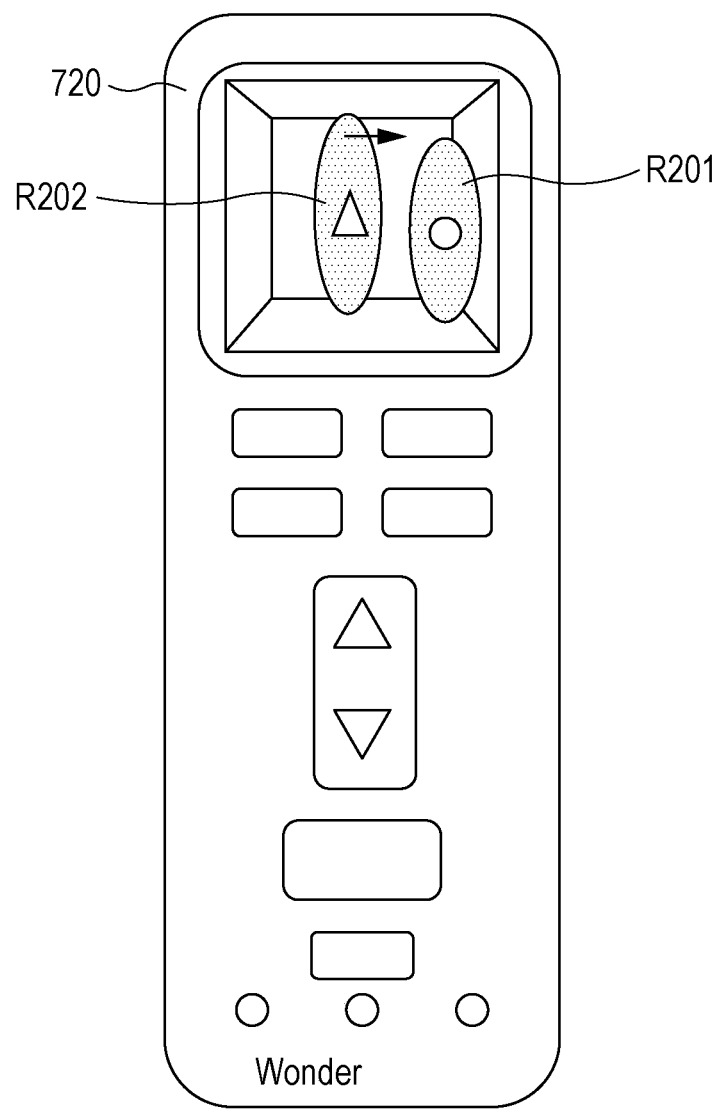
FIG. 26A is a schematic view of one example of the user interface of the air-conditioning apparatus.
Figure 26B:
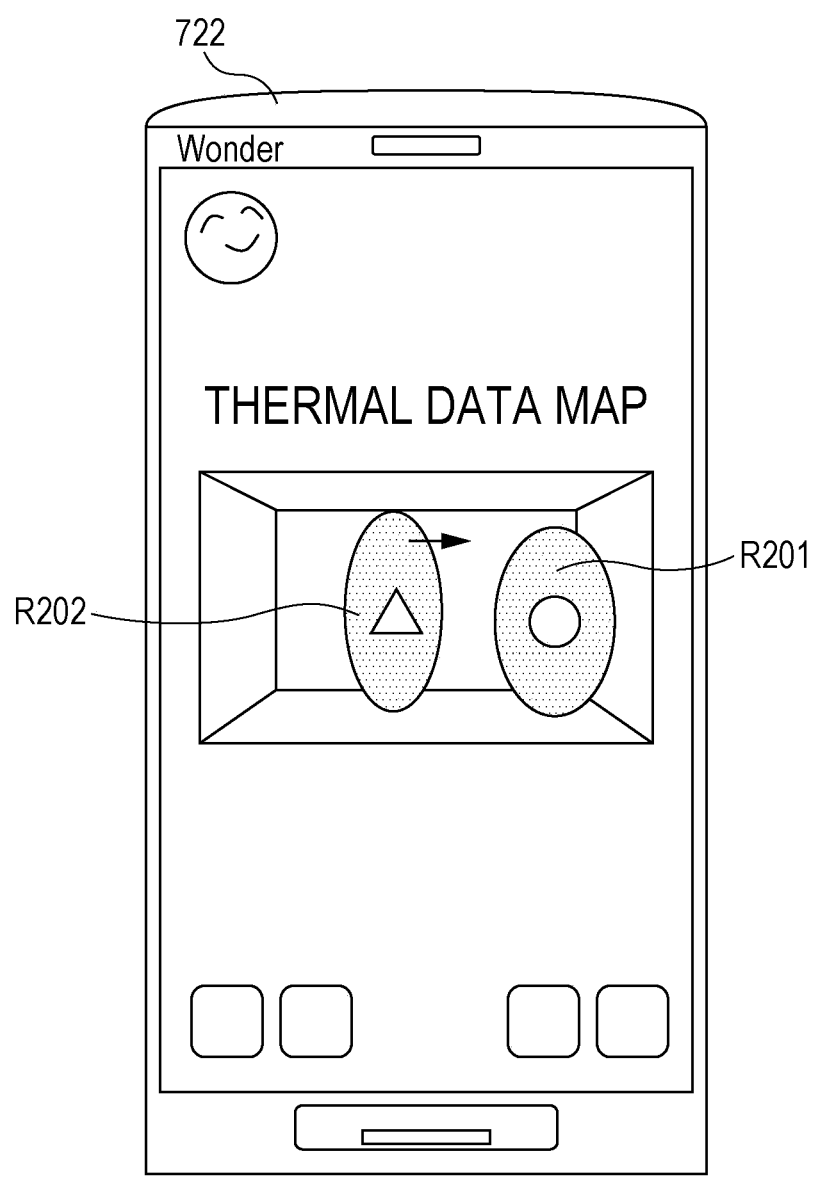
FIG. 26B is a schematic view of one example of the user interface of the air-conditioning apparatus.

FIGS. 26A and 26B are schematic views of examples of the user interface of the air-conditioning apparatus 100.

Specifically, FIGS. 26A and 26B are schematic views each illustrating one example of the user interface showing areas of interest in the room and the qualities of obtained thermal data of the respective areas.

More specifically, FIG. 26A is a schematic view of one example of a remote controller for operating the air-conditioning apparatus 100, and FIG. 26B is a schematic view of one example of the mobile phone 722 that connects to the air-conditioning apparatus 100 through the network.

The user interface may display movement data indicating the direction of movement in each area or the like. In use case 2-1 illustrated in FIGS. 24 and 25, the areas where the first person 201 and the second person 202 are present are areas of interest. For example, an area R201 in each of FIGS. 26A and 26B represents the area of the first person 201, and a circle added to the area R201 suggests that thermal data of this area of interest is obtained in a favorable manner. Also, for example, an area R202 in each of FIGS. 26A and 26B represents the area of the second person 202, and a triangle added to the area R202 suggests that thermal data of this area of interest is obtained with a lower quality than the quality in the area denoted by the circle. In addition, the area R202 may have an arrow indicating a direction in which the subject in the area R202 moves. The data may be displayed to the user via the remote controller 720. Alternatively, the data may be transmitted to the network connected to the network module 730 and to the user's mobile phone 722 for display.

[Use Case 2-2]

Figure 27A:
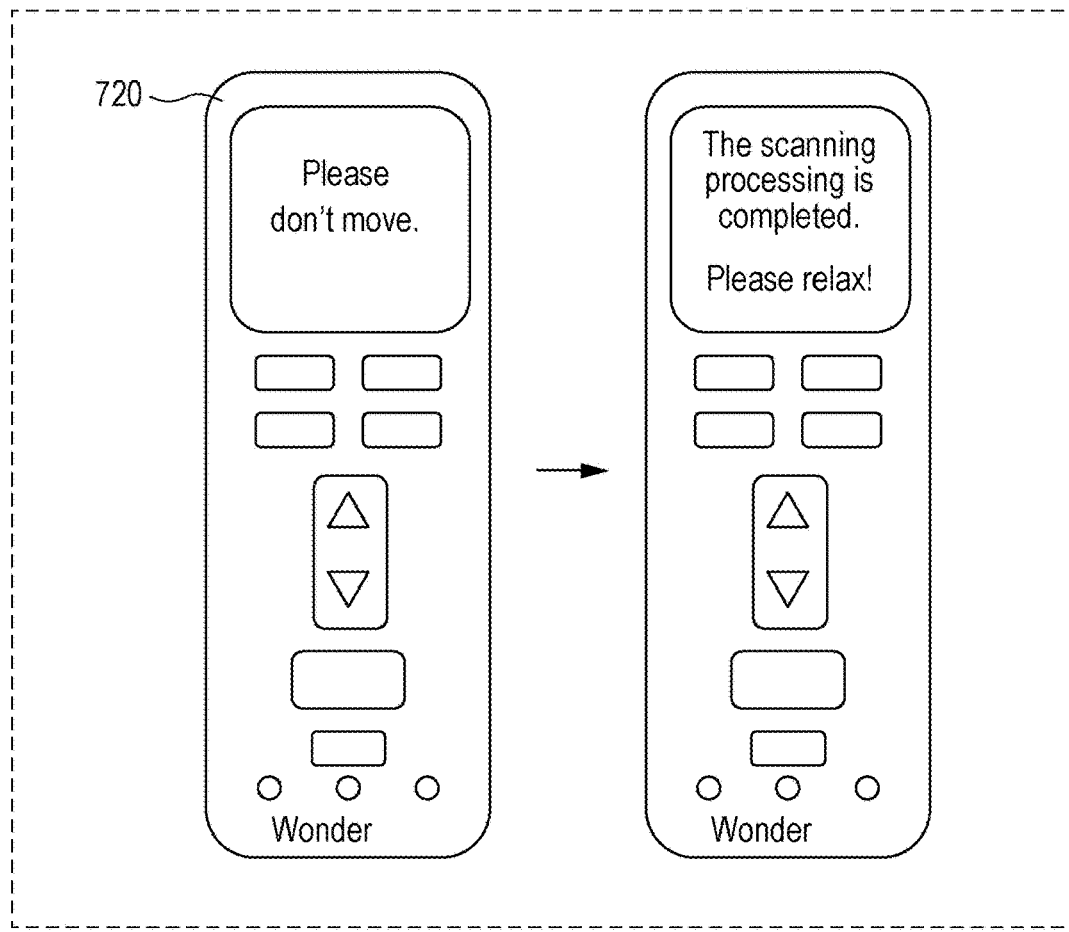
FIG. 27A is a schematic view of one example of the user interface of the air-conditioning apparatus.

FIG. 27A is a schematic view of one example of the user interface of the air-conditioning apparatus 100. When the user requests execution of the application in the air-conditioning apparatus 100, and the application needs the super-resolution reconstruction, the air-conditioning apparatus 100 may issue, via a user interface such as the remote controller 720 like that illustrated in FIG. 27A, a request to a person (such as the user) to stop moving in order to perform scan processing involving the super-resolution reconstruction. In the schematic view illustrated at the left-hand side in FIG. 27A, for example, a message "Please do not move." is displayed on the display screen of the remote controller 720 to thereby request a person (e.g., the user) to stop moving.

After the request is issued to the person, the movement of the person should be examined for confirmation. When the person is still moving, the air-conditioning apparatus 100 may re-issue the request until it is confirmed that the person is stationary. When it is confirmed that the person is stationary, the processing of the super-resolution reconstruction is performed.

Subsequently, when the application in the air-conditioning apparatus 100 completes the processing of the super-resolution reconstruction, the air-conditioning apparatus 100 issues, via a user interface such as the remote controller 720, a notification indicating that the application has completed the processing of the super-resolution reconstruction.

In the schematic view illustrated at the right-hand side in FIG. 27A, for example, a message "the operation processing is completed. Please relax!" is displayed on the display screen of the remote controller 720, to thereby notify the person (such as the user) that the processing of the super-resolution reconstruction performed by the application is completed.

Figure 27B:
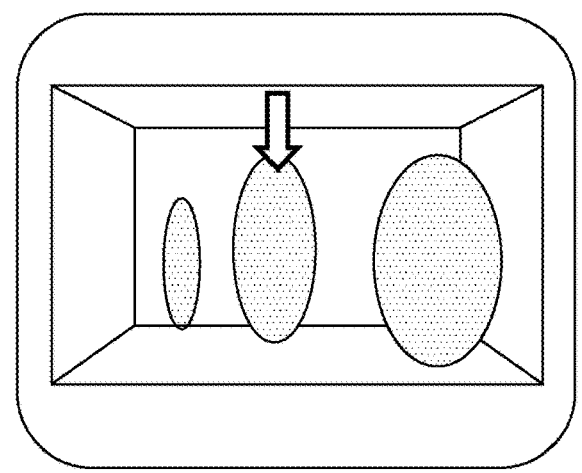
FIG. 27B is a schematic view of one example of the user interface of the air-conditioning apparatus.

FIG. 27B is a schematic view of one example of another user interface of the air-conditioning apparatus 100. If the air-conditioning apparatus 100 finds a plurality of subject thermal images and the user gives a request for executing an application requiring the super-resolution reconstruction, then he or she may distinguish a particular subject thermal image among the detected subject thermal images via the remote controller 720 or a user interface of the mobile phone 722 or the like connected to the air-conditioning apparatus 100 through the network. In FIG. 27B, an arrow indicated at the middle of the subject thermal images means that the user has selected this area for the application as a target area.

[Use Case 2-3]

FIG. 28 is a schematic view of use case 2-3 of the air-conditioning apparatus 100. Specifically, FIG. 28 is a schematic view of a state in which the room is viewed from the front side of the air-conditioning apparatus 100 in use case 2-3. Use case 2-3 is an example in which two people, that is, a first person 201 and a second person 202, are present in the room, and then a third person 203 enters the room. Although the air-conditioning apparatus 100 is not illustrated in FIG. 28, the air-conditioning apparatus 100 is installed, for example, at a position similar to that illustrated in FIGS. 32, 33A, and 33B described below.

By using the above-described algorithm for preventing an error due to movement during the super-resolution reconstruction, the air-conditioning apparatus 100 determines that the processing of the super-resolution reconstruction is to be performed on both the areas where the first person 201 and the second person 202 are present. Since the third person 203 enters the room while the processing for re-scanning is performed, the air-conditioning apparatus 100 detects the occurrence of a sudden change during re-scanning of the area of the second person 202, based on re-scanned thermal image data. As a result, in order to prevent the occurrence of an error in the processing of the super-resolution reconstruction, the air-conditioning apparatus 100 terminates the processing of the super-resolution reconstruction on the subject thermal image of the second person 202.

By using artificial intelligence of the processor 800 in the air-conditioning apparatus 100, the processor 800 may learn that a sudden change occurs at a high frequency in an area, such as an area where a door is located, in the room in FIG. 28. Thus, when there are a plurality of target areas on which the super-resolution reconstruction is to be executed, higher priority is set for the re-scanning involving the super-resolution reconstruction for an area farther from an area where a sudden change occurs at a high frequency.

Examples of Processing Executed in Present Embodiment

Figure 29:
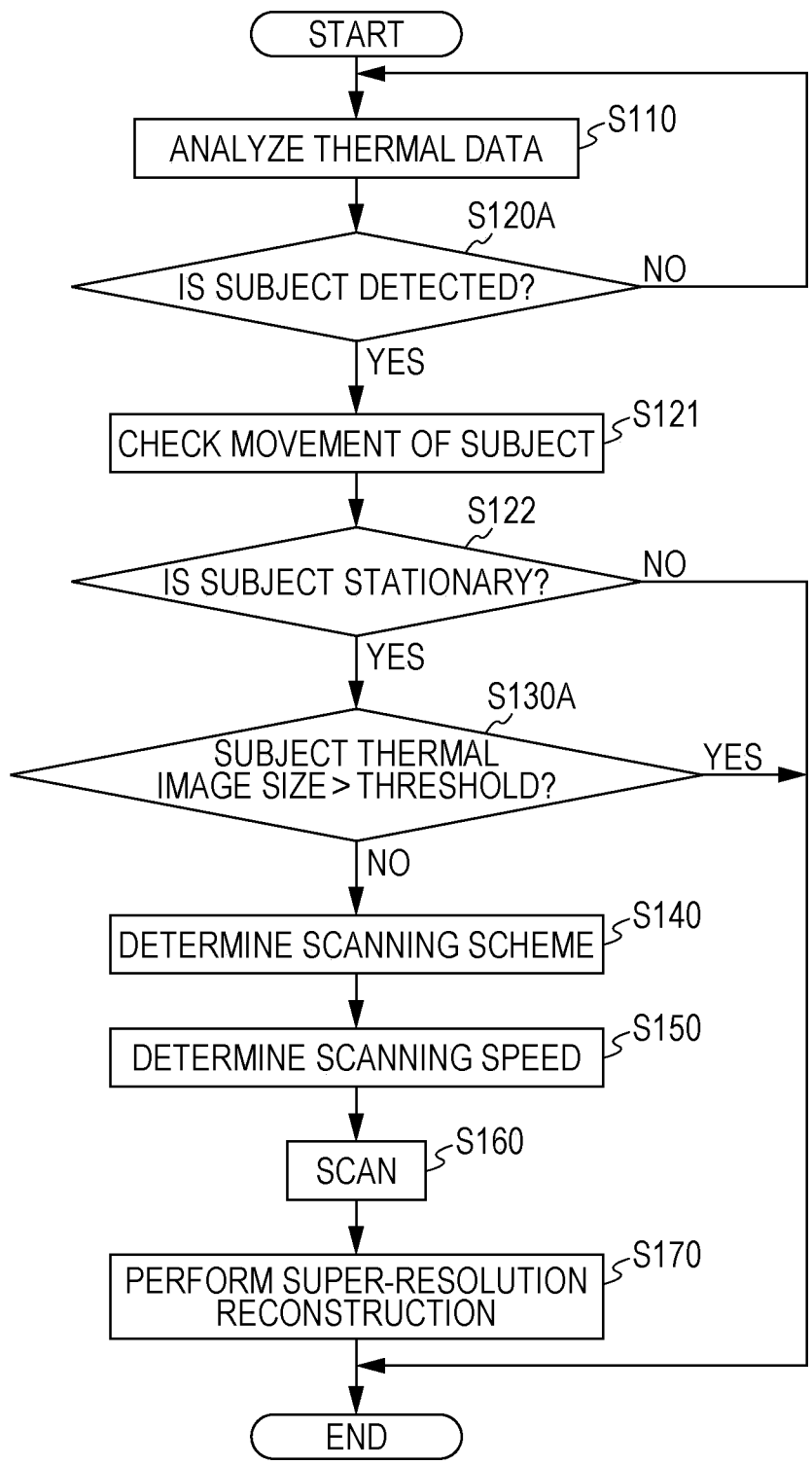
FIG. 29 is a flowchart illustrating one example of processing executed by the air-conditioning apparatus according to a second embodiment.

FIG. 29 is a flowchart illustrating one example of processing executed by the air-conditioning apparatus 100 according to the second embodiment. Specifically, FIG. 29 is a flowchart illustrating one example of processing performed by the processor 800. FIG. 29 illustrates a case in which the processor 800 monitors the room and executes processing corresponding to a different type of application, such automatic air-temperature setting, based on what is detected by the monitoring. The flowchart in FIG. 29 also includes a process for preventing an error due to movement of an object when the re-scan processing for the super-resolution reconstruction is performed. The operation of the processor 800 in use case 2-1 can be systematically described with reference to the flowchart in FIG. 29. The flowchart in FIG. 29 is merely an example. Thus, the processor 800 may execute various auxiliary steps in addition to the steps in FIG. 29.

Processes in step S110 and steps S140 to S170 in FIG. 29 are substantially the same as the steps described above in the first embodiment with reference to FIG. 21. Thus, the description of the processes in step S110 and steps S140 to S170 also applies to the second embodiment.

In the flowchart in FIG. 29, the processor 800 executes step S120A and step S130A instead of step S120 and step S130 in FIG. 21. In addition, steps S121 and S122 are further added.

In step S120A, based on a result obtained in step S110, the processor 800 performs detection processing as to whether or not a subject thermal image, which is distinguished from a background thermal image, is successfully acquired, that is, whether or not a subject is present in the room. If no subject is present, the processor 800 updates the thermal data of the background by using the current thermal data and executes the process in step S110 again. If a subject is present, step S121 is executed.

In step S121, movement in the subject thermal image is examined by performing high-speed re-scanning on the area of the subject thermal image detected in step S110 and the surroundings of the area. The movement of a subject is determined by comparing the thermal images collected in the first scanning with other thermal images collected during re-scanning of the area. When a change between a target area during the first scanning and a target area during the re-scanning is small, it is determined that the subject is a stationary object. Thereafter, step S122 is executed.

In step S122, a determination is made as to whether or not the subject is a stationary object. If the amount of the movement of the subject is smaller than a predetermined amount, other than a case in which the subject is completely stationary, it may also be determined that the subject is a stationary object. If it is determined that the subject is a stationary object, the process proceeds to step S130A. Otherwise, the processing ends.

In step S130A, the processor 800 determines whether or not the size of the subject thermal image is larger than a threshold size set according to a resolution needed by each application executed by the processor 800. If the size of the subject thermal image is larger than the threshold size, it is determined that the resolution of a foreground thermal image is sufficiently high and the super-resolution reconstruction is not needed. If the size of the subject thermal image is smaller than or equal to the threshold size, it is determined that the resolution of the subject thermal image is not sufficiently high and the super-resolution reconstruction is needed. Thus, the processor 800 advances to step S140. Thereafter, the processes in steps S140 to S170 illustrated in FIG. 21 are executed.

Figure 30:
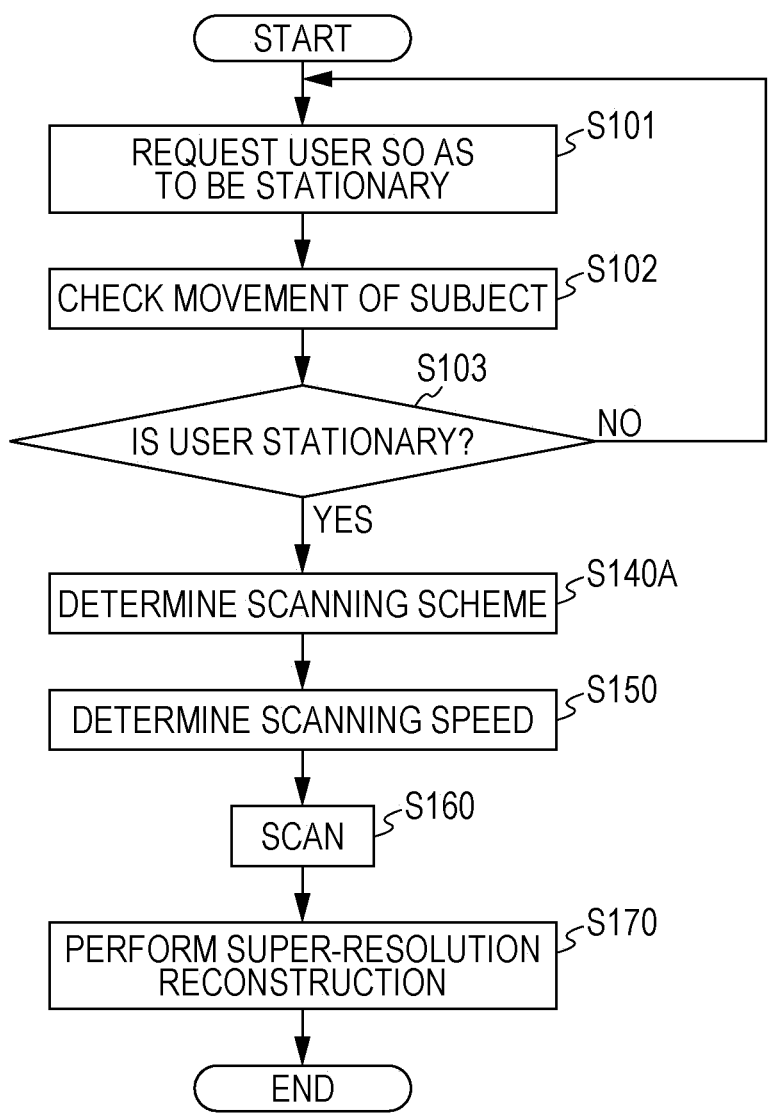
FIG. 30 is a flowchart illustrating one example of processing executed by the air-conditioning apparatus according to the second embodiment.

FIG. 30 is a flowchart illustrating one example of processing executed by the air-conditioning apparatus 100 according to the second embodiment. Specifically, FIG. 30 is a flowchart illustrating one example of other processing performed by the processor 800. FIG. 30 illustrates a case in which the user of the air-conditioning apparatus 100 requests an application requiring the super-resolution reconstruction. The operation of the processor 800 in use case 2-2 can be systematically described with reference to the flowchart in FIG. 30. The flowchart in FIG. 30 is merely an example. Thus, the processor 800 may execute various auxiliary steps in addition to the steps in FIG. 30.

Processes in steps S150 to S170 in FIG. 30 are substantially the same as the steps described above in the first embodiment with reference to FIG. 21. Thus, the description of the processes in steps S150 to S170 also applies to the second embodiment.

In the flowchart in FIG. 30, the processor 800 executes step S140A instead of step S140 in FIG. 21. The processes in steps S110 to S130 in FIG. 21 are eliminated, and processes in steps S101 to S103 are newly added.

In step S101, after receiving, from the user, a request for executing a particular application requiring the super-resolution reconstruction, the processor 800 requests, via a user interface device such as the mobile phone of the user or the remote controller 720, the person (such as the user) so as not to move. This is intended to prevent movement of the subject from causing an error in the processing of the super-resolution reconstruction. Thereafter, step S102 is executed.

It is to be noted that the subject thermal image is acquired before the processing is started. When a plurality of people are present in the room and thus a plurality of subject thermal images are detected, the user who has the user interface device may identify a target user of the application.

In step S102, movement in a subject thermal image of a target user is examined by performing high-speed re-scanning on the area of the subject thermal image and the surroundings of the area. Thereafter, step S103 is executed.

In step S103, a determination is made as to whether or not the subject is a stationary object. If the amount of the movement of the subject is smaller than a predetermined amount, other than a case in which the subject is completely stationary, it may also be determined that the subject is a stationary object. If it is determined that the subject is a stationary object, the process proceeds to step S140A. Otherwise, the process returns to step S101.

In step S140A, the scanning scheme (the second scanning scheme) for the super-resolution reconstruction is determined based on the current resolution and the expected resolution set by each application executed by the processor 800. For example, when the expected resolution is higher than the current resolution, a scanning scheme having a finer scanning step is selected, and when the expected resolution is lower than the current resolution, a scanning scheme having a general scanning step is selected. Thereafter, the processes described above in steps S150 to S170 in FIG. 21 are executed.

Figure 31:
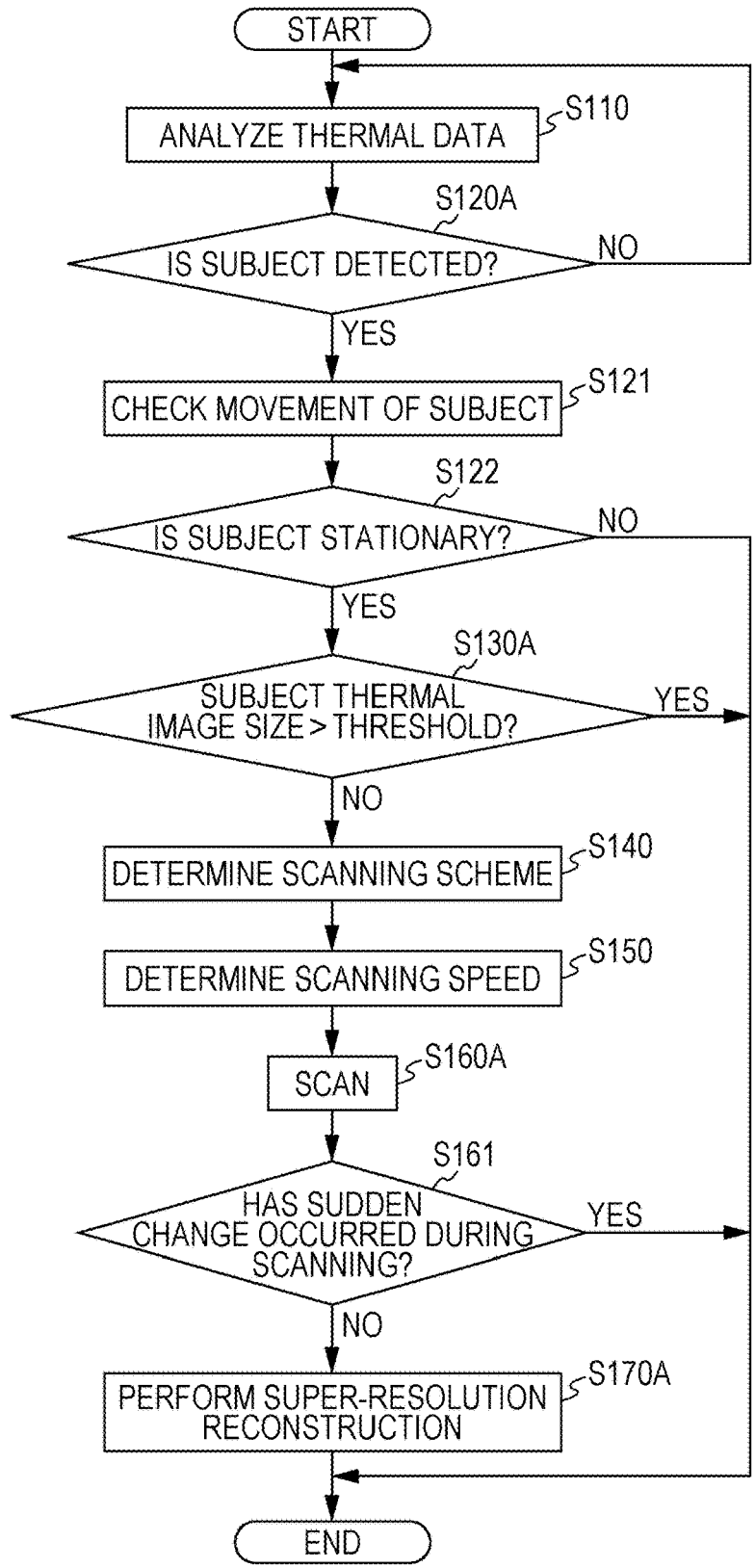
FIG. 31 is a flowchart illustrating one example of processing executed by the air-conditioning apparatus according to the second embodiment.

FIG. 31 is a flowchart illustrating one example of processing executed by the air-conditioning apparatus 100 according to the second embodiment. Specifically, FIG. 31 is a flowchart illustrating one example of processing performed by the processor 800. FIG. 31 illustrates a case in which the processor 800 monitors the room and executes processing corresponding to a different type of application, such automatic air-temperature setting, based on what is detected by the monitoring. The flowchart in FIG. 31 includes processing for preventing an error due to movement of an object during the re-scan processing for the super-resolution reconstruction. The movement of the object may be movement of the object itself or a change in a background thermal image of the surroundings of the object. The operation of the processor 800 in use case 2-3 can be systematically described with reference to the flowchart in FIG. 31. The flowchart in FIG. 31 is merely an example. Thus, the processor 800 may execute various auxiliary steps in addition to the steps in FIG. 31.

Processes in steps S110 to S150 in FIG. 31 are substantially the same as the steps described above with reference to FIG. 29. Thus, the description of the processes in steps S110 to S150 in FIG. 29 also applies to FIG. 31.

In the flowchart in FIG. 31, the processor 800 executes steps S160A and S170A instead of steps S160 and S170 in FIG. 29. In addition, step S161 is further added.

In step S160A, the processor 800 instructs the infrared sensor 300 to use the scanning scheme determined in step S140 and the scanning speed determined in S150 to re-scan an area identified with the detected subject thermal image. If a sudden change, which may be a change in the subject thermal image of the scan area, has occurred during the scan processing in step S160A, the process in step S161 is stopped. Otherwise, step S170A is executed. A sudden change in the subject thermal image can be detected through comparison with another frame of a line thermal image acquired from the same position during the scan processing in step S160A.

In step S170A, the processor 800 performs a computational operation for the super-resolution reconstruction by using data tokens resulting from the scanning performed in step S160A. When step S170A is completed, a reconstructed subject thermal image having a higher resolution is acquired. After step S170 is appropriately executed, the processing ends.

It should be noted that three major use cases are available in the second embodiment described above. Use case 2-1 is focused on preventing the occurrence of an error due to movement of a subject in the super-resolution reconstruction processing automatically performed by the air-conditioning apparatus 100. Use case 2-2 is focused on preventing the occurrence of an error due to movement of a subject in the super-resolution reconstruction processing requested by an instruction given by the user of the air-conditioning apparatus 100. Use case 2-3 is focused on preventing the occurrence of an error due to a sudden change in a background thermal image in the super-resolution reconstruction.

An important point in use case 2-1 is to prevent an error due to movement of a subject in the super-resolution reconstruction. Thus, steps S121 and S122 are included in the processing illustrated in FIG. 29 or 31. In this case, the air-conditioning apparatus 100 automatically performs the processing. The operation of the air-conditioning apparatus 100 using a scheme for preventing an error can be easily evaluated in the super-resolution reconstruction in the processing in FIG. 29 or 31. A trigger for an event is the state of movement of a person. The pattern of scanning performed by the infrared sensor 300 changes in response to the trigger. In addition, an effect of the operation of the air-conditioning apparatus 100 in response to different types of trigger can be clearly communicated to the user via various user interfaces, such as those illustrated in FIGS. 26A and 26B.

An important point in use case 2-2 is to prevent an error due to movement of a subject in the super-resolution reconstruction indicated by an application that was requested by the user and that is being executed. Accordingly, the processing includes the processes in steps S101 to S103 illustrated in FIG. 30. It is possible to easily evaluate the operation of the air-conditioning apparatus 100 using the scheme for preventing an error in the super-resolution reconstruction in the processing illustrated in FIG. 30. A trigger for an event is the user issuing a request for an application requiring the super-resolution reconstruction. In response to the trigger, the air-conditioning apparatus 100 requests the target user via the user interface so as to be stationary, and the pattern of the scanning performed by the infrared sensor 300 varies depending on the details of each application. In addition, an output of the processing varies depending on the selected application. The output may be communicated to the user via the user interface. For example, a temperature automatically selected by an automatic-temperature-selecting application may be displayed.

An important point in use case 2-3 is to prevent an error due to a sudden change in the background of the surroundings of a subject in the super-resolution reconstruction. Accordingly, this processing includes the process in steps S161 illustrated in FIG. 31. It is possible to evaluate the operation of the air-conditioning apparatus 100 using the scheme for preventing an error in the super-resolution reconstruction in the processing illustrated in FIG. 31. A trigger for an event is a sudden change in the background of the surroundings of a subject. The motion of the infrared sensor 300 in the air-conditioning apparatus 100 changes in response to the trigger. In addition, an effect of the operation of the air-conditioning apparatus 100 in response to different types of trigger can be clearly communicated to the user via various user interfaces, such as those illustrated in FIGS. 26A and 26B.

(3) Third Embodiment

A sensor control method executed by the air-conditioning apparatus 100 according to a third embodiment (a method for determining a scanning scheme to be used by the infrared sensor 300) will now be described in conjunction with use cases.

[Use Case 3-1]

Figure 32:
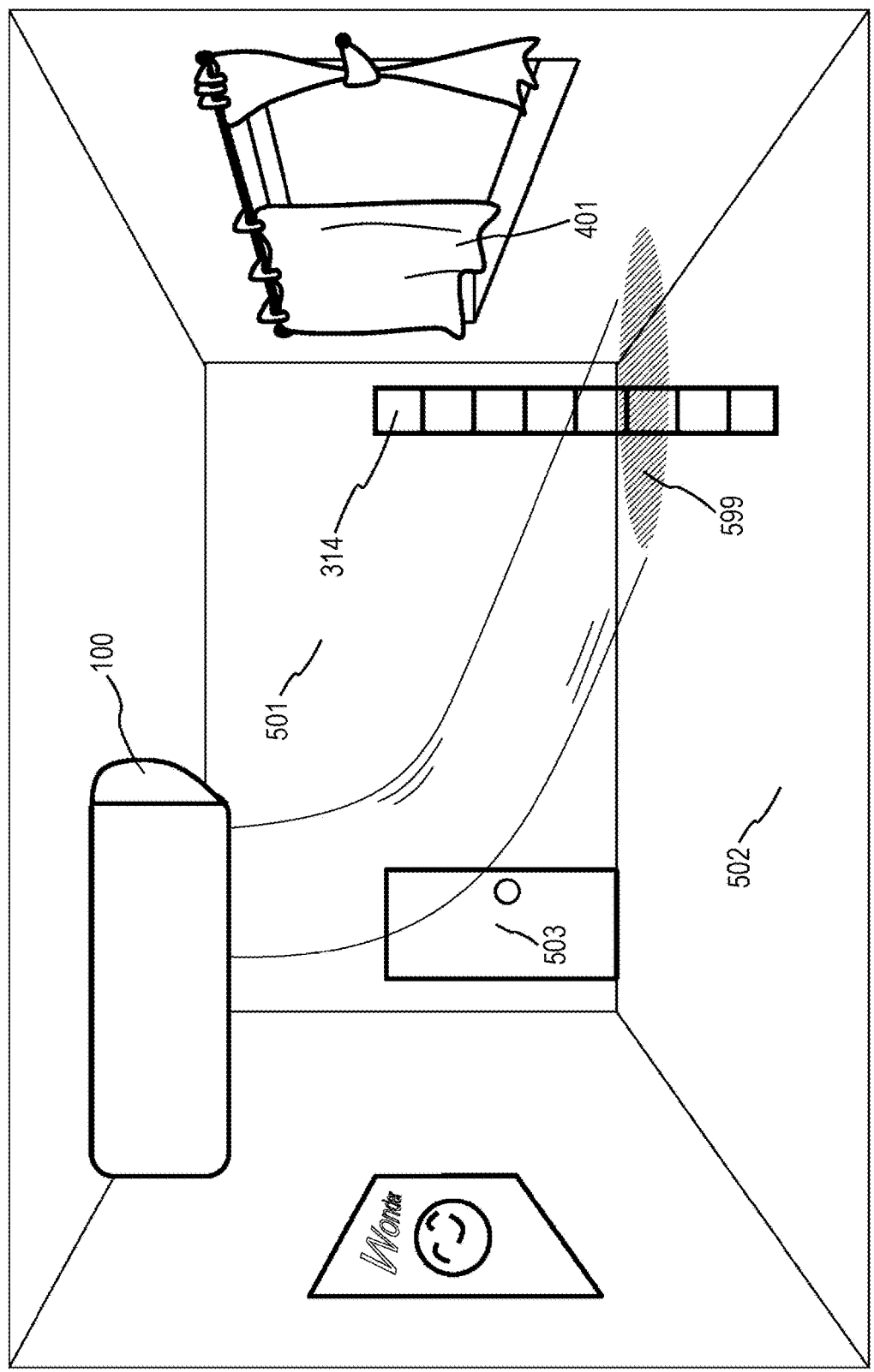
FIG. 32 is a schematic view illustrating use case 3-1 of the air-conditioning apparatus.

FIG. 32 is a schematic view illustrating use case 3-1 of the air-conditioning apparatus 100. Specifically, FIG. 32 is a schematic view of a state of a room viewed from the front side of the air-conditioning apparatus 100 in use case 3-1. Use case 3-1 is an example in which no subject is detected in the room, as in a case in which there is no one in the room.

The air-conditioning apparatus 100 collects features regarding heat in each area in the room, for example, by operating a background-feature obtaining mode. Different objects, such as a curtain 401, a wall 501, a floor 502, and a door 503, in the room may be made of different materials and have different volumes. Accordingly, those objects have different thermal capacities. Thermal energy is transmitted between the air in the room and those objects, so that a temperature change occurs. In particular, when an air flow is directly blown from the louvers 110 to an object, the presence of a temperature difference between the object and the air accelerates the process of the thermal energy transmission. The temperature change can be large, small, slow, or fast, depending on the thermal capacity of the object.

When there is a difference between the thermal capacities of objects in the room, the thermal data of the background are not appropriately updated, and thus there is a possibility that an error occurs in the subject detection processing. Accordingly, the air-conditioning apparatus 100 in the present embodiment tests and stores features of thermal transmission in the background of each area in the room when no subject is detected. In order to test the features of thermal transmission in the background of an area of interest, the air-conditioning apparatus 100 directs the air flow from the louvers 110 to a test area 599, moves the infrared sensor 300 in order to measure the temperature in the target area, and stores feature data of the area on which the rate of temperature change due to the quality of the air flow and so on were tested. The stored feature data may be utilized for processing for updating the thermal data of the background in order to enhance the accuracy of the subject detection processing.

Information indicating the occurrence of a temperature change in the background is significantly affected by the blowing direction and the features of the thermal transmission of an object in the room. An area to which the air flow from the louvers 110 is directed or an area where the thermal capacity of the background is small may be more frequently repeatedly scanned, compared with other areas.

[Use Case 3-2]

Figure 33A:
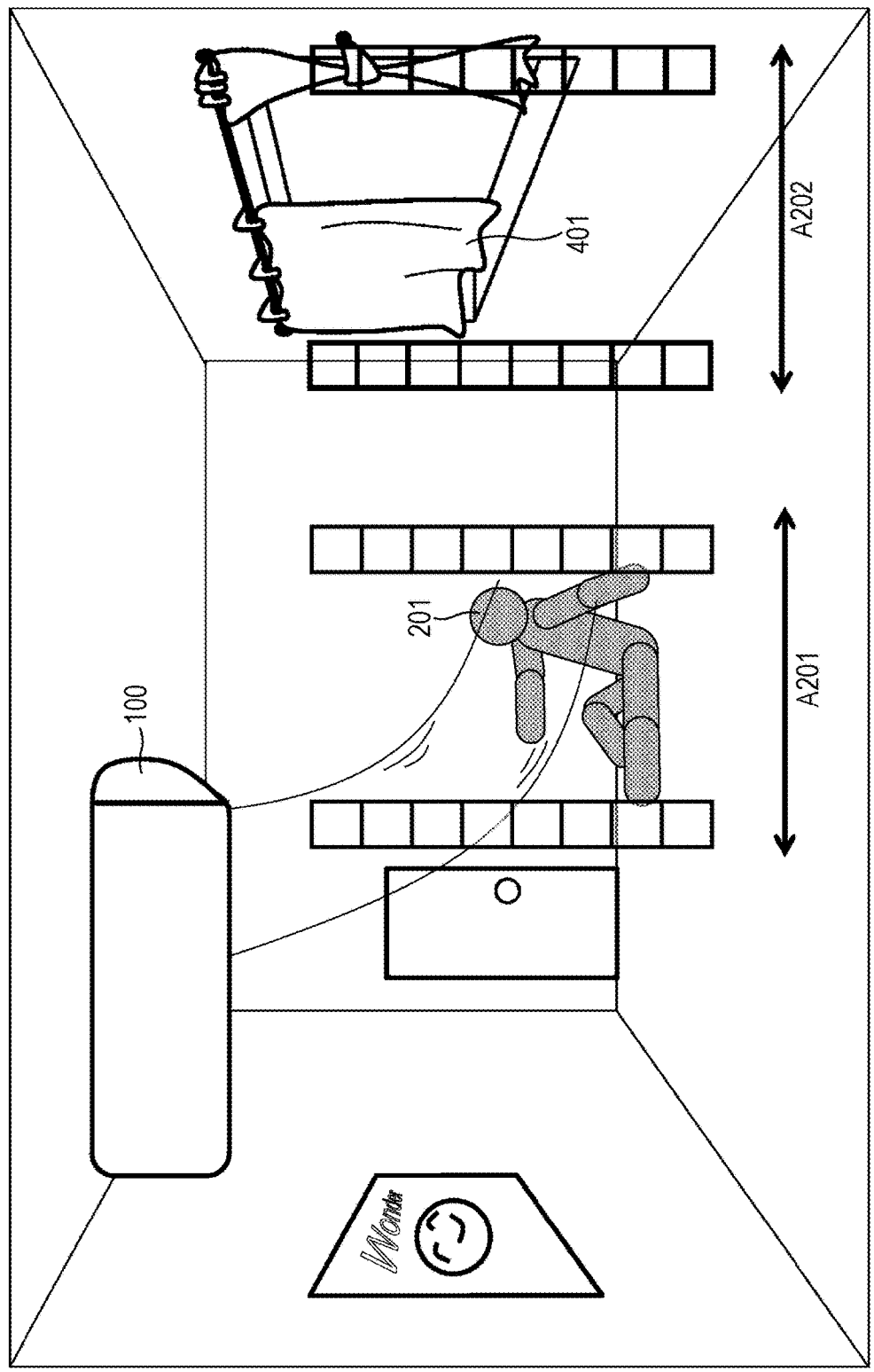
FIG. 33A is a schematic view illustrating use case 3-2 of the air-conditioning apparatus.
Figure 33B:
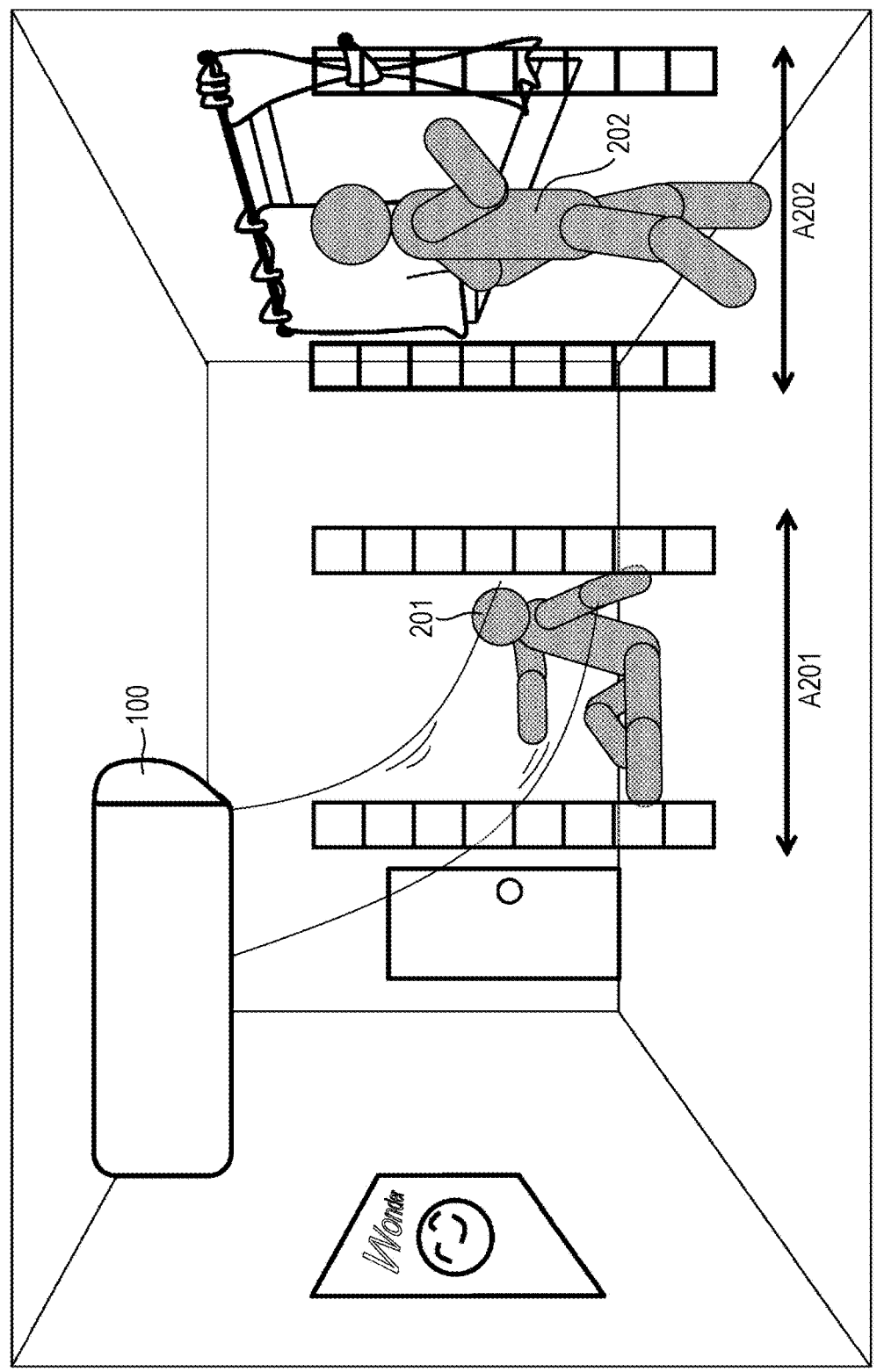
FIG. 33B is a schematic view illustrating use case 3-2 of the air-conditioning apparatus.

FIGS. 33A and 33B are schematic views of use case 3-2 of the air-conditioning apparatus 100. Specifically, FIGS. 33A and 33B illustrate the state of a room viewed from the front side of the air-conditioning apparatus 100 in use case 3-2. Use case 3-2 is an example in which only one person, that is, a first person 201, is in the room.

The air-conditioning apparatus 100 detects the presence of the first person 201 and directs the air flow to the first person 201. Thus, there is a possibility that the air flow affects the temperatures in the background area around the first person 201. In order to effectively update the background thermal data of the area, the infrared sensor 300 may more frequently scan an area A201 than other areas. In addition, a curtain 401 having a relatively small thermal capacity exists in an area A202. Thus, in order to obtain appropriate update data from the area A202, the infrared sensor 300 may more iteratively scan the area A202 than other areas except the area A201.

As illustrated in FIG. 33B, when a second person 202 enters the room and moves to the area A202, the thermal data of the background of the area A202 is appropriately updated, so that the second person 202 is detected appropriately and accurately.

Examples of Processing Executed in Present Embodiment

Figure 34A:
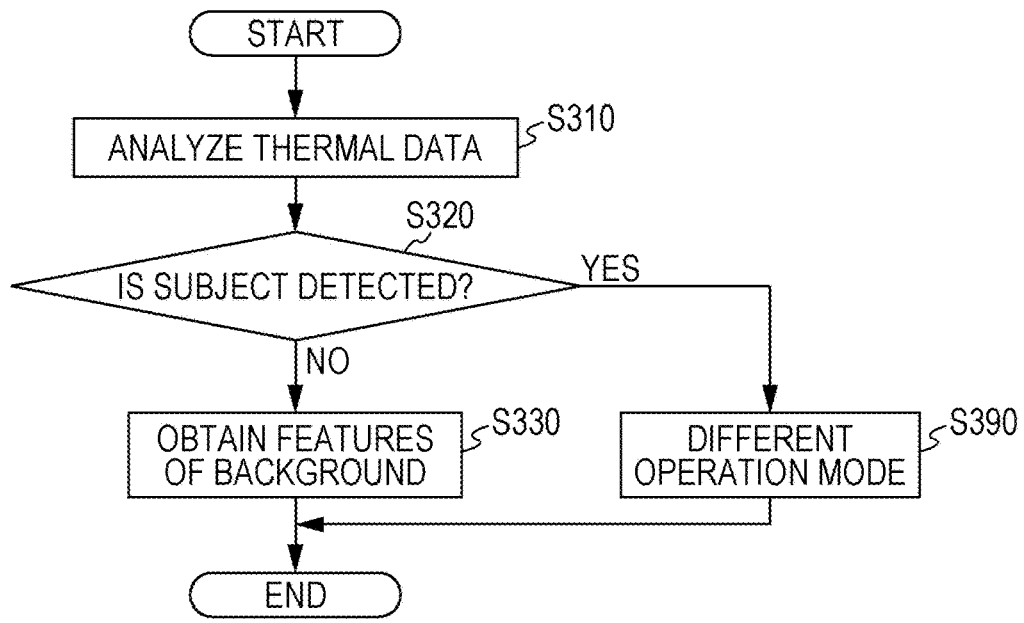
FIG. 34A is a flowchart illustrating one example of processing executed by the air-conditioning apparatus according to a third embodiment.

FIG. 34A is a flowchart illustrating one example of processing executed by the air-conditioning apparatus 100 according to the third embodiment. Specifically. FIG. 34A is a flowchart illustrating one example of processing performed by the processor 800. FIG. 34A illustrates a case in which the processor 800 operates to obtain features of the background in an air-conditioned space (room) where the air-conditioning apparatus 100 is installed. The operation of the processor 800 in use case 3-1 can be systematically described with reference to the flowchart in FIG. 34A. The flowchart in FIG. 34A is merely an example. Thus, the processor 800 may execute various auxiliary steps in addition to the steps in FIG. 34A.

In step S310, the processor 800 analyzes the current thermal data when it is compared with background thermal data and distinguishes between a background thermal image showing a subject and a subject thermal image included in the background thermal image. Thereafter, step S320 is executed. In step S320, based on a result obtained in step S310, the processor 800 performs detection processing as to whether or not a subject is present. If no subject is present, the processor 800 advances to step S330 in order to obtain features of the background. Otherwise, before ending the processing, the processor 800 advances to step S390 in order to perform another operation mode. In step S330, the processor 800 obtains features of the background of an area in the room. Thereafter, the processing ends.

Figure 34B:
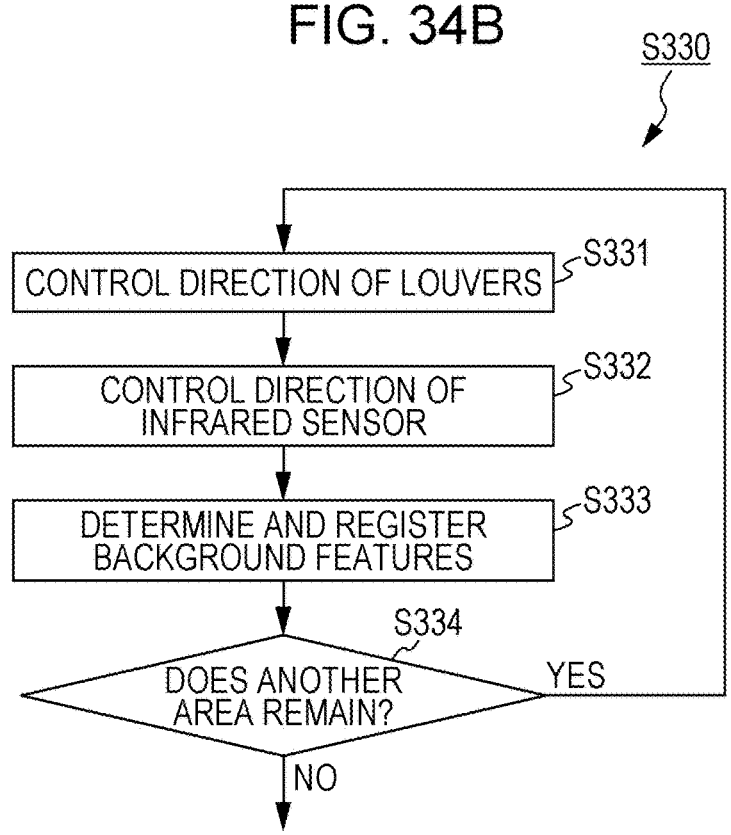
FIG. 34B is a flowchart illustrating one example of the processing executed by the air-conditioning apparatus according to the third embodiment.

FIG. 34B is a flowchart illustrating one example of processing executed by the air-conditioning apparatus 100 according to the third embodiment. Specifically, FIG. 34B is a flowchart illustrating one example of detailed processing of step S330 in FIG. 34A.

In step S331, the direction of the louvers 110 is controlled so that an air flow is blown to a target area from which features regarding heat in the background are to be obtained. Thereafter, step S332 is executed. In step S332, the direction of the infrared sensor 300 is controlled in order to obtain thermal data around the area to which the air flow from the louvers 110 is directed. Thereafter, step S333 is executed. In step S333, in accordance with the thermal data collected while the air flow is being blown to the area, features regarding heat in the area are determined and registered. Thereafter, step S334 is executed. In step S334, the processor 800 checks whether or not another area from which features of the background are to be obtained remains. If an area from which features in the background are to be obtained remains, the processor 800 executes step S331. Otherwise, step S330 ends.

Figure 35:
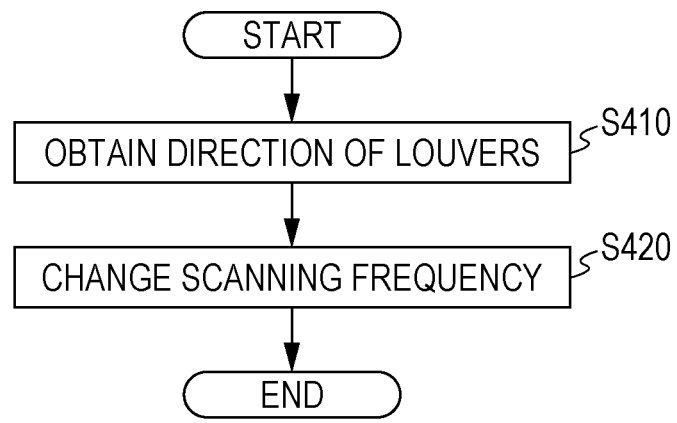
FIG. 35 is a flowchart illustrating one example of processing executed by the air-conditioning apparatus according to the third embodiment.

FIG. 35 is a flowchart illustrating one example of processing executed by the air-conditioning apparatus 100 according to the third embodiment. Specifically, FIG. 35 is a flowchart illustrating one example of processing performed by the processor 800 when the processor 800 operates the infrared sensor 300 to obtain appropriate data in order to update the background data of the area to which the louvers 110 direct the air flow.

In step S410, the processor 800 obtains the direction of the louvers 110 from the actuator controller 710. Thereafter, step S420 is executed. In step S420, the processor 800 modifies the scanning frequency of the infrared sensor 300 in accordance with the direction of the louvers 110 which was obtained in step S410. Thereafter, the processing ends.

It is to be noted that there are two highly associated use cases in the third embodiment described above. Use case 3-1 is focused on obtaining features of the background of an area in the room. Use case 3-2 is focused on appropriately updating the stored background data on the basis of the blowing direction and the detected background features.

An important point in use case 3-1 is that background features that differ depending on the volumes of objects in the background and the materials of the objects are obtained when there is no important thermal event in the room. Accordingly, before it is determined that the background-feature obtaining mode is to be operated, steps S310 and S320 are executed in order to check whether or not there is an important thermal event in the room. It is possible to easily evaluate the operation of the air-conditioning apparatus 100 using the above-described scanning scheme. A trigger for an event is the absence of a subject which occurs in the current state of the room, such as the absence of a person in the room. In accordance with the trigger, the movement of the louvers 110 and the scanning direction of the infrared sensor 300 vary.

An important point in use case 3-2 is that the scanning scheme of the infrared sensor 300 be appropriately adjusted in accordance with the previously obtained features of the thermal transmission of the background and the blowing direction (or the direction of the louvers). As illustrated in FIG. 35, the scanning frequency of the infrared sensor 300 may be modified according to the direction of the louvers 110. It is possible to easily evaluate the operation of the air-conditioning apparatus 100 using the above-described scanning scheme. A trigger for an event is the direction of the louvers 110. The scanning scheme of the infrared sensor 300 changes in response to the trigger.

In addition to the above description, the scanning speed or the scanning step can be modified, in addition to modifying the scanning frequency of the infrared sensor 300 according to the thermal transmission features of the background of each area in the room. Since the infrared sensor has a possibility that the background temperature of an area where the thermal capacity is large rarely changes, it may roughly scan the area with a coarse scanning step or with a high speed. Also, the infrared sensor has a possibility that the background temperature of an area where the thermal capacity is small changes easily, it may closely scan the area with a finer scanning step or with a low speed.

(4) Fourth Embodiment

A sensor control method executed by the air-conditioning apparatus 100 according to a fourth embodiment (a method for determining a scanning scheme to be used by the infrared sensor 300) will now be described in conjunction with use cases.

[Use Case 4-1]

Figure 36:
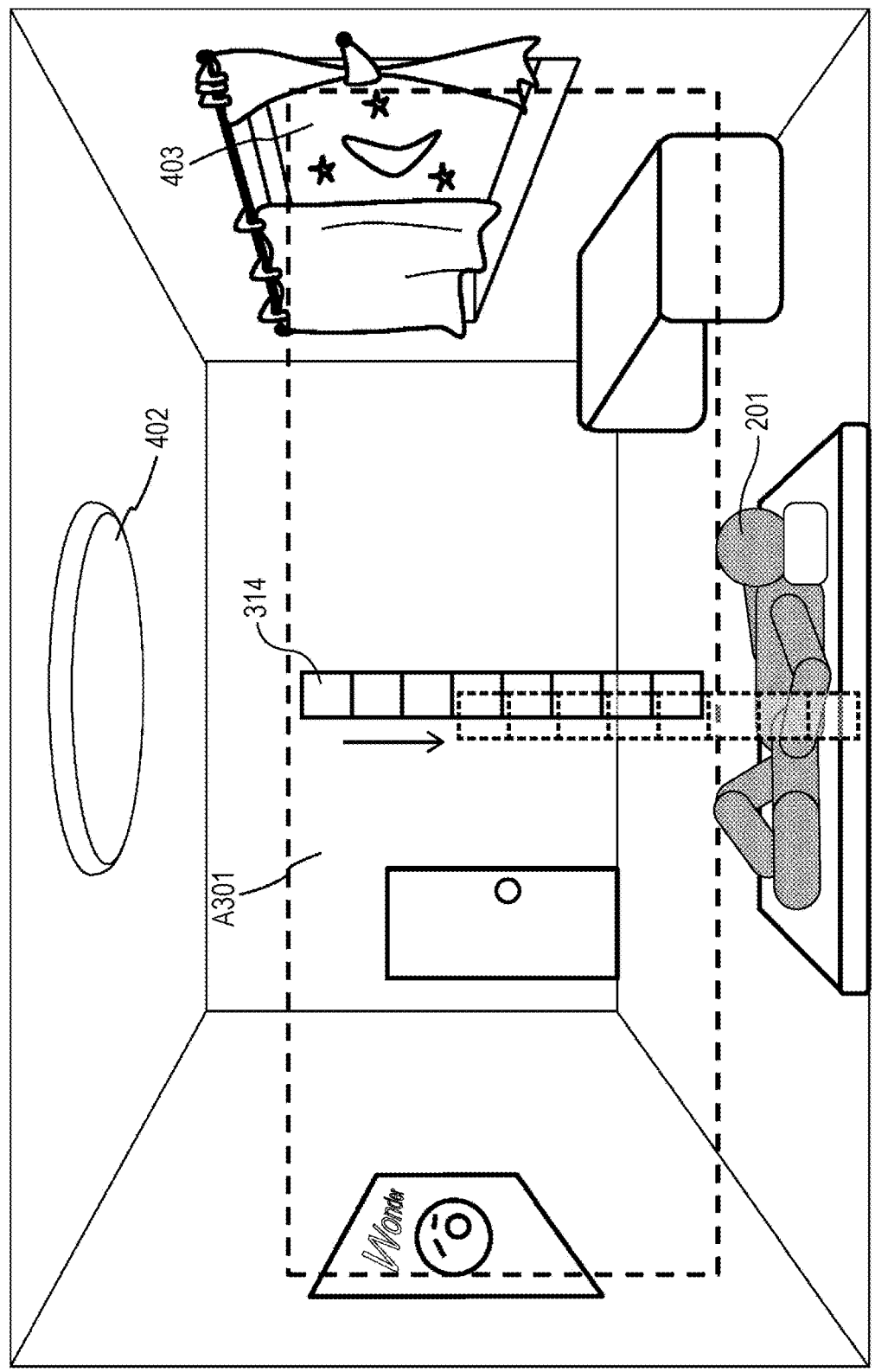
FIG. 36 is a schematic view illustrating use case 4-1 of the air-conditioning apparatus.

FIG. 36 is a schematic view illustrating use case 4-1 of the air-conditioning apparatus 100. Specifically, FIG. 36 is a schematic view of a state of a room viewed from the front side of the air-conditioning apparatus 100 in use case 4-1. Use case 4-1 is an example in which a person 201 who is in the room is lying down and relaxing. When the light intensity in the room decreases, it is possible to presume that the person 201 is going to rest from now. For example, the person 201 may put off a ceiling light 402 or control the lighting thereof in order to take a rest, such as a nap or sleep. Although the air-conditioning apparatus 100 is not illustrated in FIG. 36, the air-conditioning apparatus 100 is located, for example, at a position that is the same as or similar to the position illustrated in FIG. 32, 33A, 33B, or the like.

When the person 201 moves from an area A301, which is generally scanned by the infrared sensor 300, to a different position, for example, to a position near or below the air-conditioning apparatus 100, there is a possibility that the infrared sensor 300 loses sight of the footsteps of the person 201. Thus, the infrared sensor 300 re-scans the area A301, which is generally scanned, and checks whether or not the person 201 has moved to another position in the area A301. When the air-conditioning apparatus 100 fails to find the person 201 in the area A301, which is generally scanned, the air-conditioning apparatus 100 tilts the infrared sensor 300 so that line thermal images 314 of a lower position are acquired, as illustrated in FIG. 36. Thereafter, the infrared sensor 300 horizontally scans the lower position in the entire room in order to detect the presence of the person 201. When the infrared sensor 300 detects the person 201 in the lower position, the air-conditioning apparatus 100 may change the operation mode in accordance with the person 201 or the state of the person 201. When the air-conditioning apparatus 100 fails to detect the person 201 in the room, the air-conditioning apparatus 100 may be automatically turned off for energy saving.

When the person 201 moves within the area A301, which is generally scanned, or when the person 201 stays at the same position, the operation mode of the air-conditioning apparatus 100 may be changed according to the person 201 or the state of the person 201.

With respect to a change in the above-described operation mode, the air-conditioning apparatus 100 may automatically determine that the mode is to be changed, by using the state, such as the movement, of the person 201. Alternatively, the air-conditioning apparatus 100 may also query the person 201 so as to select a desired operation mode, such as a sleep mode.

When the light intensity in the room decreases owing to an external factor, such as an external light intensity, the air-conditioning apparatus 100 may execute the operation described above and illustrated in FIG. 36.

On the other hand, when the person 201 requests the air-conditioning apparatus 100 via an interface so as to change the operation mode to a different mode, such as a sleep mode, and the air-conditioning apparatus 100 fails to detect the person 201 in the area A301, which is generally scanned, the air-conditioning apparatus 100 may tilt the infrared sensor 300 downward to scan a lower position.

The condition of light in the room may be obtained by the illuminance sensor attached to the air-conditioning apparatus 100, or network information regarding the on/off state or the lighting-control state of the ceiling light 402 may be obtained as the condition of light. The network information may be transferred through a common local network between the air-conditioning apparatus 100 and the ceiling light 402 or through a public network, such as the Internet.

The operation mode of the air-conditioning apparatus 100 may also be changed to the sleep mode by utilizing the user's daily-life pattern learnt by the artificial intelligence of the air-conditioning apparatus 100.

Figure 37A:
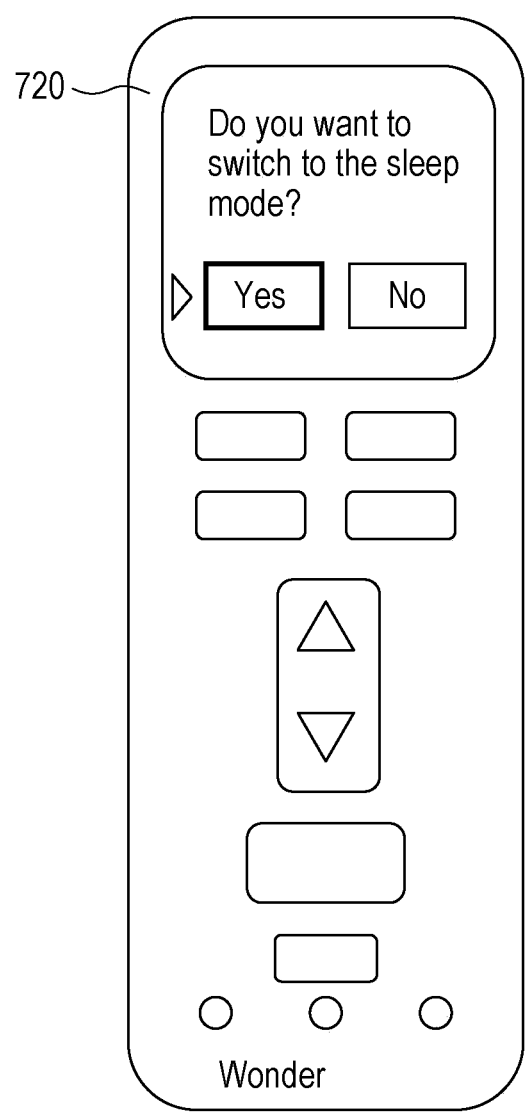
FIG. 37A is a schematic view of one example of the user interface of the air-conditioning apparatus.
Figure 37B:
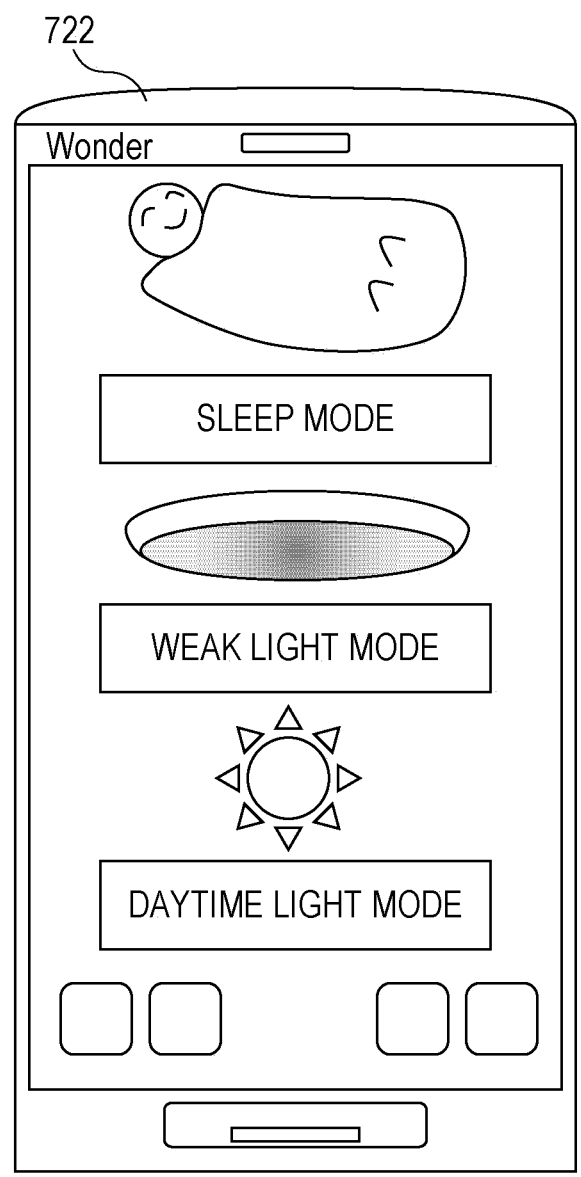
FIG. 37B is a schematic view of one example of the user interface of the air-conditioning apparatus.

FIGS. 37A and 37B are schematic views of examples of the user interface of the air-conditioning apparatus 100. Specifically, FIGS. 37A and 37B illustrate examples of a user interface for selecting the operation mode of the air-conditioning apparatus 100. The user interface may communicate with the user via the remote controller 720 or a mobile phone (smartphone) connected to a common network to which the air-conditioning apparatus 100 is also connected. The user interface may also notify the user about confirmation of an operation mode change. The user interface may also select the operation mode of the air-conditioning apparatus 100.

Examples of Processing Executed in Present Embodiment

Figure 38:
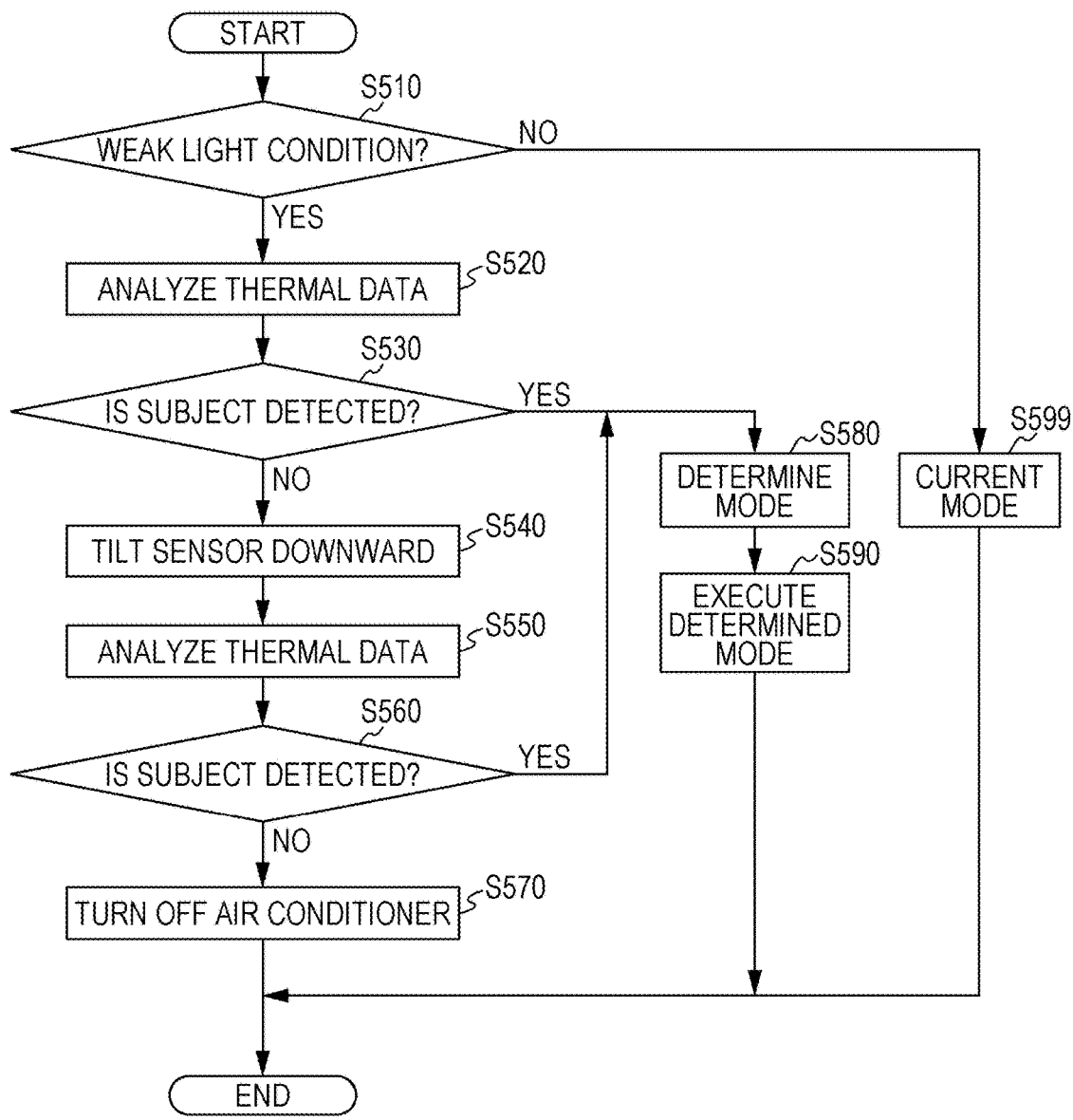
FIG. 38 is a flowchart illustrating one example of processing executed by the air-conditioning apparatus according to a fourth embodiment.

FIG. 38 is a flowchart illustrating one example of processing executed by the air-conditioning apparatus 100 according to the fourth embodiment. Specifically. FIG. 38 is a flowchart illustrating one example of processing performed by the processor 800. FIG. 38 illustrates a case in which the condition of light in the room varies. The operation of the processor 800 in use case 4-1 can be systematically described with reference to the flowchart in FIG. 38. The flowchart in FIG. 38 is merely an example. Thus, the processor 800 may execute various auxiliary steps in addition to the steps in FIG. 38.

In step S510, the condition of light in the room is examined. If the light intensity is low, the process proceeds to step S520. Otherwise, the process proceeds to step S599. In step S520, subject detection processing for the user is executed on an area generally scanned. Thereafter, step S530 is executed. In step S530, based on a result obtained in step S520, the processor 800 performs detection processing as to whether or not a subject is present in the area generally scanned. If no subject is present, the processor 800 advances to step S540. If a subject is present, step S580 is executed.

In step S540, the air-conditioning apparatus 100 tilts the infrared sensor 300 downward to direct it to a lower position. Thereafter, step S550 is executed. In step S550, the air-conditioning apparatus 100 uses the infrared sensor 300 to horizontally scan the lower position in the room and executes the subject detection processing on the user in the scanned area. Thereafter, step S560 is executed. In step S560, based on a result obtained in step S550, the processor 800 checks whether or not a subject is present in the lower area. If no subject is present, the processor 800 advances to step S570. If a subject is present, step S580 is executed. In step S570, the air-conditioning apparatus 100 is turned off, and then the processing ends.

In step S580, the operation mode of the air-conditioning apparatus 100 is determined by the user or according to the state of the user. Thereafter, step S590 is executed. In step S590, the operation mode determined in step S580 is executed, and the processing ends. In step S599, the current mode is continuously executed, and the processing for examining the condition of light ends.

FIG. 39 is a flowchart illustrating one example of processing executed by the air-conditioning apparatus 100 according to the fourth embodiment. Specifically, FIG. 39 is a flowchart illustrating one example of detailed processing of step S580 in FIG. 38.

In step S581, movement in a subject thermal image of a target user is examined by performing high-speed re-scanning on the area of the subject thermal image and the surroundings of the area. Thereafter, step S582 is executed. If the subject in the subject thermal image is stationary or movement of the subject is small to a degree that it can be regarded as a stationary object in step S582, the process proceeds to step S585. Otherwise, the process proceeds to step S583. In step S583, the air-conditioning apparatus 100 queries the user as to whether or not he or she wants to change the operation mode to the sleep mode. If it is confirmed that the user wants to change the operation mode to the sleep mode, step S585 is executed. Otherwise, step S584 is executed. In step S584, the processor 800 continuously executes the current operation mode of the air-conditioning apparatus 100. In step S585, the processor 800 changes the operation mode of the air-conditioning apparatus 100 to the sleep mode.

Use case 4-1 in the fourth embodiment described above is focused on the operations of the air-conditioning apparatus 100 and the infrared sensor 300 therein, the operations being based on the condition of light in the room. It is possible to easily evaluate the operation of the air-conditioning apparatus 100 using the above-described scanning scheme. A trigger for an event is the condition of light in the room. The motion of the infrared sensor 300 and the operation mode of the air-conditioning apparatus 100 can be changed in response to the trigger.

Application Examples

Now, a description will be given of a method for improving the quality of a thermal image by using another iterative-scanning scheme. This method is applicable to all of the above-described embodiments.

Example 1 of Iterative-Scanning Scheme

When the size of a thermal image of a subject is small, there is a possibility that the super-resolution reconstruction is required in order to enhance the resolution of the thermal image. Since the infrared sensor has a relatively large amount of noise, the appropriate scanning scheme and scanning speed are selected as described above in the embodiments, but there is a possibility that the thermal image reconstruction cannot be executed successfully. Thus, when the size of the thermal image of a subject is small, it is necessary to perform the iterative scanning on the same area. Performing the iterative scanning makes it possible to execute the super-resolution reconstruction a large number of times and makes it possible to improve the reliability of a result reconstructed using the amount of statistics based on iterative data.

When it is presumed that the object of interest is not moving, performing iterative scanning on different image data with a scan angle different from that of the first scanning makes it possible to use collective data in the super-resolution reconstruction in order to enhance the resolution. Hence, the resolution increases when a larger number of iterations are performed. In addition, when image data at the same scan angle as that of the initial scanning is obtained by the iterative scanning, the iterative data may be used to average reductions in thermal noise.

It is possible to easily evaluate the operation of the air-conditioning apparatus 100 using this first iterative-scanning scheme. A trigger for an event is the size of the thermal image of a subject. The iteration of the scanning is changed in response to the trigger.

Example 2 of Iterative-Scanning Scheme

When there are many subjects in the room, the iterative scanning is performed on a more slowly moving subject with higher priority. Since it is difficult for a scan-type line infrared sensor to obtain thermal data of a moving object, there is a possibility that the reliability of thermal data of a high-speed moving object is lower than the reliability of thermal data of a slowly moving object. Accordingly, when there are many subjects, the iterative scanning is performed on a slowly moving object with higher priority. As a result, the reliability of the detection and the reliability of the air-condition control improve.

It is possible to easily evaluate the operation of the air-conditioning apparatus 100 using this second iterative-scanning scheme. A trigger for an event is the movement of a subject. The iteration of the scanning is changed in response to the trigger.

Modifications

In the above embodiments, the description has been given of an example in which the infrared sensor 300 is used to detect a subject. Now, a description will be given of a modification in which a subject can be detected with high accuracy and/or at a high speed through use of a sensor different from the infrared sensor 300.

First Modification

A motion detector, in addition to the infrared sensor 300, may be used to detect a subject, such as a person. The motion detector can detect the presence/absence of a subject, can locate the position of a subject, and can determine whether a subject is moving or stationary. The infrared sensor 300 can scan only the position of a subject located by the motion detector, rather than scanning the entire room. Also, when the motion detector determines that a subject is moving, the infrared sensor 300 can stop scanning executed for the super-resolution reconstruction. When the motion detector detects that there is no one in the room, the infrared sensor 300 can update thermal data of the background or can test features of thermal transmission (use case 3-1).

This configuration makes it possible to reduce the amount of time up to subject detection. Also, since it is not necessary to process thermal data of the entire room, the power consumption can also be reduced. At nighttime or the like, an illuminance sensor may be used to detect the absence of a human in the room.

Second Modification

A $CO_2$ sensor, in addition to the infrared sensor 300, may be used to detect a subject, such as a high-temperature object. The $CO_2$ sensor can measure the density of carbon dioxide in the room. When the carbon dioxide measured by the $CO_2$ sensor exceeds a predetermined threshold, the infrared sensor 300 can increase the scanning speed for the entire room or can perform the super-resolution reconstruction processing, while paying attention to the area of a subject thermal image.

This configuration makes it possible to perform, for example, fire detection at an earlier stage. In addition, combination with a motion detector also makes it possible to efficiently determine, for example, whether or not a fire has broken out when no one is in the room or whether a person is having a coffee break or is ironing.

<Applied Form>

In the above embodiments, the description has been given of the air-conditioning apparatus in which the infrared sensor and the processor are incorporated. However, the infrared sensor(s), the processor, and the other constituent elements may be configured as independent modules. The processes performed by the processor and so on described in the above embodiments can also be individually configured as software (not illustrated). That is, the processes may be realized by a recording medium (including a disc/disk medium or an external memory) to which the processes (programs) are written. In addition, the processes (programs) are assumed to include actions provided over a network. In this case, a main element that processes the software may be a computing unit provided in the air-conditioning apparatus or may be a computing unit included in a personal computer (PC), a smartphone, or the like. The software may also be processed by a cloud server or the like through a network.

The present disclosure is applicable to a sensor control method executed by an air-conditioning apparatus.

What is claimed is:

1. A sensor control method executed by an air-conditioning apparatus including a linear infrared sensor constituted by a plurality of infrared light-receiving elements, the sensor control method comprising:
   acquiring a first thermal image by scanning an air-conditioned space using the infrared sensor in accordance with a first scanning scheme, the air-conditioning apparatus being placed in the air-conditioned space;
   extracting a subject thermal image from the first thermal image, based on a difference between a background thermal image of the air-conditioned space when no subject is present therein and the first thermal image;
   determining a second scanning scheme different from the first scanning scheme, when a size of the extracted subject thermal image is equal to or smaller than a predetermined size, wherein the predetermined size is smaller than a size of the first thermal image; and
   acquiring a second thermal image by scanning an area corresponding to the extracted subject thermal image of which the size is equal to or smaller than the predetermined size using the infrared sensor in accordance with the determined second scanning scheme, wherein the area is an area in the air-conditioned space.

2. The control method according to claim 1,
wherein, in the determining of the second scanning scheme, the second scanning scheme is determined based on a resolution of the extracted subject thermal image and a resolution needed by the air-conditioning apparatus.

3. The control method according to claim 2,
wherein the second scanning scheme differs from the first scanning scheme in a scanning speed.

4. The control method according to claim 2,
wherein the second scanning scheme differs from the first scanning scheme in scan intervals.

5. The control method according to claim 1,
wherein, in the extracting of the subject thermal image, a pixel area where a temperature difference from the background thermal image is larger than a predetermined threshold temperature, the pixel area being included in the first thermal image, is extracted as the subject thermal image.

6. The control method according to claim 1, further comprising:
acquiring a re-scanned thermal image by re-scanning an area corresponding to the extracted subject thermal image using the infrared sensor in accordance with the first scanning scheme, after the subject thermal image is extracted in the extracting of the subject thermal image; and
detecting a thermal image change that occurs between the first thermal image and the re-scanned thermal image, wherein, in the determining of the second scanning scheme, when the thermal image change detected in the detecting of the thermal image change is smaller than a predetermined value, the second scanning scheme is determined.

7. The control method according to claim 1,
wherein the infrared sensor is used to acquire the background thermal image in a state in which an air flow blown by the air-conditioning apparatus is applied to a particular area in the air-conditioned space.

8. The control method according to claim 7,
wherein iterative scanning is performed on the particular area.

9. The control method according to claim 7,
wherein a frequency of scanning the particular area is changed.

10. The control method according to claim 1, further comprising:
executing super-resolution reconstruction processing by using the second thermal image.

11. The control method according to claim 10, further comprising:
providing air-conditioning control for a subject via the air-conditioning apparatus, in accordance with a result of the super-resolution reconstruction processing.

12. The control method according to claim 10, further comprising:
issuing a notification regarding a state of a subject, in accordance with a result of the super-resolution reconstruction processing.

* * * * *